US011348423B2

(12) United States Patent
England et al.

(10) Patent No.: US 11,348,423 B2
(45) Date of Patent: May 31, 2022

(54) AUDIO/VIDEO DEVICE WITH VIEWER

(71) Applicant: Amazon Technologies, Inc., Seattle, WA (US)

(72) Inventors: Matthew J. England, Santa Monica, CA (US); Christopher Loew, Palo Alto, CA (US); James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 16/443,839

(22) Filed: Jun. 17, 2019

(65) Prior Publication Data

US 2020/0394882 A1   Dec. 17, 2020

(51) Int. Cl.
*G08B 13/196* (2006.01)
*H04N 7/18* (2006.01)

(52) U.S. Cl.
CPC . *G08B 13/19619* (2013.01); *G08B 13/19632* (2013.01); *G08B 13/19695* (2013.01); *H04N 7/186* (2013.01)

(58) Field of Classification Search
CPC ........ G08B 13/19619; G08B 13/19632; G08B 13/19695; G08B 13/19697; G08B 3/10; H04N 7/186; E06B 2007/305; E06B 7/30
See application file for complete search history.

(56) References Cited

U.S. PATENT DOCUMENTS

| 4,764,953 | A | 8/1988 | Chern et al. |
| 5,428,388 | A | 6/1995 | von Bauer et al. |
| 5,760,848 | A | 6/1998 | Cho |
| 6,072,402 | A | 6/2000 | Kniffin et al. |

(Continued)

FOREIGN PATENT DOCUMENTS

| CN | 2585521 | 11/2003 |
| CN | 2792061 | 6/2006 |

(Continued)

OTHER PUBLICATIONS

EdimaxTV, "Installation of Edimax IC-6220DC Wireless Peephole Camera", Nov. 15, 2016, Retrieved from «https://www.youtube.com/watch?v=6qGH1XzA_7o» ;1 page.

(Continued)

*Primary Examiner* — Jared Walker
(74) *Attorney, Agent, or Firm* — Lee & Hayes, P.C.

(57) ABSTRACT

An audio/video (A/V) device may include or accommodate a viewer through a barrier. For example, an A/V device may include a first component for installation on an exterior surface of a door, a second component for installation on an interior surface of the door, a viewer that extends through an opening in the door, and a flexible connector that electrically couples the first component and the second component. In some instances, the first component may include an opening for the viewer, a camera, and an input device in substantial vertical alignment. The A/V device may further include a shutter that moves between a first position, in which the shutter is proximate to the viewer, and a second position, in which the shutter is not proximate the viewer. Additionally, the A/V device may include rings interposed between each of the first and second components and the door.

20 Claims, 38 Drawing Sheets

(56) References Cited

U.S. PATENT DOCUMENTS

| | | |
|---|---|---|
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0221183 A1* | 10/2006 | Sham .................. H04N 7/186 348/155 |
| 2007/0008081 A1 | 1/2007 | Tylicki et al. |
| 2008/0239072 A1* | 10/2008 | Cheng .............. G08B 13/19619 348/143 |
| 2009/0059001 A1* | 3/2009 | Wang .................. H04N 7/186 348/143 |
| 2010/0225455 A1 | 9/2010 | Claiborne et al. |
| 2010/0259618 A1 | 10/2010 | Chen |
| 2013/0045763 A1* | 2/2013 | Ruiz .................. H04M 1/0291 455/466 |
| 2013/0057695 A1 | 3/2013 | Huisking |
| 2014/0139666 A1* | 5/2014 | Wei .................... H04N 5/22525 348/143 |
| 2014/0267716 A1* | 9/2014 | Child .................. H04N 7/186 348/143 |
| 2015/0035987 A1 | 2/2015 | Fernandez |
| 2015/0163463 A1 | 6/2015 | Hwang et al. |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

Invitation to Pay Fees dtd Oct. 6, 2020 for Application PCT/US20/37278 "Audionvideo Device With Viewer" 14 Pages.

The PCT Search Report and Written Opinion dated Nov. 27, 2020 for PCT application No. PCT/US20/37278, 20 pages.

* cited by examiner

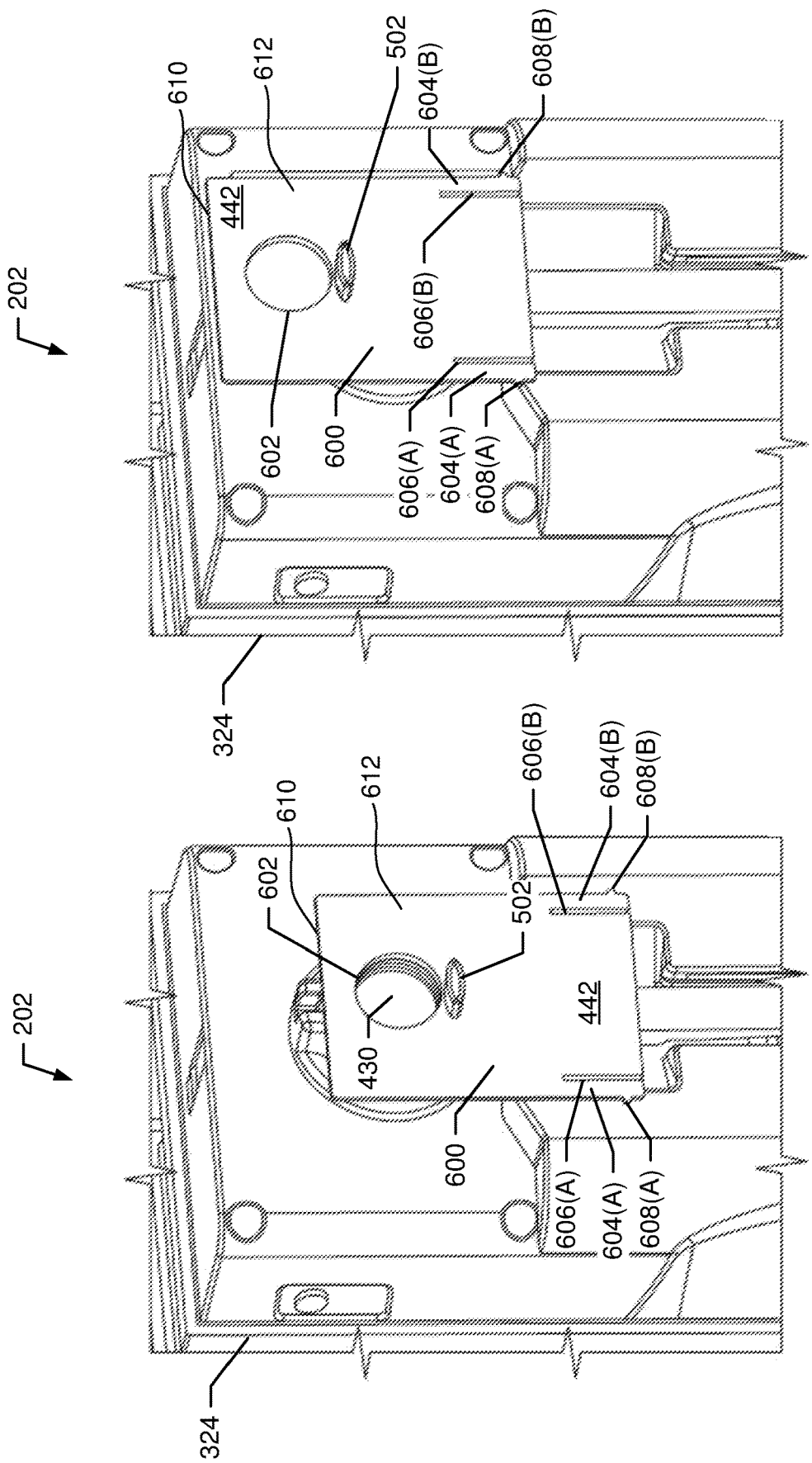

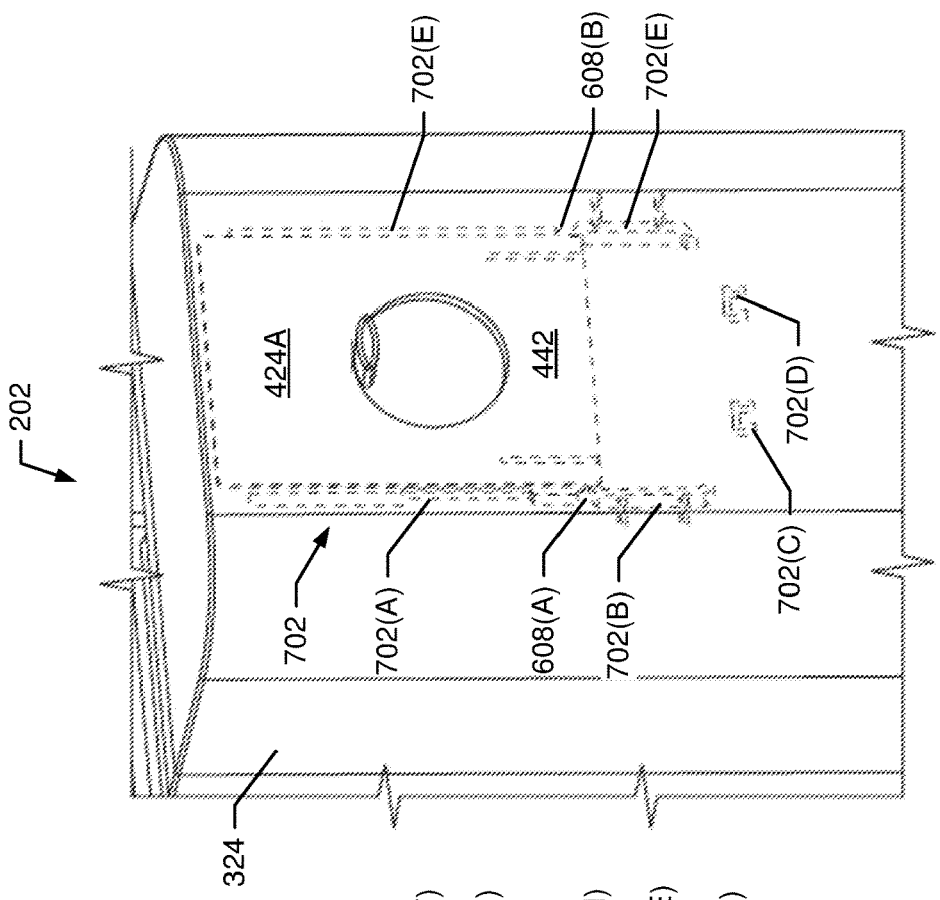
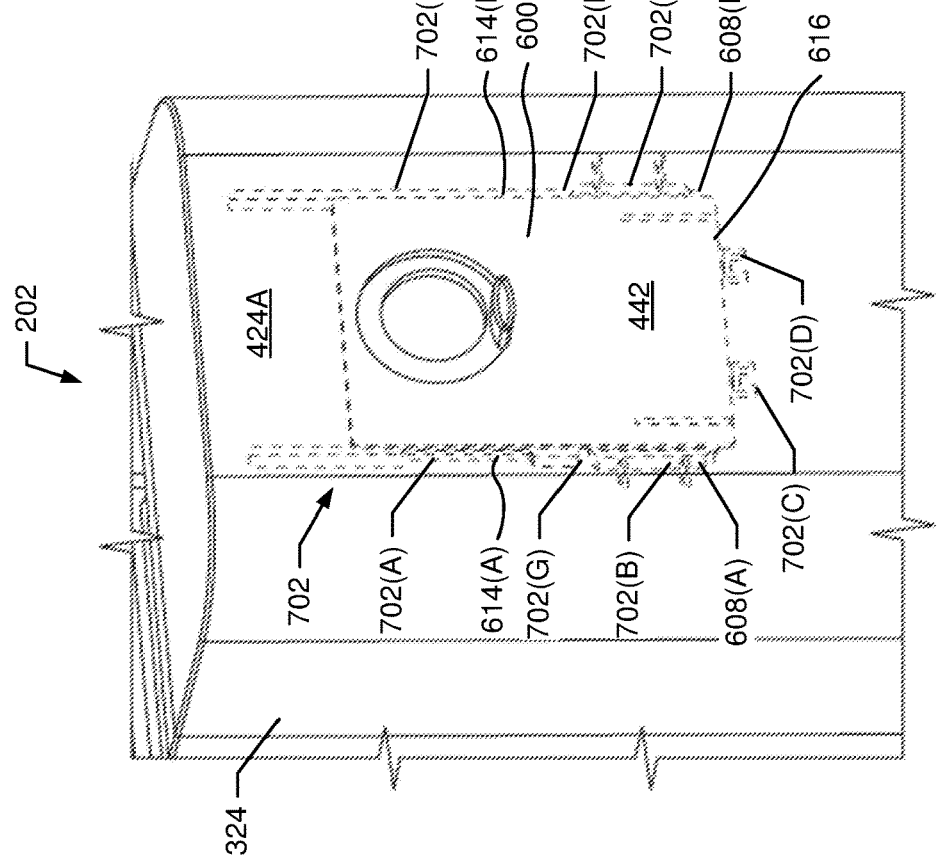

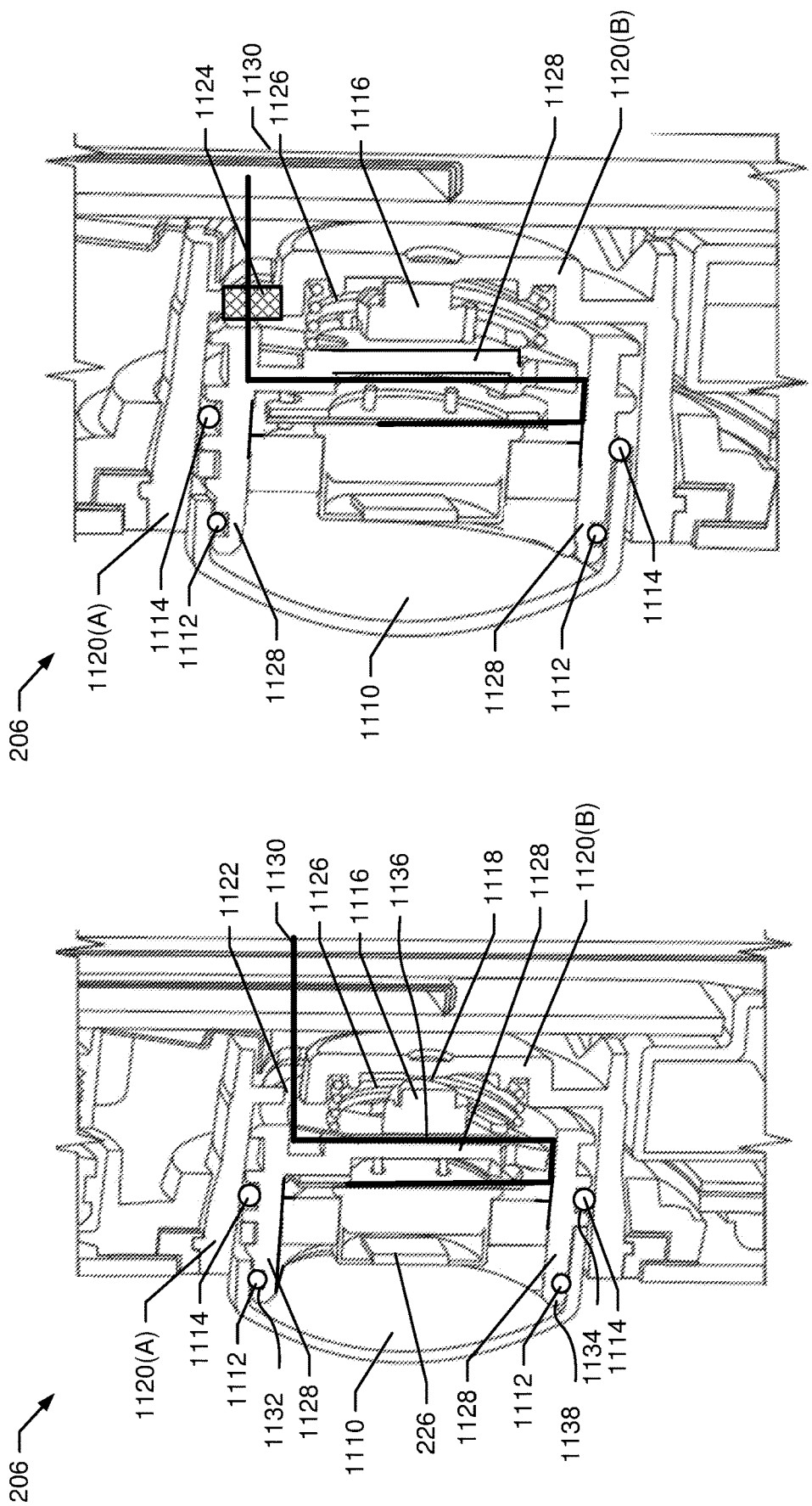

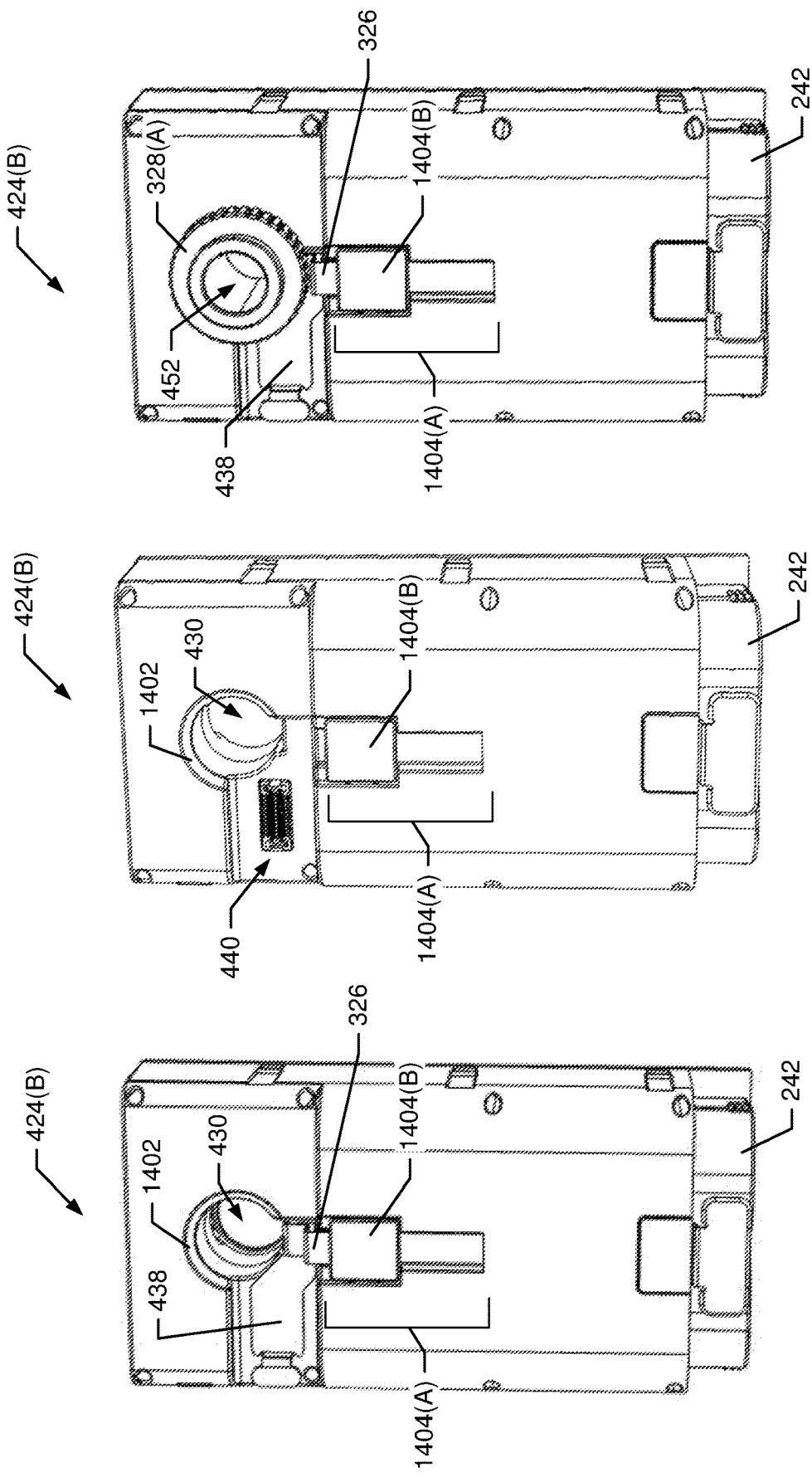

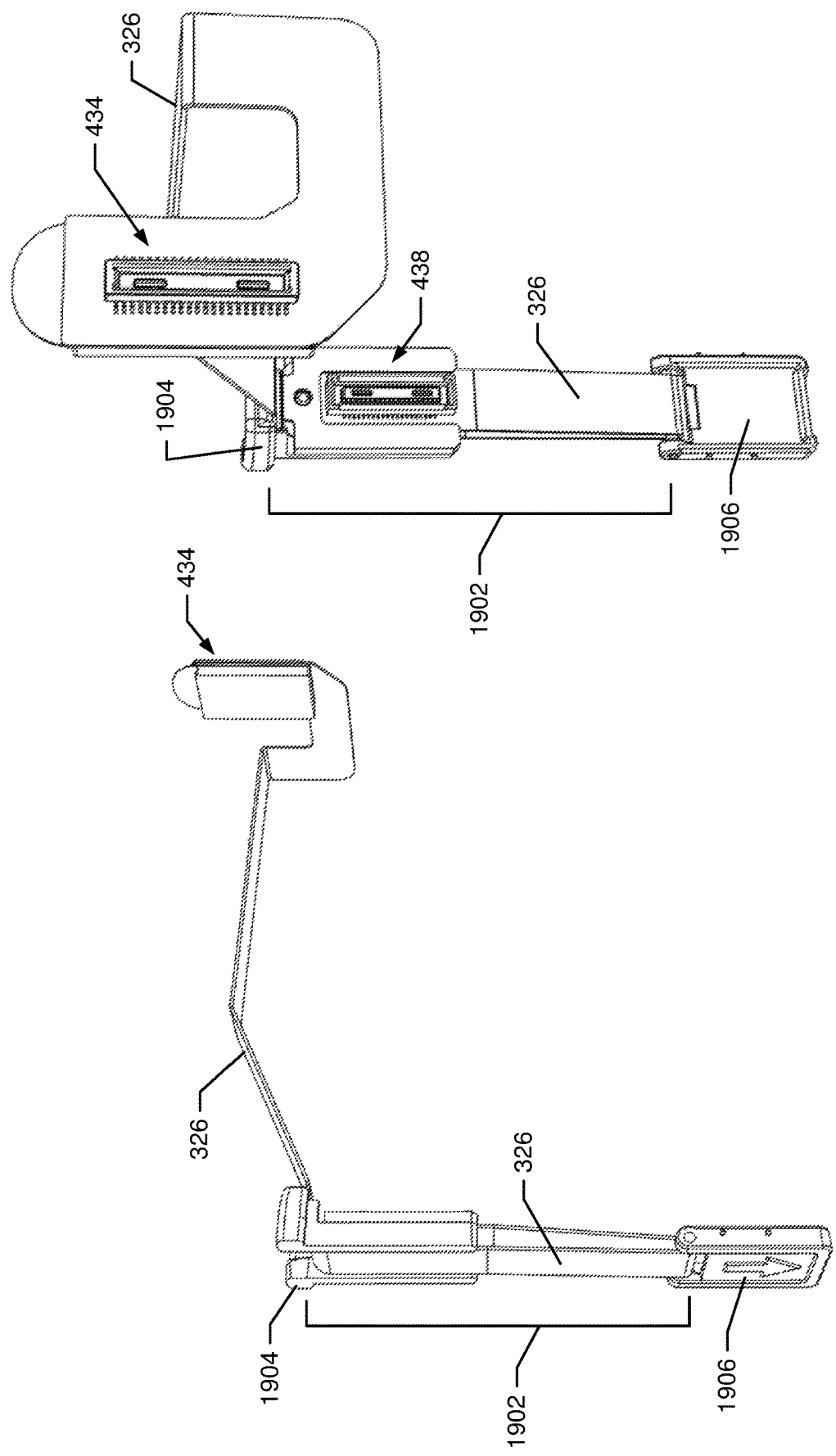

AUDIO/VIDEO DEVICE WITH VIEWER

BACKGROUND

Home security is a concern for many homeowners and renters. Those seeking to protect or monitor their homes often wish to have video and audio communications with visitors, for example, those visiting an external door or entryway. Audio/Video recording and communication devices (A/V devices) provide this functionality, and can also aid in crime detection and prevention. For example, audio and/or video captured by an A/V device can be uploaded to the cloud and recorded on a remote server. Subsequent review of the audio and/or video can aid law enforcement in capturing perpetrators of home burglaries and other crimes. Further, the presence of one or more A/V devices on the exterior of a home acts as a powerful deterrent against would-be burglars.

BRIEF DESCRIPTION OF THE DRAWINGS

The various embodiments of the present audio/video recording and communication device (A/V device) device with a viewer now will be discussed in detail with an emphasis on highlighting the advantageous features. These embodiments depict the novel and non-obvious A/V device with a viewer shown in the accompanying drawings, which are for illustrative purposes only. These drawings include the following figures, in which like numerals indicate like parts:

FIGS. 6A-6B are exploded perspective views of the A/V device of FIGS. 5A-5B, respectively, with a cover portion removed to show the shutter;

FIGS. 7A-7B are perspective views of an example A/V device with a track for a shutter, according to various aspects of the present disclosure;

FIGS. 11D-11E are perspective, cross-sectional, detail views of the button of the first component of the A/V device of FIG. 11C, according to various aspects of the present disclosure;

FIG. 14A is a rear perspective view of a second component of another A/V device with a viewer and showing a portion of a housing of the second component removed, according to various aspects of the present disclosure;

FIG. 14B is a rear perspective view of the second component of FIG. 14A without a coupler, according to various aspects of the present disclosure;

FIG. 14C is a rear perspective view of the second component of FIG. 13A with a fastener, according to various aspects of the present disclosure;

FIG. 19D is a side perspective view illustrating an example flexible connector, a connector holder, and a tab, according to various aspects of the present disclosure;

FIG. 19E is a rear perspective view illustrating the example flexible connector, the connector holder, and the tab of FIG. 19D, according to various aspects of the present disclosure;

DETAILED DESCRIPTION

Figure 1:
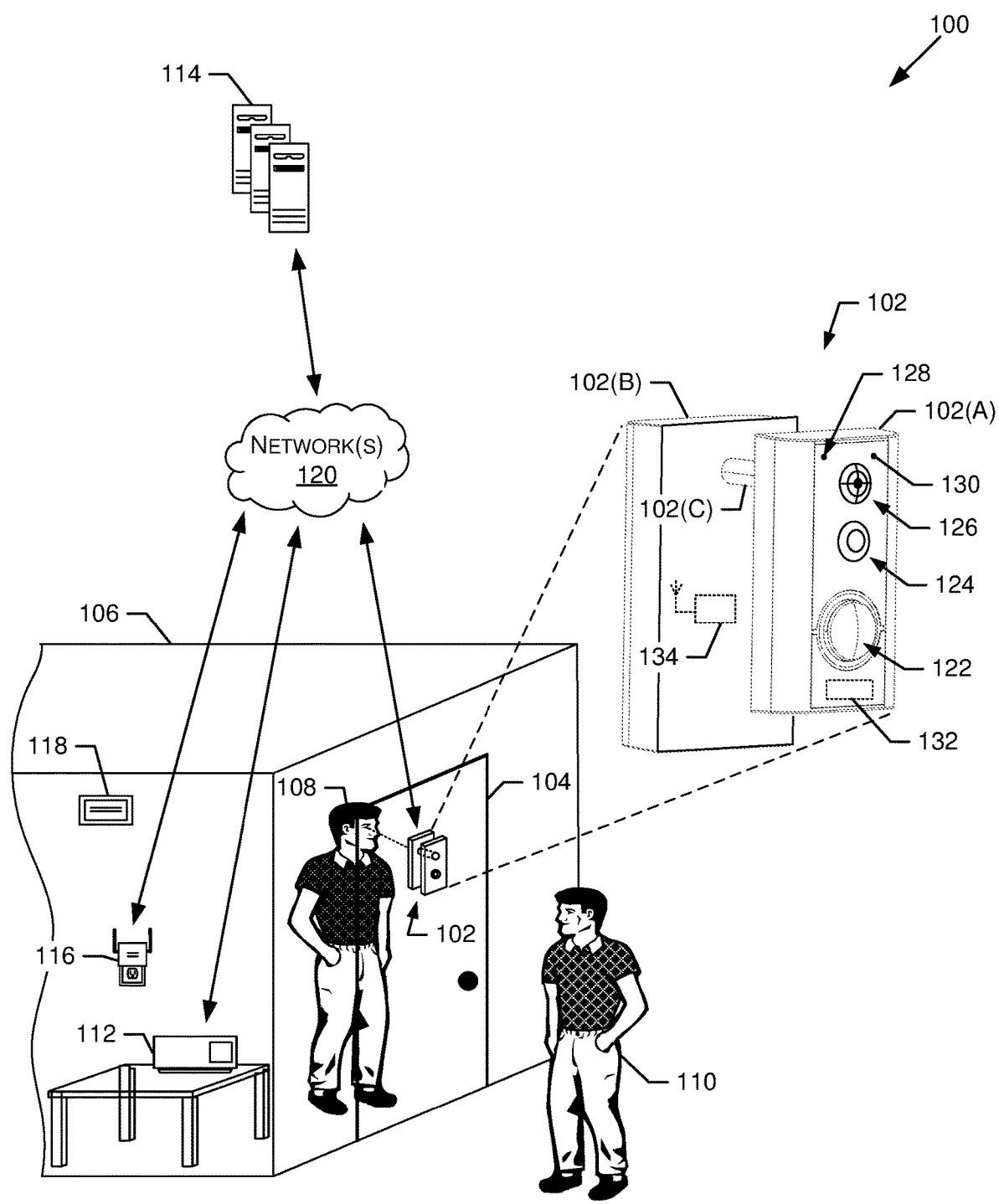
FIG. 1 is a schematic diagram of an example architecture in which an A/V device with a viewer may be implemented, according to various aspects of the present disclosure.

The various embodiments of the present A/V device with a viewer have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V devices, such as A/V doorbells, depending on the orientation of an entryway to a structure, may not provide as useful a field of view to a user as desired. For example, wiring on a house may require an A/V device to be installed at a location that is not ideal for capturing video, such as on a surface perpendicular to the door, at a location that is relatively low, in a corner, etc., thereby limiting the field of view of the A/V device, which may ultimately decrease the effectiveness of the A/V device. As another example, an A/V device that is installed outside on a front porch of a house may be required to communicate with a device within the house through an exterior wall of the house, which may obstruct or otherwise diminish the wireless communication.

Another aspect of the present embodiments includes the realization that some users, especially users renting their residences, may not want to permanently mount an A/V device to a wall of the property to avoid causing damage (e.g., drilling holes, leaving adhesive residue, etc.) that may require the user to repair and/or pay for the damage. Such users may therefore be less inclined to install an A/V device, thereby removing the added security that the A/V device could provide to the user.

Another aspect of the present embodiments includes the realization that electrical connectors that are used to connect devices, such as wires and/or flex printed circuit boards, are fragile and may be damaged when connecting devices. For example, an electrical connector that is fed from one side of a barrier to the other side of the barrier through an opening in the barrier may be damaged if the electrical connector is bent or otherwise moved in a manner that damages the electrical connector.

Another aspect of the present embodiments includes the realization that A/V devices that are mountable on a barrier do not preserve the existing viewer that extends through an opening in the barrier. For example, A/V devices mountable on a barrier typically include a camera that is positioned within, or at the inside end of, the opening in the barrier. Such A/V devices thus prevent a user from looking through the viewer.

The present embodiments solve these problems by, for example, providing an A/V device that includes or accommodates a viewer through a barrier, such as a door. The A/V device may be attached to, or around, an opening in the barrier, such as an existing hole where a barrier viewer (e.g., a door viewer, a peephole, etc.) was installed. For example, an A/V device may include a first component for installation on an exterior surface of the barrier, a second component for installation on an interior surface of the barrier, and a viewer that extends through the opening in the barrier to enable use of the existing hole as a barrier viewer, while also providing the functionality of the A/V device. In examples, a flexible connector may be installed in the opening to electrically connect the first component to the second component. For example, the flexible connector may be attached to the viewer during installation and inserted through the opening, such as from the exterior side of the barrier. Once inserted, the flexible connector (e.g., a coupler) may be connected to the second component on the interior side of the barrier. Although, in other examples, the A/V device may be installed in a different manner. The first component, the second component, and/or the viewer may include passages and/or lenses to enable a user to view through the barrier (e.g., as a door viewer). In examples, the A/V device may include some features within the first component and some features within the second component. For example, a camera, a motion sensor, a button, etc. may be part of the first component on the exterior of the barrier, while a communication component, a battery, etc. may be part of the second component on the interior of the barrier, although in other examples the elements may be partitioned differently.

In some examples, by enabling installation of the A/V device through the opening in the barrier, such as an existing opening, the A/V device may be installed in an efficient manner without marking or damaging the barrier (e.g., in a manner that preserves an existing opening in the barrier). For example, the A/V device may include the viewer that enables the first component and the second component to be connected on separate sides of the barrier through the opening and/or enables installation of the flexible connector to connect the first and second components without damaging the flexible connector. In addition, the A/V device may have a better field of view of an environment (e.g., positioned at eye level, positioned at a barrier where people enter, etc.), in comparison to wall-mounted A/V devices, such as A/V doorbells. Moreover, the A/V device may provide various functionality, such as receiving input through a button, capturing image data, detecting motion, etc., while at the same time enabling a user to maintain use of a barrier viewer when the user is physically present at his or her barrier. Additionally, in examples where a communication component is positioned in a component of the A/V device that is installed on the interior surface of the barrier, the A/V device may provide better wireless connectivity (e.g., because an exterior wall, door, or other barrier may not obstruct a communication component from receiving signals on a local network). Accordingly, the present embodiments provide an A/V device that is easier to install and use, more reliable, and provides more efficient wireless communication, thereby increasing its usage and effectiveness, and ultimately enhancing the safety and security of people associated with the property, the property itself, and/or the surrounding neighborhood.

Another aspect of the present embodiments includes the realization that, during a fire, it is advantageous for a barrier, such as a fire door, to not allow the fire to travel from one side of the barrier to the other side of the barrier. The present embodiments provide this advantage by providing, for example, an A/V device including a first fire-resistant ring interposed between a first portion of a first component (e.g., an outer nut of the first component) and the exterior surface of the barrier, and/or a second fire-resistant ring interposed between a second portion of a second component (e.g., an inner nut of the second component) and the interior surface of the barrier. The rings are preferably non-flammable, heat resistant, have a high melting point, and may include a material with a threshold fire rating. In some embodiments, the rings may have melting points of at least 1,220 degrees Fahrenheit, at least 1,710 degrees Fahrenheit, at least 2,750 degrees Fahrenheit, and/or any other minimum temperature. For example, the rings may include, but are not limited to, ceramic and various metals, such as brass, steel, aluminum, etc. As such, if other portions of the A/V device melt during a fire, the rings may help to sustain the structural integrity of the barrier viewer such that the fire cannot travel from one side of the barrier to the other side of the barrier through the opening in the barrier that contains the viewer.

For example, by including the ring(s), the A/V device is configured to block the opening in the door through which the viewer passes, such that the fire is unable to travel from one side of the barrier to the other side of the barrier for at least a threshold period of time. The threshold period of time may include, but is not limited to, forty-five minutes, one hour, one and a half hours, three hours, or any other length of time. For example, the A/V device may satisfy one or more fire certification tests, such as, but not limited to, UL10C, EN 13501-2, BS476-20, BS476-22, AU 1905-1, and/or one or more other fire certification tests.

In a non-limiting illustration, an A/V device includes a first component configured for installation on an exterior surface of a barrier, such as a door, wall, window, gate, etc. The A/V device also includes a second component configured for installation on an interior surface of the barrier. In some examples, the A/V device includes a viewer to connect the first component to the second component. In other examples, the first component and/or the second component may attach to the barrier without the viewer (e.g., with a fastener, adhesive, etc.). The viewer may be installed within an opening in the barrier. The A/V device may also include a flexible connector that electrically couples and/or communicatively couples the first component to the second component. The flexible connector may extend from the first component to the second component through the opening in the barrier and, in examples where the A/V device includes the viewer, the flexible connector may extend through the barrier in addition to the viewer. In examples where both the flexible connector and the viewer extend through the opening in the barrier, the viewer may include a first portion of the exterior surface that is circular, and a second potion of the exterior surface that is flat, where the second portion that is flat provides space within the opening in the barrier for the flexible connector to extend through (e.g., when the flexible connector is a flex printed circuit board).

The viewer may include a passage extending between a first end of the viewer and a second end of the viewer along a first longitudinal axis of the viewer. In some examples, the viewer has an elongated tubular shape or other shape configured for installation within the opening in the barrier. For example, one or both of an inner cross-sectional shape and an outer cross-sectional shape of the viewer may be substantially circular, but may include a flat portion that accommodates a flexible connector, as described below. In some examples, the viewer also includes a lens disposed within the passage. The viewer may be part of the first component and/or the second component, or may be a separate element configured to attach to the first component, the second component, and/or the opening in the barrier.

The first component may include a first housing having a first front surface spaced from the exterior surface of the barrier and a first rear surface abutting the exterior surface and opposite the first front surface. The first housing may also include a first opening extending from the first rear surface into the first housing toward the first front surface. The first opening may include a second longitudinal axis that, when the A/V device is installed on the barrier, is substantially aligned with the first longitudinal axis of the viewer. For example, the first opening may be substantially concentrically aligned with the viewer when the A/V device is installed on the barrier. The first component may also include a lens proximate the first front surface, such as a fisheye lens, another wide-angle lens (e.g., angle above a threshold), or any other type of lens. The lens of the first component and/or the lens of the viewer may be aligned to comprise a door viewer (e.g., to enable a user to see through the barrier). In some instances, the lens of the first component and/or the lens of the viewer may include high temperature glass having a threshold melting point. The threshold melting point may be, but is not limited to, at least 450 degrees Fahrenheit, at least 1,000 degrees Fahrenheit, at least 1,700 degrees Fahrenheit, and/or any other minimum temperature.

In some examples, the first component includes a camera, a microphone, a button, and/or a motion sensor. In some examples, the lens, the first opening, the camera, the microphone, the button, and/or the motion sensor may be substantially vertically aligned with one another. For example, the first component may include a first end of the first component (e.g., a top end of the first component when installed) and a second end of the first component (e.g., a bottom end of the first component when installed). The first opening (and/or the lens) may be located a first distance from the first end of the first component, the camera may be located a second distance from the first end of the first component, and the button may be located a third distance from the first end of the first component. In some instances, the second distance and/or the third distance are greater than the first distance. In some instances, the second distance is greater than the first distance and the third distance is greater than the second distance. In either instance, the first opening (and/or the lens), the camera, and the button may be substantially vertically aligned with one another.

The placement of the first opening, the camera, and the button (e.g., the relative positions of these components) may improve the configuration or layout of a printed circuit board (PCB) within the first component. For example, the camera and the button may be electrically connected to the PCB, and the PCB may include traces for routing electrical/digital signals to/from the camera and/or the button. The PCB may further include a hole to accommodate the viewer, which extends generally completely through both the first component and the second component. By placing the first opening (of the first component) above the camera and the button, the hole in the PCB may be located toward a top end of the PCB instead of in the middle of the PCB. If the hole in the PCB that accommodates the viewer were in the middle of the PCB, the traces would need to be routed around the hole, such as through narrow strips on either side of the hole. This routing arrangement would increase the lengths of the traces and/or require the traces to be positioned very close to one another, either of which would likely decrease the signal-to-noise ratio for the traces, decreasing the overall performance of the A/V device and creating a poorer customer experience with the A/V device. As such, locating the camera and the button below the first opening improves the performance of the PCB.

The second component may include a second housing having a second front surface abutting the interior surface of the barrier and a second rear surface spaced from the interior surface and opposite the second front surface. The second housing may also have a second opening extending from the second rear surface into the second housing toward the second front surface. The second opening may have a third longitudinal axis that, when the A/V device is installed on the barrier, is substantially aligned with the first longitudinal axis of the viewer. For example, the second opening may be concentrically aligned with the viewer when the A/V device is installed on the barrier. In some examples, the second housing has a cover proximate the second front surface, such as a transparent or semi-transparent cover. In some examples, the second component includes a communication component and/or a battery to provide power to the first component and/or the second component (e.g., via the flexible connector).

In some examples, the second component may further include a shutter configured to move between a first position and a second position. When in the first position, the shutter may cover the passage of the viewer, preventing anyone from seeing through the viewer. When in the second position, the shutter may not cover the passage of the viewer, allowing a person at the inside end of the viewer to see through the viewer. As described herein, the shutter may include a tab, a button, an indentation, a notch, and/or any other feature that may facilitate movement of the shutter between the first position and the second position.

In some examples, the A/V device may further include rings that enhance the fire safety of the A/V device. For instance, the first component may include a first fire-resistant ring interposed between a first portion of the first component (e.g., an outer nut of the first component) and the exterior surface of the barrier, and/or the second component may include a second fire-resistant ring interposed between a second portion of the second component (e.g., an inner nut of the second component) and the interior surface of the barrier. The rings are preferably non-flammable, heat resistant, have a high melting point, and may include a material with a threshold fire rating. In some embodiments, the rings may have melting points of at least 1,220 degrees Fahrenheit, at least 1,710 degrees Fahrenheit, at least 2,750 degrees Fahrenheit, and/or any other minimum temperature. For example, the rings may include, but are not limited to, ceramic and various metals, such as brass, steel, aluminum, etc. As such, if other portions of the A/V device melt during a fire, the rings may help to sustain the structural integrity of the barrier viewer such that the fire cannot travel from one side of the barrier to the other side of the barrier through the opening in the barrier that contains the viewer.

For example, by including the ring(s) and/or the high temperature glass lens(es), the A/V device is configured to block the opening in the door through which the viewer passes, such that the fire is unable to travel from one side of the barrier to the other side of the barrier for a threshold period of time. The threshold period of time may include, but is not limited to, forty-five minutes, one hour, one and a half hours, three hours, or any other length of time. This is because the ring(s), the viewer, and the high temperature glass lens(es) completely seal the opening of the barrier, thus, causing it so that the fire cannot travel through the opening of the barrier and/or the viewer for the threshold period of time.

The A/V device may include a connector holder to assist in attaching the flexible connector to the second component. For example, the connector holder may have a first portion that extends in a first direction and a second portion that extends from the first portion such that the second portion extends in a second direction transverse to the first direction. In examples, an outer shape of the second portion may correspond to an inner shape of a passage of the viewer. The connector holder may retain at least a portion of the flexible connector, such as a coupler on one end of the flexible connector. During installation, the connector holder (which is attached to the coupler of the flexible connector) may be placed within the passage of the viewer and the combined components may be inserted through an opening in the barrier, such as from an exterior side to an interior side of the barrier. Once inserted, the connector holder may be removed from the passage and attached to a first end of a channel within the second component. The first end of the channel may include a connection port to connect to the coupler of the flexible connector. In examples, the flexible connector may be looped around a tab, and the tab may be pulled to remove excess length in the flexible connector that may be due to different thicknesses of barriers. The tab may be attached to a second end of the channel to maintain the excess length of the flexible connector in a tightened state. In examples, the channel may include an undercut to engage a detent on the tab (e.g., to enable a friction fit engagement).

The first component and/or the second component of the A/V device may include one or more processors and/or memory to enable various functionality. In examples, the camera and/or the microphone that is positioned on the first component (e.g., an exterior of the barrier) may generate image data and/or audio data when motion is detected by the A/V device. Motion may be detected in a variety of ways, such as by the camera, by the motion sensor, by an additional sensor included in the first component and/or the second component (e.g., an accelerometer, a gyroscope, and/or a magnetometer), etc. The communication component may send the image data and/or the audio data (and/or a notification regarding such data) to a network device, a client device, or any other device. The notification may inform a user associated with the A/V device, another entity, an application, etc. of motion at the A/V device.

In examples, the A/V device may include an additional sensor, besides the motion sensor, in the first component and/or the second component. The additional sensor may include an accelerometer, a gyroscope, a magnetometer, etc. Based on data from the additional sensor, the A/V device may detect more than a threshold amount of movement or vibration of the A/V device, detect a change to an orientation of the A/V device, etc. These conditions may indicate that a person or object has contacted or moved the barrier to which the A/V device is attached (e.g., a user has knocked on a door, a user or intruder is opening or closing the door, etc.). In response, the camera may capture image data and/or the microphone may generate audio data. Further, the A/V device may send a notification regarding such movement or vibration to a network device, a client device, and/or any other device. As yet another example, the A/V device may cause a speaker(s) to output audio. The speaker(s) may be included within the first component and/or the second component, or may be included in a device that is separate from the A/V device, such as a doorbell signaling device. The A/V device may cause the speaker(s) to output audio when the A/V device detects motion, movement or vibration, a change in an orientation of the A/V device, etc. In yet other examples, the A/V device may perform a multitude of other operations.

Although various elements are discussed as being included within a particular component, the elements may be included or arranged differently. For example, in the above description, the camera, the microphone, the button, the motion sensor, the battery, the communication component, the one or more processors, and/or the memory may be included in any of the first component, the second component, the viewer, and/or the flexible connector.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example environment 100 in which various aspects of the present disclosure may be implemented. In particular, the environment 100 includes an A/V device 102 attached to a door 104 of a house 106. The A/V device 102 may include a first component 102(A) (also referred to as "exterior component 102(A)") for mounting on an exterior surface of the door 104 and a second component 102(B) (also referred to as "interior component 102(B)") for mounting on an interior surface of the door 104. In some examples, the A/V device 102 may also include a third component 102(C) (also referred to as "viewer 102(C)") that extends through an opening in the door 104, such as a preexisting hole for a door viewer or a newly created hole for the A/V device 102. In some examples, the A/V device 102 may replace a door viewer installed in the door 104 or attach around an existing door viewer. As such, the A/V device 102 may include, or be associated with, a door viewer to enable a user 108 inside the house 106 to view a user 110 outside the house 106 and/or any other things outside the house 106 within a field of view (FOV) of the door viewer (which FOV may be expanded, in some examples, using a wide-angle lens, a fish eye lens, or the like). The A/V device 102 may communicate with a hub device 112, a remote system 114, a first signaling device 116, a second signaling device 118, and/or any other device directly (wirelessly or over a wired connection) and/or via one or more networks 120 and/or network devices (e.g., the smart-home hub device 112, the remote system 114, etc.).

In the example of FIG. 1, the exterior component 102(A) of the A/V device 102 includes a button 122, a camera 124, a lens 126, a microphone 128, a speaker 130, and a sensor 132. As shown, when the A/V device 102 is installed in the door 104, the camera 124 is located beneath, and substantially vertically aligned with, the lens 126. Additionally, the button 122 is located beneath, and substantially vertically aligned with, the camera 124. In some instances, a first mechanical component (e.g., the lens 126, the camera 124, the button 122, etc.) is substantially vertically aligned with a second mechanical component (e.g., the lens 126, the camera 124, the button 122, etc.) when a horizontal center of the first mechanical component is located within a threshold lateral distance to a horizontal center of the second mechanical component. The threshold lateral distance may include, but is not limited to, one centimeter, two centimeters, one inch, and/or the like.

The button 122 may be pressed, such as by the user 110, to activate at least one of the first signaling device 116 and the second signaling device 118. The camera 124 may capture image data representative of a FOV for the camera 124. The lens 126 may comprise a fisheye lens or any other lens. The microphone 128 may generate audio data. The sensor 132 may include an accelerometer, a gyroscope, a magnetometer, and/or a glass break detector. In the example of FIG. 1, the interior component 102(B) includes a communication component 134 for communicating with the hub device 112, the remote system 114, the first signaling device 116 (e.g., a wireless speaker), the second signaling device 118 (e.g., a digital or mechanical doorbell signaling device), and/or any other device. The exterior component 102(A) and/or the interior component 102(B) may include additional, or different components, as discussed herein.

As illustrated, the exterior component 102(A) and the interior component 102(B) are associated with (in some examples, coupled to) the viewer 102(C). In some examples, the exterior component 102(A) and the interior component 102(B) may be secured to the door 104 by being secured to the viewer 102(C). For example, the viewer 102(C) may include structure, such as threads, at one or both ends of the viewer 102(C), and the viewer may extend into a first opening in the exterior component 102(A) and a second opening in the interior component 102(B). In some examples, the engagement between the viewer 102(C) and the exterior component 102(A) and the interior component 102(B) may be tightened (e.g., using male/female threading, using tension, using adhesive, etc.) to reduce the lateral length of the viewer between the exterior component 102(A) and the interior component 102(B), thereby pulling the exterior component 102(A) toward the exterior surface of the door 104 and pulling the interior component 102(B) toward an interior surface of the door 104 until the A/V device is securely mounted on the door 104. In other examples, the exterior component 102(A) and the interior component 102(B) may be securely mounted on the door 104 using alternative methods, such as by adhesively securing the exterior component 102(A) and the interior component 102(B) to the door 104, screwing, nailing, or otherwise physically securing the exterior component 102(A) and the interior component 102(B) to the door 104, and/or by other methods.

The first signaling device 116 and/or the second signaling device 118 may be any type of signaling device, such as a wired signaling device, a wireless signaling device, etc. The first signaling device 116 and/or the second signaling device 118 may include a speaker, an electronic/digital signaling device, a mechanical signaling device, and/or another device to output sound. In the example of FIG. 1, the first signaling device 116 is plugged into an electrical outlet in the house 106 and communicates wirelessly with the A/V device 102 (and/or the hub 112 and/or the remote system 114) to output sound. Here, the first signaling device 116 is implemented as a combination wireless network extender and signaling device, and the second signaling device 118 is implemented as a mechanical or electronic/digital signaling device, such as one that is hard-wired to an existing doorbell.

In some examples, the A/V device 102 operates in cooperation with the hub device 112, the remote system 114, the first signaling device 116, and/or the second signaling device 118 to perform a variety of operations. As one example, the A/V device 102 may capture image data with the camera 124 and generate audio data with the microphone 128 when motion is detected from the user 110 and/or when the user 110 knocks on or contacts the door 104. The A/V device 102 may further detect a button press when the user 110 contacts the button 122. The A/V device 102 may send, using the communication component 134, the image data, the audio data, an indication of the button press, and/or a notification to the hub device 112 and/or the remote system 114. The hub device 112 and/or the remote system 114 may perform processing on the received data, notify a user associated with the A/V device 102 of an event (e.g., detected motion, movement, vibration, the button press, etc.), send the image data, the audio data, and/or the indication of the button press, and/or perform other processing. As another example, the A/V device 102 may detect more than a threshold amount of movement or vibration of the A/V device 102, detect a change to an orientation of the A/V device 102, etc., based on data from the sensor 132. These events may indicate that the user 108 and/or the user 110 has contacted or moved the door 104 (e.g., the user 110 has knocked on the door 104, the user 108 and/or the user 110 is opening or closing the door 104, etc.). In response, the A/V device 102 may cause the camera 124 to activate and capture image data and/or the microphone 128 to active and generate audio data. Further, the A/V device 102 may send, using the communication component 134, the image data, the audio data, and/or an indication of the movement or vibration to the hub device 112 and/or the remote system 114. As yet another example, the A/V device 102 may cause the speaker 130, the first signaling device 116, and/or the second signaling device 118 to output audio when the A/V device 102 detects motion, movement or vibration, a change in an orientation of the A/V device, etc. In some examples, the same audio may be output for each type of detected event, while in other examples, one or more different sounds may be output for different types of detected events (e.g., motion detected causes output of first audio and a press of the button 122 causes output of second audio). In yet other examples, the A/V device 102 may perform a variety of other operations.

Although the door 104 is illustrated in the example of FIG. 1, the A/V device 102 may be attached to other types of barriers, such as walls, windows, gates, or other objects. Further, while the door 104 in FIG. 1 is a front door for the house 106, the door 104 may be any type of door, such as a garage door, a back door, a sliding door, a hinged door, etc. Further, although various functionality and/or components are discussed as being embodied in the exterior component 102(A), the interior component 102(B), and the viewer 102(C), respectively, the functionality and/or components may be implemented in other configurations, as discussed in further detail hereafter.

Figure 2:
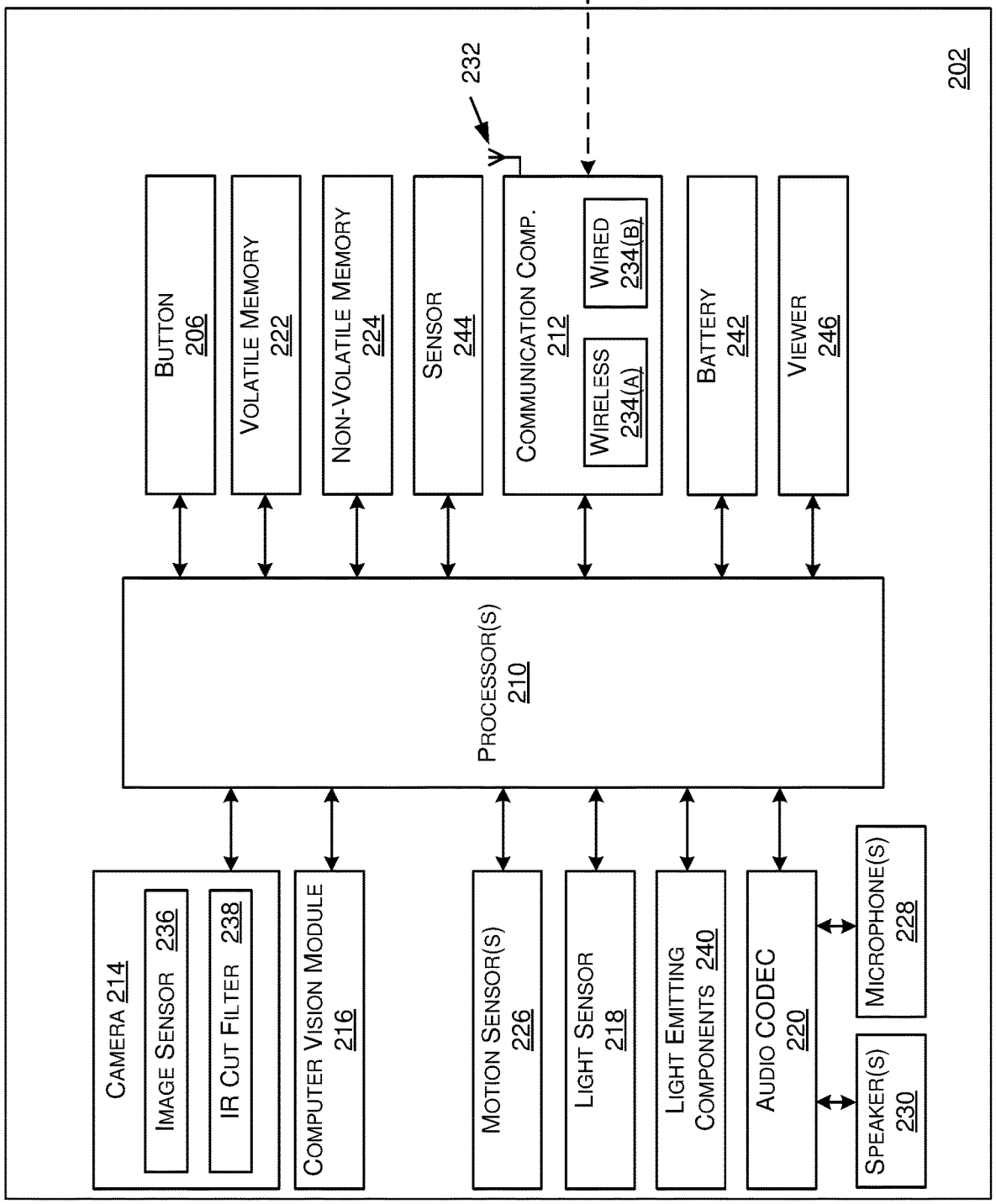
FIG. 2 is a functional block diagram of an A/V device, according to various aspects of the present disclosure.

FIG. 2 is a functional block diagram for an A/V device 202 (which may be similar to, and/or represent, the A/V device 102), according to various aspects of the present disclosure. In some embodiments, the A/V device 202 may include a button 206 and/or a connection to a signaling device 208 (e.g., a pre-installed signaling device, such as a wired signaling device, and/or a wireless signaling device, connected over Wi-Fi, BLE, or another wireless communication protocol). With further reference to FIG. 2, the A/V device 202 may include a processor(s) 210, a communication component 212 (e.g., network interface, communication component, etc.), a camera 214, a computer vision module 216, a light sensor 218, an audio CODEC (coder-decoder) 220, volatile memory 222, and non-volatile memory 224. The processor(s) 210 (alternatively referred to herein as a "CPU," a "controller," and/or a "microcontroller") may comprise an integrated circuit including a processor core, memory, and programmable input/output peripherals. The processor(s) 210 may receive input signals, such as data and/or power, from the camera 214, motion sensor(s) 226, light sensor 218, microphone(s) 228, speaker(s) 220, and/or the communication component 212, and may perform various functions as described in the present disclosure. In various embodiments, when the processor(s) 210 is triggered by the motion sensor(s) 226, the camera 214, the speaker(s) 220, the microphone(s) 228, the communication component 212, and/or another component, the processor(s) 210 performs one or more processes and/or functions. For example, when the light sensor 218 detects a low level of ambient light, the light sensor 218 may trigger the processor(s) 210 to enable a night vision camera mode. The processor(s) 210 may also provide data communication between various components such as between the communication component 212 and the camera 214.

With further reference to FIG. 2, the communication component 212 may comprise an integrated circuit including a processor core, memory, and programmable input/output peripherals. The communication component 212 may be operatively connected to the processor(s) 210. In some embodiments, the communication component 212 is configured to handle communication links between the A/V device 202 and other, external devices, external receivers, external transmitters, and/or external transceivers, and to route incoming/outgoing data appropriately. For example, inbound data from an antenna 232 of the communication component 212 may be routed through the communication component 212 before being directed to the processor(s) 210, and outbound data from the processor(s) 210 may be routed through the communication component 212 before being directed to the antenna 232 of the communication component 212. As another example, the communication component 212 may be configured to transmit data to and/or receive data from a remote network device (e.g., the remote system 114 in FIG. 1). The communication component 212 may include wireless 234(a) and wired 234(b) adapters. For example, the communication component 212 may include one or more wireless antennas, radios, receivers, transmitters, and/or transceivers (not shown in FIG. 2 for simplicity) configured to enable communication across one or more wireless networks, such as, without limitation, Wi-Fi, cellular, Bluetooth, Z-Wave, Zigbee, LPWAN(s), and/or satellite networks. The communication component 212 may receive inputs, such as power and/or data, from the camera 214, the processor(s) 210, the button 206 (in embodiments where the A/V device 202 is the video doorbell), the motion sensors 226, a reset button (not shown in FIG. 2 for simplicity), and/or the non-volatile memory 224. The communication component 212 may also include the capability of communicating over wired connections, such as with a signaling device 208. For example, when the button 206 of the video doorbell is pressed, the communication component 212 may be triggered to perform one or more functions, such as to transmit a signal over the wired 234(b) connection to the signaling device 208 (although, in some embodiments, the signal be transmitted over a wireless 234(a) connection to the signaling device) to cause the signaling device 208 to emit a sound (e.g., a doorbell tone, a user customized sound, a ringtone, a seasonal ringtone, etc.). The communication component 212 may also act as a conduit for data communicated between various components and the processor(s) 210.

With further reference to FIG. 2, the A/V device 202 may include the non-volatile memory 224 and the volatile memory 222. The non-volatile memory 224 may comprise flash memory configured to store and/or transmit data. For example, in certain embodiments the non-volatile memory 224 may comprise serial peripheral interface (SPI) flash memory. In some embodiments, the non-volatile memory 224 may comprise, for example, NAND or NOR flash memory. The volatile memory 222 may comprise, for example, DDR2 SDRAM (double data rate type three synchronous dynamic random-access memory). In the embodiment illustrated in FIG. 2, the volatile memory 222 and the non-volatile memory 224 are illustrated as being separate from the processor(s) 210. However, the illustration of FIG. 2 is not intended to be limiting, and in some embodiments the volatile memory 222 and/or the non-volatile memory 224 may be physically incorporated with the processor(s) 210, such as on the same chip. The volatile memory 222 and/or the non-volatile memory 224, regardless of their physical location, may be shared by one or more other components (in addition to the processor(s) 210) of the present A/V device 202.

With further reference to FIG. 2, the A/V device 202 may include the camera 214. The camera 214 may include an image sensor 236. The image sensor 236 may include a video recording sensor and/or a camera chip. In one aspect of the present disclosure, the imager sensor 236 may comprise a complementary metal-oxide semiconductor (CMOS) array and may be capable of recording high definition (e.g., 722 p, 1800 p, 4K, etc.) video files. The camera 214 may include a separate camera processor (not shown in FIG. 2 for simplicity), or the processor(s) 210 may perform the camera processing functionality. The processor(s) 210 (and/or camera processor) may include an encoding and compression chip. In some embodiments, the processor(s) 210 (and/or the camera processor) may comprise a bridge processor. The processor(s) 210 (and/or the camera processor) may process video recorded by the image sensor 236 and/or audio recorded by the microphone(s) 228, and may transform this data into a form suitable for transfer by the communication component 212 to the remote system 114. In various embodiments, the camera 214 also includes memory, such as volatile memory that may be used when data is being buffered or encoded by the processor(s) 210 (and/or the camera processor). For example, in certain embodiments the camera memory may comprise synchronous dynamic random-access memory (SD RAM).

The camera 214 may further include an IR cut filter 238 that may comprise a system that, when triggered, configures the image sensor 236 to see primarily infrared light as opposed to visible light. For example, when the light sensor 218 detects a low level of ambient light (which may comprise a level that impedes the performance of the image sensor 236 in the visible spectrum), the light emitting components may shine infrared light through an enclosure of the A/V device 202 out to the environment, and the IR cut filter 238 may enable the image sensor 236 to see this infrared light as it is reflected or refracted off of objects within the field of view of the doorbell. This process may provide the A/V device with the "night vision" function mentioned above.

With further reference to FIG. 2, the A/V device 202 may comprise the light sensor 218 and the one or more light-emitting components 240, such as LED's. The light sensor 218 may be one or more sensors capable of detecting the level of ambient light of the surrounding environment in which the A/V device 202 may be located. The light-emitting components 240 may be one or more light-emitting diodes capable of producing visible light and/or invisible (e.g., IR) light when supplied with power (e.g., to enable night vision). In some embodiments, when activated, the light-emitting components 240 illuminates a light pipe. In some examples, when the A/V device 202 is activated, the light-emitting components 240 emit light.

The A/V device 202 may further include one or more speaker(s) 220 and/or one or more microphone(s) 228. The speaker(s) 220 may be any electromechanical device capable of producing sound in response to an electrical signal input. The microphone(s) 228 may be an acoustic-to-electric transducer or sensor capable of converting sound waves into an electrical signal. In some embodiments, the A/V device 202 may include two or more microphone(s) 228 that are spaced from one another (e.g., located on different sides of the A/V device 202) to provide noise cancelling and/or echo cancelling for clearer audio. The speaker(s) 220 and/or microphone(s) 228 may be coupled to an audio CODEC 220 to enable digital audio received by client devices to be decompressed and output by the speaker(s) 220 and/or to enable audio data captured by the microphone(s) 228 to be compressed into digital audio data. The digital audio data may be received from and transmitted to client devices using the communication component 212 (in some embodiments, through one or more intermediary devices such as the hub device 112, the remote system 114, etc.). For example, when a visitor (or intruder) who is present in the area about the A/V device 202 speaks, sound from the visitor (or intruder) is received by the microphone(s) 228 and compressed by the audio CODEC 220. Digital audio data is then sent through the communication component 212 to the network(s) 120 and routed by the remote system 114 to the client device.

With further reference to FIG. 2, the A/V device 202 may be battery powered using a battery 242 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 242 may not be included. In embodiments that include the battery 242, the A/V device 202 may include an integrated circuit (not shown) capable of arbitrating between multiple voltage rails, thereby selecting the source of power for the A/V device 202. The A/V device 202 may have separate power rails dedicated to the battery 242 and the AC power source. In one aspect of the present disclosure, the A/V device 202 may continuously draw power from the battery 242 to power the A/V device 202, while at the same time routing the AC power to the battery, thereby allowing the battery 242 to maintain a substantially constant level of charge. Alternatively, the A/V device 202 may continuously draw power from the AC power to power the doorbell, while only drawing from the battery 242 when the AC power is low or insufficient. Still, in some embodiments, the battery 242 comprises the sole source of power for the A/V device 202. In such embodiments, the components of the A/V device 202 (e.g., spring contacts, connectors, etc.) are not be connected to a source of AC power. When the battery 242 is depleted of its charge, it may be recharged, such as by connecting a power source to the battery 242 (e.g., using a USB connector).

Although not illustrated in FIG. 2, in some embodiments, the A/V device 202 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 202 so as to reduce interference from heat, pressure, moisture, and/or other stimuli generated by the internal components of the A/V device 202.

With further reference to FIG. 2, the A/V device 202 may include one or more motion sensor(s) 226. However, in some embodiments, the motion sensor(s) 226 may not be included, such as where motion detection is performed by the camera 214 or another device. The motion sensor(s) 226 may be any type of sensor capable of detecting and communicating the presence of an entity within their field of view. As such, the motion sensor(s) 226 may include one or more (alone or in combination) different types of motion sensors. For example, in some embodiments, the motion sensor(s) 226 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 210, for example, to one or more threshold voltage values to determine if the amount of voltage in the output signal is indicative of motion, and/or if the amount of voltage in the output signal is indicative of motion of an entity that is to be captured by the camera 214 (e.g., motion of a person and/or animal may prompt activation of the camera 214, while motion of a vehicle may not). Although the above discussion of the motion sensor(s) 226 primarily relates to PIR sensors, depending on the embodiment, the motion sensor(s) 226 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 226 of the A/V device 202.

In some embodiments, computer vision module(s) (CVM) 216 may be included in the A/V device 202 as the motion sensor(s) 226, in addition to, or alternatively from, other motion sensor(s) 226. For example, the CVM 216 may be a low-power CVM (e.g., Qualcomm Glance) that, by operating at low power (e.g., less than 2 mW of end-to-end power), is capable of providing computer vision capabilities and functionality for battery powered devices (e.g., the A/V device 202 when powered by the battery 242). The low-power CVM may include a lens, a CMOS image sensor, and a digital processor that may perform embedded processing within the low-power CVM itself, such that the low-power CVM may output post-processed computer vision metadata to the processor(s) 210 (e.g., via a serial peripheral bus interface (SPI)). As such, the low-power CVM may be considered to be one or more of the motion sensor(s) 226, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 202, etc. In various embodiments, the motion sensor(s) 226 include a plurality of different sensor types capable of detecting motion such as PIR, AIR, low-power CVM, and/or cameras.

As indicated above, the A/V device 202 may include the CVM 216 (which may be the same as the above described low-power CVM 216 implemented as one or more motion sensor(s) 226, or may be additional to, or alternative from, the above described low-power CVM 216). In addition, although the CVM 216 is only illustrated as a component of the A/V device 202, the computer vision module 216 may additionally, or alternatively, be included as a component of the hub device 112, the remote system 114, and/or another device. With respect to the A/V device 202, the CVM 216 may include any of the components (e.g., hardware) and/or functionality described herein with respect to computer vision, including, without limitation, one or more cameras, sensors, and/or processors. In some of the present embodiments, with reference to FIG. 2, the microphone(s) 228, the camera 214, the processor(s) 210, and/or the image sensor 226 may be components of the CVM 216. In some embodiments, the CVM 216 may include an internal camera, image sensor, and/or processor, and the CVM 216 may output data to the processor(s) 210 in an output signal, for example.

As a result of including the CVM 216, some of the present embodiments may leverage the CVM 216 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—A person instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 216). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe people. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 2, the CVM 216, and/or the camera 214 and/or the processor(s) 210 may receive information about the person using any one, or any combination of more than one, of the foregoing biometrics.

With further reference to FIG. 2, in embodiments the A/V device 202 may include an input device, such as the button 206. In embodiments where the button 206 is a mechanical button (e.g., has a range of movement), the button 206 may make contact with a button actuator located within the A/V device 202 when the button 206 is pressed. In embodiments where the button 206 is not mechanical (e.g., has no range of motion), the button 206 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 206 is pressed, touched, and/or otherwise triggered, the processor(s) 210 may receive an output signal from the button 206 that may activate one or more functions of the A/V device 202, such as transmitting an output signal, using the communication component 212, to the signaling device 208 to cause the signaling device 208 to output a sound (e.g., via the wired 234(b) connection to the signaling device 208 and/or a wireless 234(a) connection to the signaling device 208). In addition, the processor(s) 210 may transmit an output signal (e.g., a notification), using the communication component 212, to client device(s) to indicate to the user(s) of the client device(s) that a person is present at the A/V device 202.

In some examples, the A/V device 202 may include a sensor 244. The sensor 244 may comprise an accelerometer, a gyroscope, a magnetometer, and/or a glass break detector. An accelerometer may detect acceleration of the A/V device 202. A gyroscope may detect an orientation and/or an angular velocity of the A/V device 202. A magnetometer may detect a magnetism for the A/V device 202. A glass break detector may detect noise or vibrations. In some examples, the glass break detector uses the microphone(s) 228.

Although the A/V device 202 is referred to herein as an "audio/video" device, the A/V device 202 need not have both audio and video functionality. For example, in some embodiments, the A/V device 202 may not include the speakers 220, microphones 228, and/or audio CODEC. In such examples, the A/V device 202 may only have video recording and communication functionalities. In other examples, the A/V device 202 may only have the speaker(s) 220 and not the microphone(s) 228, or may only have the microphone(s) 228 and not the speaker(s) 220.

With further reference to FIG. 2, in some embodiments the A/V device 202 may include a viewer 246. As discussed in further detail below, the viewer 246 may be part of the A/V device 202 or may be a separate element configured to attach to the A/V device 202, and/or an opening in a barrier.

Although not illustrated in FIG. 2, in some embodiments, the A/V device 202 may include a light controller and/or one or more lights. The light controller may include a switch for controlling the lights. For example, in response to the motions sensor(s) 226 and/or the camera 214 detecting motion, the light controller may receive an output signal from the processor(s) 210 that causes the light controller to activate the one or more lights. In some embodiments, a light camera may include motion sensor(s) 226 detecting motion for controlling activation of the lights, and may further include the camera 214 for detecting motion for activating the recording of the image data using the camera 214 and/or the recording of the audio data using the microphone(s) 228. In other embodiments, the motion sensor(s) 226 may detect the motion for activating the lights, the camera 214, and the microphone(s) 228, or the camera 214 may detect the motion for activating the lights, the camera 214 to being recording the image data, and the microphone(s) 228 to being recording the audio data. The lights may include floodlights, spotlights, porch lights, or another type of illumination device. The lights may provide for better image data quality when ambient light levels are low (e.g., at dusk, dawn, or night), while also providing a deterrent effect by being illuminated when motion is detected.

FIGS. 3A-3D are example functional block diagrams illustrating further embodiments of the A/V device 202, according to various aspects of the present disclosure. In some embodiments, the A/V device 202 may omit one or more of the components shown in FIG. 2 or FIGS. 3A-3D, and/or may include one or more additional components not shown in FIG. 2 or FIGS. 3A-3D.

As shown in FIG. 3A-3D, the A/V device 202 includes memory 302, which may represent the volatile memory 222 and/or the non-volatile memory 224 (FIG. 2). The memory 302 stores a device application 304. In various embodiments, the device application 304 may include instructions that cause the processor(s) 210 to capture image data 306 using the camera 214, audio data 308 using the microphone(s) 228, input data 310 using the button 206 (and/or the camera 214 and/or the motion sensor(s) 226, depending on the embodiment), and/or motion data 312 using the camera 214 and/or the motion sensor(s) 226. In some embodiments, the device application 304 may also include instructions that cause the processor(s) 210 to generate text data 314 describing the image data 306, the audio data 308, and/or the input data 310, such as in the form of metadata, for example.

In addition, the device application 304 may include instructions that cause the processor(s) 210 to transmit the image data 306, the audio data 308, the motion data 312, the input data 310, the text data 314, and/or notification(s) 316 to the hub device 112, the remote system 114, a client device, and/or another device using the communication component 212. In various embodiments, the device application 304 may also include instructions that cause the processor(s) 210 to generate and transmit an output signal 318 that may include the image data 306, the audio data 308, the text data 314, the input data 310, and/or the motion data 312. In some of the present embodiments, the output signal 318 may be transmitted to the hub device 112, the remote system 114, a client device, and/or another device using the communication component 212. The remote system 114 may then transmit (or forward) the output signal 318 to the client device, and/or the hub device 112 may then transmit (or forward) the output signal 318 to the client device, and/or the hub device 112 may then transmit (or forward) the output signal 318 to the remote system 114, and the remote system 114 may then transmit (or forward) the output signal 318 to the client device. In other embodiments, the output signal 318 may be transmitted directly to the client device by the A/V device 202.

In further reference to FIGS. 3A-3D, the image data 306 may comprise image sensor data such as (but not limited to) exposure values and data regarding pixel values for a particular sized grid. The image data 306 may include still images, live video, and/or pre-recorded images and/or video. The image data 306 may be recorded by the camera 214 in a field of view of the camera 214. The image data 306 may be representative of (e.g., depict) a physical environment in a field of view of the camera 214. In some embodiments, the physical environment may include one or more objects (e.g., persons, vehicles, animals, items, etc.), and the image data 306 may be representative of the one or more objects, such as the one or more objects within the physical environment.

In further reference to FIGS. 3A-3D, the motion data 312 may comprise motion sensor data generated in response to motion events. For example, the motion data 312 may include an amount or level of a data type generated by the motion sensor(s) 226 (e.g., the voltage level output by the motion sensor(s) 226 when the motion sensor(s) 226 are PIR type motion sensor(s)). In some of the present embodiments, such as those where the A/V device 202 does not include the motion sensor(s) 226, the motion data 312 may be generated by the camera 214. In such embodiments, based on a frame by frame comparison of changes in the pixels from the image data 306, it may be determined that motion is present.

The input data 310 may include data generated in response to an input to the button 206. The button 206 may receive an input (e.g., a press, a touch, a series of touches and/or presses, etc.) and may generate the input data 310 in response that is indicative of the type of input. In embodiments where the A/V device 202 is not a doorbell, the A/V device 202 may not include the button 206, and the A/V device 202 may not generate the input data 310.

With further reference to FIGS. 3A-3D, a notification 316 may be generated by the processor(s) 210 and transmitted, using the communication component 212, to the hub device 112, the remote system 114, a client device, and/or another device. For example, in response to detecting motion using the camera 214 and/or the motion sensor(s) 226, the A/V device 202 may generate and transmit the notification 316. In some of the present embodiments, the notification 316 may include at least the image data 306, the audio data 308, the text data 314, and/or the motion data 312.

As described herein, the notification(s) 316 may include messages, signals, data, notifications, and/or any type of electronic communication that electronic devices (e.g., the A/V device 202, the hub device 112, the remote system 114, a client device, and/or another device) may transmit and receive with other electronic devices (e.g., the A/V device 202, the hub device 112, the remote system 114, a client device, and/or another device). For instance, notification(s) 316 may include push notifications, email messages, short message service (SMS) messages, multimedia messages (MMS), voicemail messages, video signals, audio signals, data transmissions, and/or any other type of electronic communication that an electronic device can send to another electronic device.

The image data 306, the audio data 308, the text data 314, and/or the motion data 312 may be tagged with (e.g., a time stamp, based on clock data) and/or stored separately (e.g., on the remote system 114, the hub device 112, and/or the A/V device 202) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 306, audio data 308, text data 314, and/or motion data 312 representative of the detection of motion, or motion event. As a result, when a request for data pertaining to particular motion event, or a particular time period, is received (e.g., by a client device, the remote system 114, the hub device 112, and/or another device), the image data 306, the audio data 308, the text data 314, and/or the motion data 312 associated with a particular motion event, and/or associated with motion event(s) within the particular time period, may be transmitted, retrieved, and/or received.

Although examples discuss the A/V device 202 generating and/or transmitting the image data 306, the audio data 308, the text data 314, and/or the motion data 312 when motion is detected (e.g., in the notification 316 or otherwise), in other examples the data may be generated and/or transmitted at other times. For example, the image data 306, the audio data 308, the text data 314, and/or the motion data 312 may be generated and transmitted continuously (e.g., in a streaming manner), periodically, upon request, etc. In examples where the image data 306, the audio data 308, the text data 314, and/or the motion data 312 may be generated and transmitted continuously, the detection of motion (e.g., a motion event) may cause an indication of when the motion was detected (e.g., a time stamp) and/or how long the motion was detected for (e.g., a duration) to be associated with the image data 306, the audio data 308, the text data 314, and/or the motion data 312. As a result, even though the image data 306, the audio data 308, the text data 314, and/or the motion data 312 may be continuously generated by the A/V device 202, the image data 306, the audio data 308, the text data 314, and/or the motion data 312 associated with motion events may be tagged and/or stored separately (e.g., similar to that of the image data 306, the audio data 308, the text data 314, and/or the motion data 312 generated in response to the detection of motion), from the image data 306, the audio data 308, the text data 314, and/or the motion data 312 that is not associated with motion events. Additionally, or alternatively, in some examples, the A/V device 202 may generate and/or transmit the image data 306, the audio data 308, the text data 314, and/or the motion data 312 when more than a threshold amount of movement or vibration is detected, when a change to an orientation of the A/V device 202 is detected, etc.

In some examples, the sensor 244 may generate sensor data 320 that is stored in the memory 302. The device application 304 may include instructions that cause the processor(s) 210 to analyze the sensor data 320 when the sensor data 320 is received from the sensor 244 and/or at any other time. For example, the device application 304 may analyze the sensor data 320 to detect more than a threshold amount of movement or vibration of the A/V device 202 (e.g., indicating that a barrier or other surface to which the A/V device 202 is mounted has experienced movement or vibration), detect a change in orientation of the A/V device 202 (e.g., indicating that a barrier or other surface to which the A/V device 202 is mounted has experienced a change in orientation), etc. To illustrate, a threshold amount of movement, vibration, or change in orientation may be detected when the sensor data 320 includes acceleration values from an accelerometer that are greater than a threshold (e.g., indicating that more than a threshold amount of acceleration occurred), when the sensor data 320 includes orientation and/or angular velocity values from a gyroscope that are greater than a threshold (e.g., indicating that an orientation or angular velocity of the A/V device 202 has changed by more than a threshold amount), when the sensor data 320 includes values from a magnetometer that indicate more than a threshold amount of a change in a direction, strength, etc. of a magnetic field, when the sensor data 320 includes noise or vibration values from a glass break detector that are greater than a threshold (e.g., indicating that more than a threshold amount of noise or vibration was detected), and so on.

In some examples, the device application 304 may detect that a barrier attached to the A/V device 202 has opened or closed. To illustrate, if the A/V device 202 detects a resting position for more than a threshold amount of time (e.g., based on not receiving a change in data or any data at all from the sensor 244), the A/V device 202 may determine that a door to which the A/V device 202 is attached is closed. Thereafter, if the A/V device 202 detects a threshold amount of movement, vibration, and/or change in orientation, the A/V device 202 may determine that the door is being opened. When the movement, vibration, and/or change in orientation ceases, the A/V device 202 may determine that the door is open. Further, when the A/V device 202 determines movement, vibration, and/or change in orientation again (and in an opposite direction), the A/V device 202 may determine that the door is being closed.

In some examples, the A/V device 202 includes a first component 322 (which may represent, and/or be similar to, the exterior component 102A), a second component 324 (which may represent, and/or be similar to, the interior component 102B), the viewer 246 (which may represent, and/or be similar to, the viewer 102C), a flexible connector 326, fastener(s) 328, and ring(s) 330. In some examples, the first component 322 may be mounted on one side of a barrier, while the second component 324 may be mounted on a second side of the barrier.

The viewer 246 may include a passage extending through a middle of the viewer 246. For example, the viewer 246 may have an elongated tubular shape or other shape with a hollow center. In some examples, the viewer 246 may include a len(s) disposed within the passage. The viewer 246 may be part of the first component 322 and/or the second component 324, or may be a separate element attachable to the first component 322, the second component 324, and/or an opening in a barrier. The viewer 246 may be formed of a variety of substances, such as metal (e.g., steel, aluminum, copper, titanium, etc.), plastic, etc. The viewer 246 may be a variety of sizes, such as 68 mm, 50 mm, 60 mm, 70 mm, 80 mm, etc. In some examples, the viewer 246 may fit a door thickness between 34 and 56 mm. In other examples, other door thicknesses may be met.

The flexible connector 326 may mechanically couple and/or electrically couple the first component 322 to the second component 324. For example, the flexible connector 326 may allow power to be provided from the second component 324 (e.g., the battery 242) to the first component 322, or vice versa. Further, the flexible connector 326 may allow one or more elements of the first component 322 to communicate with one or more elements of the second component 324 (e.g., may provide a communicate channel). In some examples the first component 322 and the second component 324 may communicate wirelessly (e.g., over a wireless channel). The flexible connector 326 may comprise a wire, a cable (e.g., USB cable, HDMI cable, power cable, etc.), flexible electronics (e.g., a flex printed circuit board (PCB), also referred to as flex cord, etc.), and so on.

The fastener(s) 328 may connect the viewer 246 to the first component 322 and/or to the second component 324. The fastener(s) 328 may take various forms, such as a bolt, screw, washer, nut, button, clip, flange, staple, pin, nail, latch, rivet, a nut, etc. Although the fastener(s) 328 is discussed in many examples, in other examples other forms are used to join the viewer 246, the first component 322, and/or the second component 324, such as an adhesive (e.g. glue, cement, etc.), welding, soldering, brazing, crimping, etc.

In some examples, the A/V device 202 may further include ring(s) 330 that enhance the fire safety of the A/V device 202. For instance, the first component 322 may include a first fire-resistant ring 330 interposed between a first portion of the first component 332 (e.g., a fastener 328 of the first component 328) and the exterior surface of the barrier, and/or the second component 324 may include a second fire-resistant ring 330 interposed between a second portion of the second component (e.g., an fastener 328 and/or the housing of the second component 324) and the interior surface of the barrier. The ring(s) 330 are preferably non-flammable, heat resistant, have a high melting point, and may include a material with a threshold fire rating. In some embodiments, the ring(s) 330 may have melting points of at least 1,220 degrees Fahrenheit, at least 1,710 degrees Fahrenheit, at least 2,750 degrees Fahrenheit, and/or any other minimum temperature. For example, the ring(s) 330 may include, but are not limited to, ceramic and various metals, such as brass, steel, aluminum, etc. As such, if other portions of the A/V device 202 melt during a fire, the ring(s) 330 may help to sustain the structural integrity of the barrier viewer such that the fire cannot travel from one side of the barrier to the other side of the barrier through the opening in the barrier that contains the viewer.

Figure 3A:
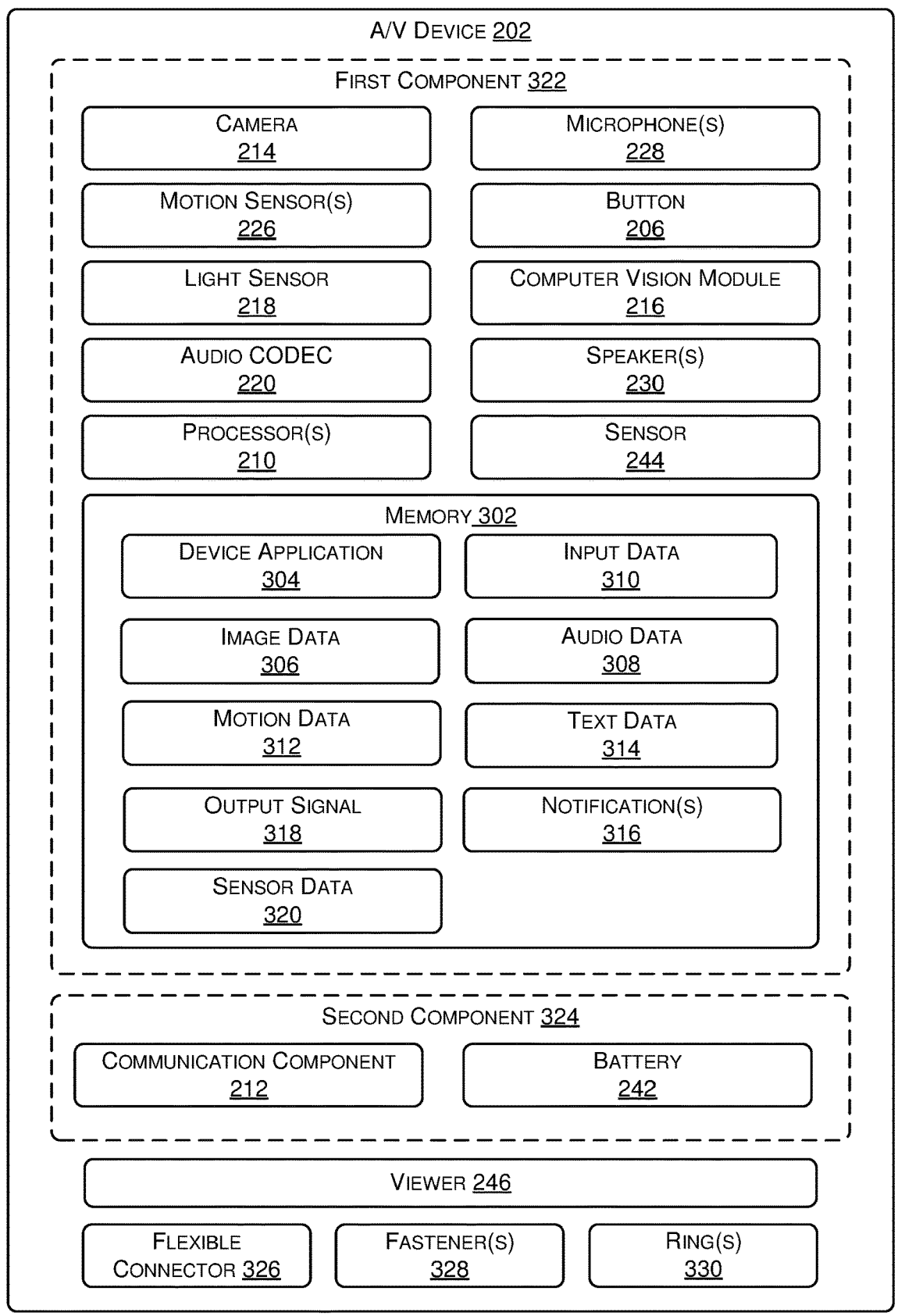
FIGS. 3A-3D are functional block diagrams illustrating example embodiments of A/V devices, according to various aspects of the present disclosure.

The components of the A/V device 202 may be arranged in a variety of manners. In one example, as illustrated in FIG. 3A, the first component 322 includes the camera 214, the microphone(s) 228, the motion sensor(s) 226, the button 206, the light sensor 218, the computer vison module 216, the audio codec 220, the speaker(s) 230, the sensor 244, the processor(s) 210, and the memory 302. The second component 324 may include the communication component 212 and the battery 242. The battery 242 may provide power to the first component 322 and/or the second component 324.

Figure 3B:
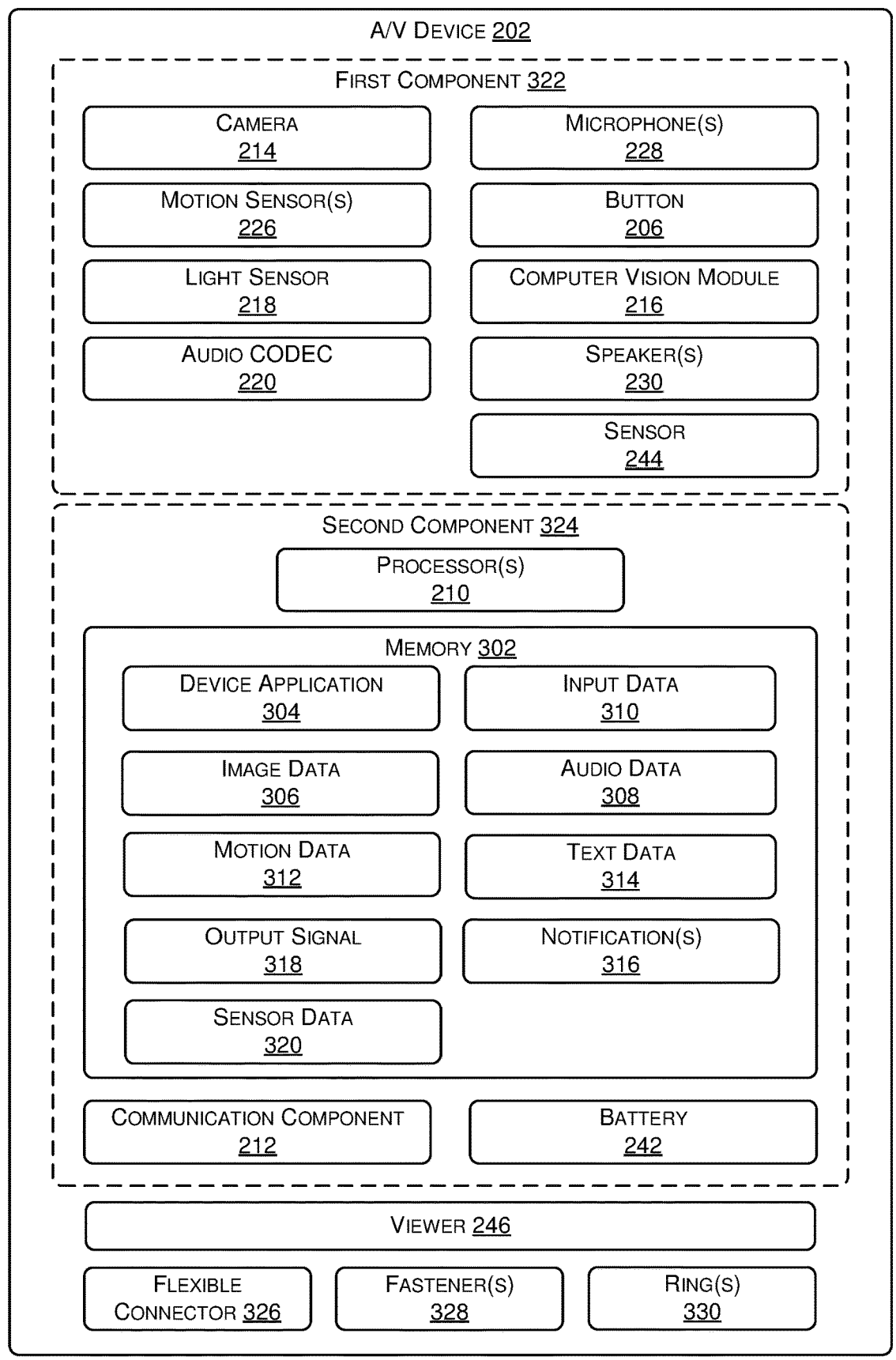

In another example, as illustrated in FIG. 3B, the first component 322 includes the camera 214, the microphone(s) 228, the motion sensor(s) 226, the button 206, the light sensor 218, the computer vison module 216, the audio codec 220, the speaker(s) 230, and the sensor 244. In this example, the second component 324 may include the processor(s) 210, the memory 302, the communication component 212, and the battery 242. The battery 242 may provide power to the first component 322 and/or the second component 324.

Figure 3C:
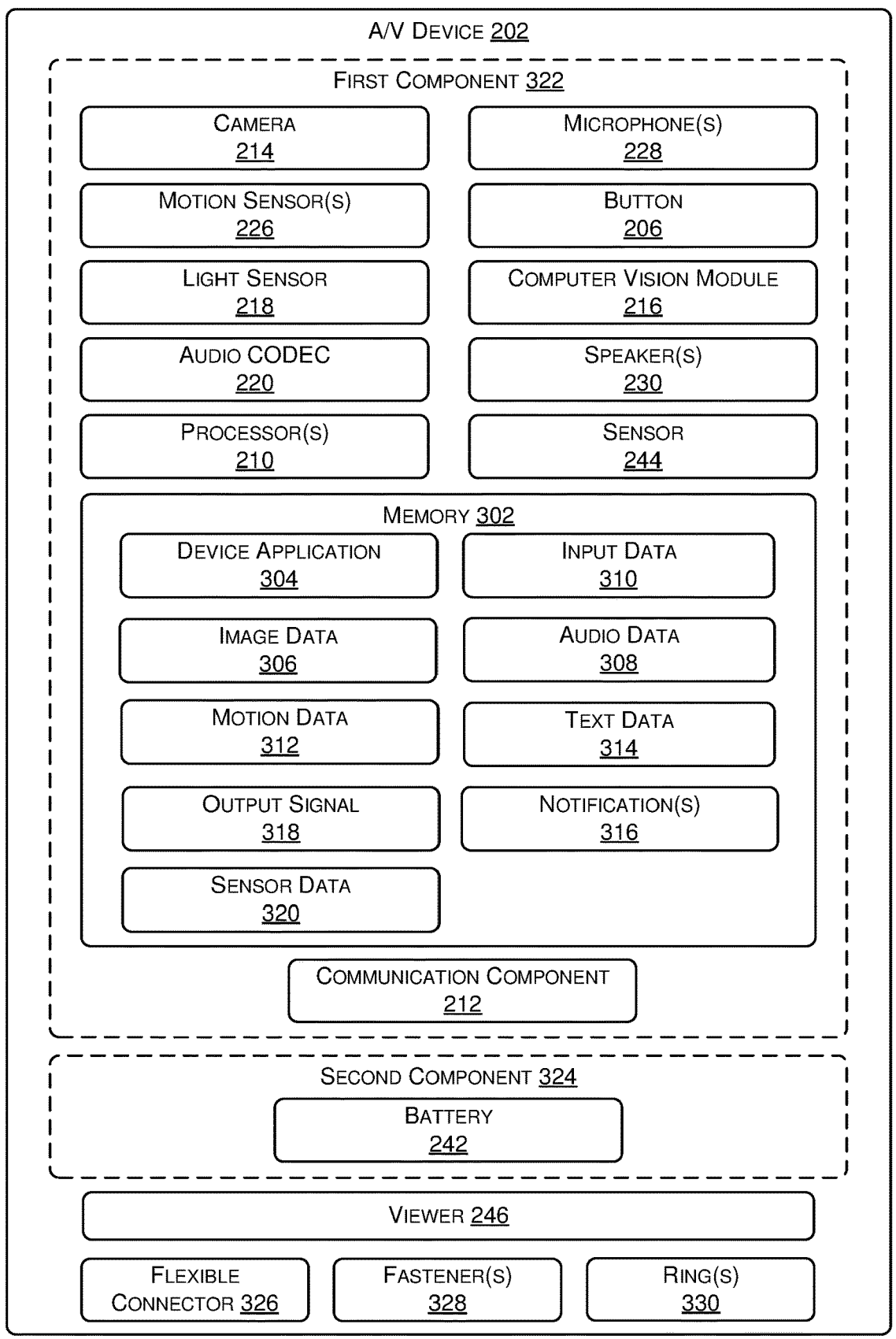

In yet another example, as illustrated in FIG. 3C, the first component 322 includes the camera 214, the microphone(s) 228, the motion sensor(s) 226, the button 206, the light sensor 218, the computer vison module 216, the audio codec 220, the speaker(s) 230, the sensor 244, the processor(s) 210, the memory 302, and the communication component 212. In this example, the second component 324 may include the battery 242. The battery 242 may provide power to the first component 322 and/or the second component 324.

Figure 3D:
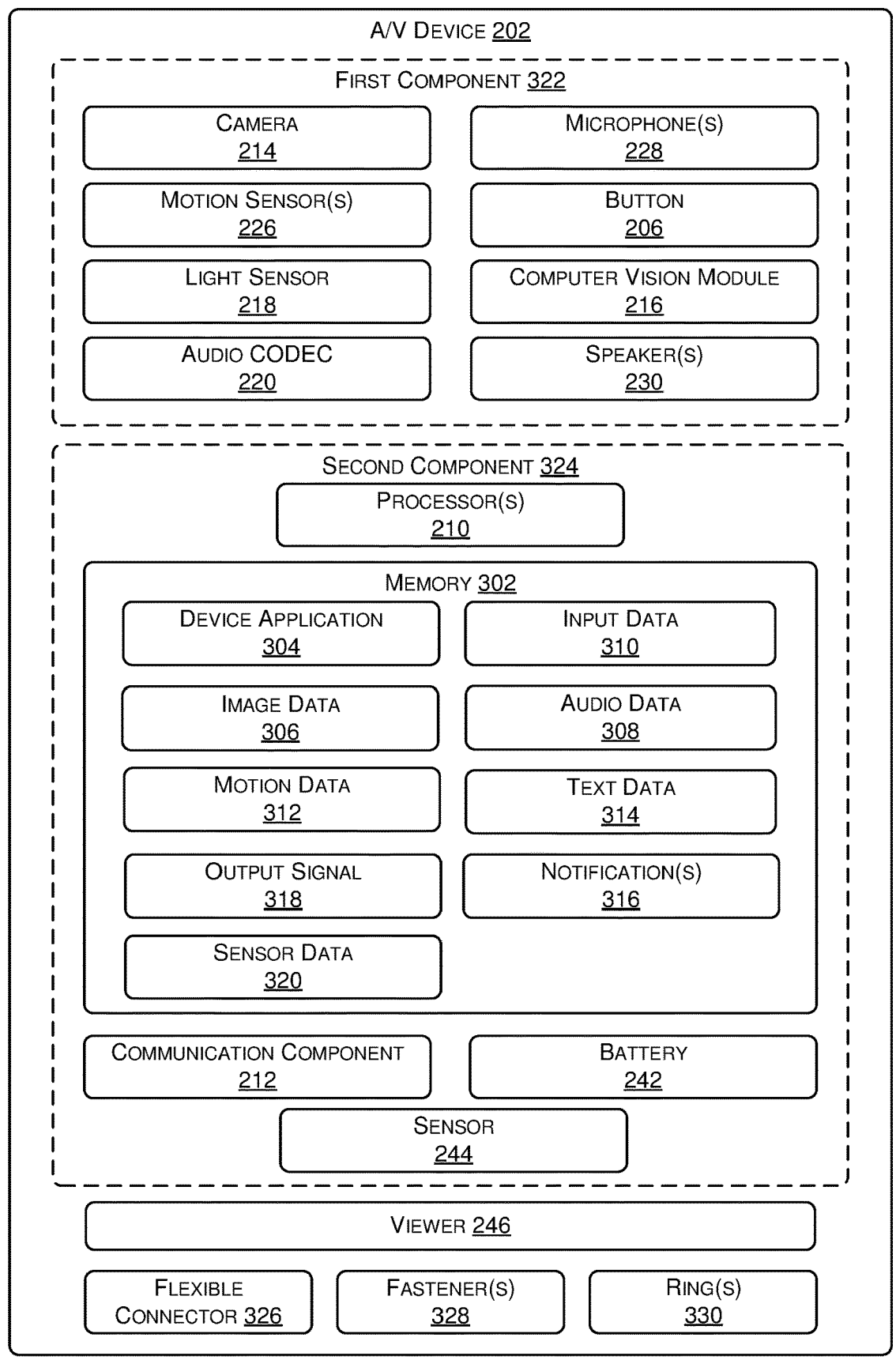

In a further example, as illustrated in FIG. 3D, the first component 322 includes the camera 214, the microphone(s) 228, the motion sensor(s) 226, the button 206, the light sensor 218, the computer vison module 216, the audio codec 220, and the speaker(s) 230. In this example, the second component 324 may include the processor(s) 210, the memory 302, the communication component 212, the battery 242, and the sensor 244. The battery 242 may provide power to the first component 322 and/or the second component 324.

In some examples, the first component 322 and the second component 324 each include memory and one or more processors.

Figure 4A:
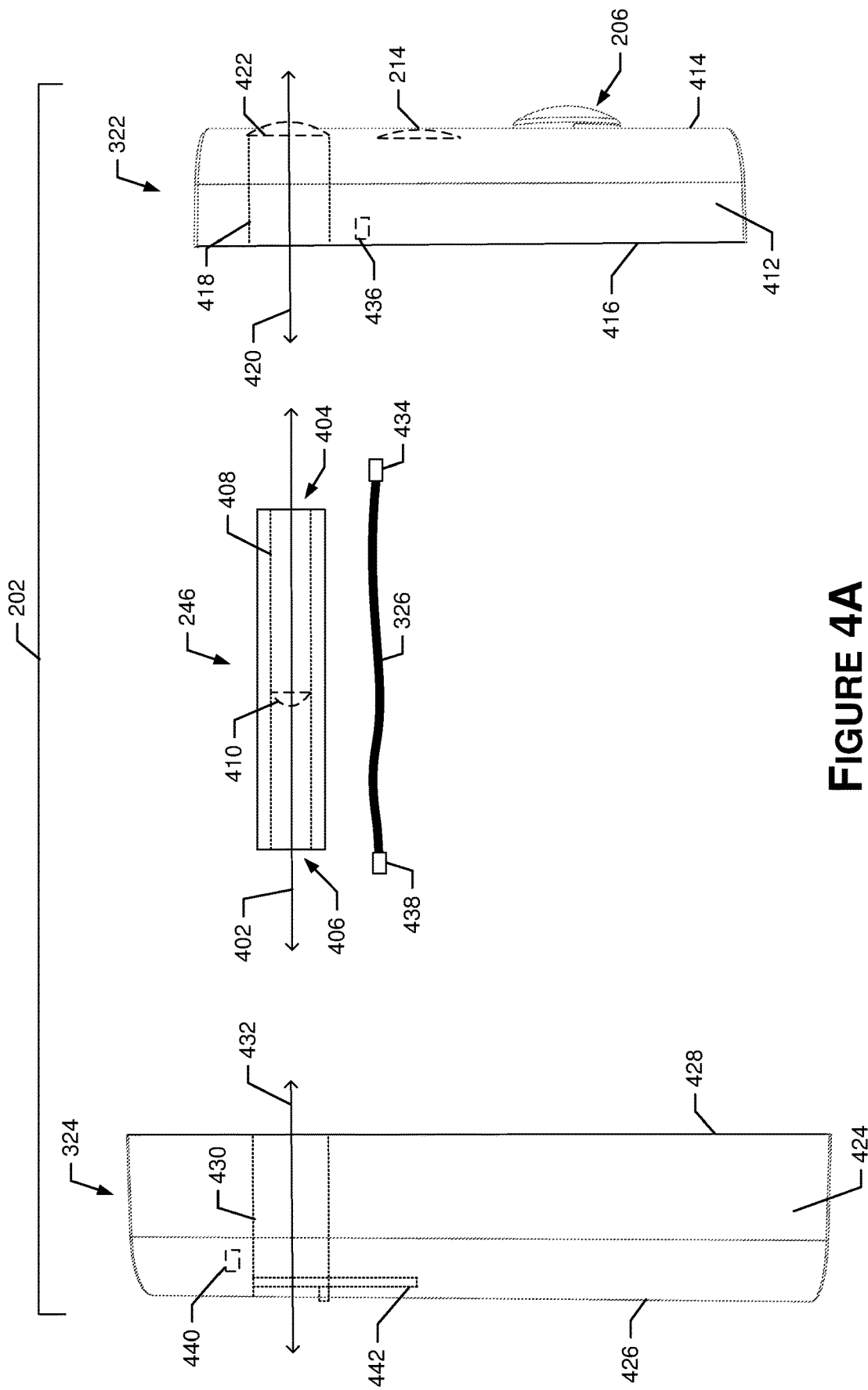
FIGS. 4A-4C are exploded side views of an example A/V device with a viewer, according to various aspects of the present disclosure.

FIG. 4A is an exploded side views of an example A/V device 202, according to various aspects of the present disclosure. In particular, the first component 322 (sometimes referred to as an "electronic device 322"), the second component 324 (sometimes referred to as an "electronic device 324"), and the viewer 246 (sometimes referred to as the "third component 246") have been separated from each other. As illustrated, the viewer 246 may include a first longitudinal axis 402, a first end 404, a second end 406, a passage 408, and a first lens 410. The passage 408 may extend between the first end 404 and the second end 406 along the first longitudinal axis 402. The first lens 410 may be disposed within the passage 408. Although illustrated with the first lens 410 positioned in substantially a middle of the viewer 246, the first lens 410 may be positioned at any location within the passage 408. Further, in some examples, the first lens 410 may be attached to the first end 404 or the second end 406 of the viewer 246. Moreover, in some examples, multiple lenses may be used instead of only the first lens 410. Alternatively, the first lens 410 may be eliminated entirely.

The first component 322 may include a first housing 412 having a first front surface 414 (sometimes referred to as a "front portion") and a first rear surface 416 (sometimes referred to as a "rear portion"). The first rear surface 416 may abut an exterior surface of a barrier, such as a door. As such, the first front surface 414 may be spaced from the exterior surface. The first housing 412 may also include a first opening 418 extending from the first rear surface 416 into the first housing 412 toward the first front surface 414. The first opening 418 may include a second longitudinal axis 420 that, when the A/V device 202 is installed, is substantially aligned (e.g., coaxial) with the first longitudinal axis 402. The first housing 412 may include a second lens 422 proximal the first front surface 414 and defining a base of the first opening 418. In this example, the second lens 422 located behind the first front surface 414. However, in other examples, the second lens 422 may lie on a same plane as the first front surface 414, protrude outward from the first front surface 414, or otherwise be arranged differently than as shown. FIG. 4A also illustrates the button 206 and the camera 214 included with the first component 322.

The second component 324 may include a second housing 424 having a second front surface 426 and a second rear surface 428. The second rear surface 428 may abut an interior surface of the barrier. As such, the second front surface 426 may be spaced from the interior surface of the barrier. The second housing 424 may include a second opening 430 extending from the second rear surface 428 into the second housing 424 toward the second front surface 426. The second opening 430 may include a third longitudinal axis 432 that, when the A/V device 202 is installed, is substantially aligned (e.g., coaxial) with the first longitudinal axis 402.

The first lens 410 and/or the second lens 422 may comprise a door viewer (e.g., to allow a user to view from an inside of the barrier to an outside of the barrier). The second lens 422 may be implemented as a variety of types of lenses, such as an ultra-wide-angle lens (e.g., a fisheye lens with an angle of view greater than 100 degrees, between 100 and 180 degrees, greater than 200 degrees, etc.), a wide-angle lens (e.g., with an angle of view between 64 and 84 degrees, greater than 60 degrees, etc.), or any other lens that may or may not be wide-angle.

The A/V device 202 may also include the flexible connector 326 electrically and communicatively coupling the first component 322 to the second component 324. The flexible connector 326 may extend from the first component 322 to the second component 324 through an opening in a barrier. As noted above, the flexible connector 326 may be a wire, a cable (e.g., USB cable, HDMI cable, power cable, etc.), flexible electronics (e.g., a flex printed circuit board (PCB)), and so on. The flexible connector 326 may include a first coupler 434 for connection to a first connection port 436 on the first component 322 and a second coupler 438 for connection to a second connection port 440 on the second component 324. The first coupler 434, the second coupler 438, the first connection port 436, and/or the second connection port 440 may be implemented in a variety of manners, such as through a 20-pin connection, a 24-pin connection, an n-pin connection, a USB connection, etc.

As further illustrated in FIG. 4A, the second component 324 may include a shutter 442. In various embodiments, the shutter 442 may be located within the second housing 424, such as within the removable front portion 424(A). As described below with reference to FIGS. 5A-5B, the shutter 442 is movable between a first position in which the shutter 442 covers the second end 406 of the viewer 246, thereby blocking the view through the viewer 246, and a second position in which the shutter 442 does not cover the second end 406 of the viewer 246. In other words, when the shutter 442 is in the first position, the A/V device 202 allows the user located inside the barrier to view the area outside the barrier by looking through the viewer 246. However, when the shutter 442 is in the second position, the A/V device 202 does not allow the user to see through the viewer 246. For example, and as described below with reference to FIGS. 5A-5B and 6A-6B, the shutter 442 may be seated within a track inside the removable front portion 424(A), and may be slidable within the track between the first position and the second position.

Figure 4B:
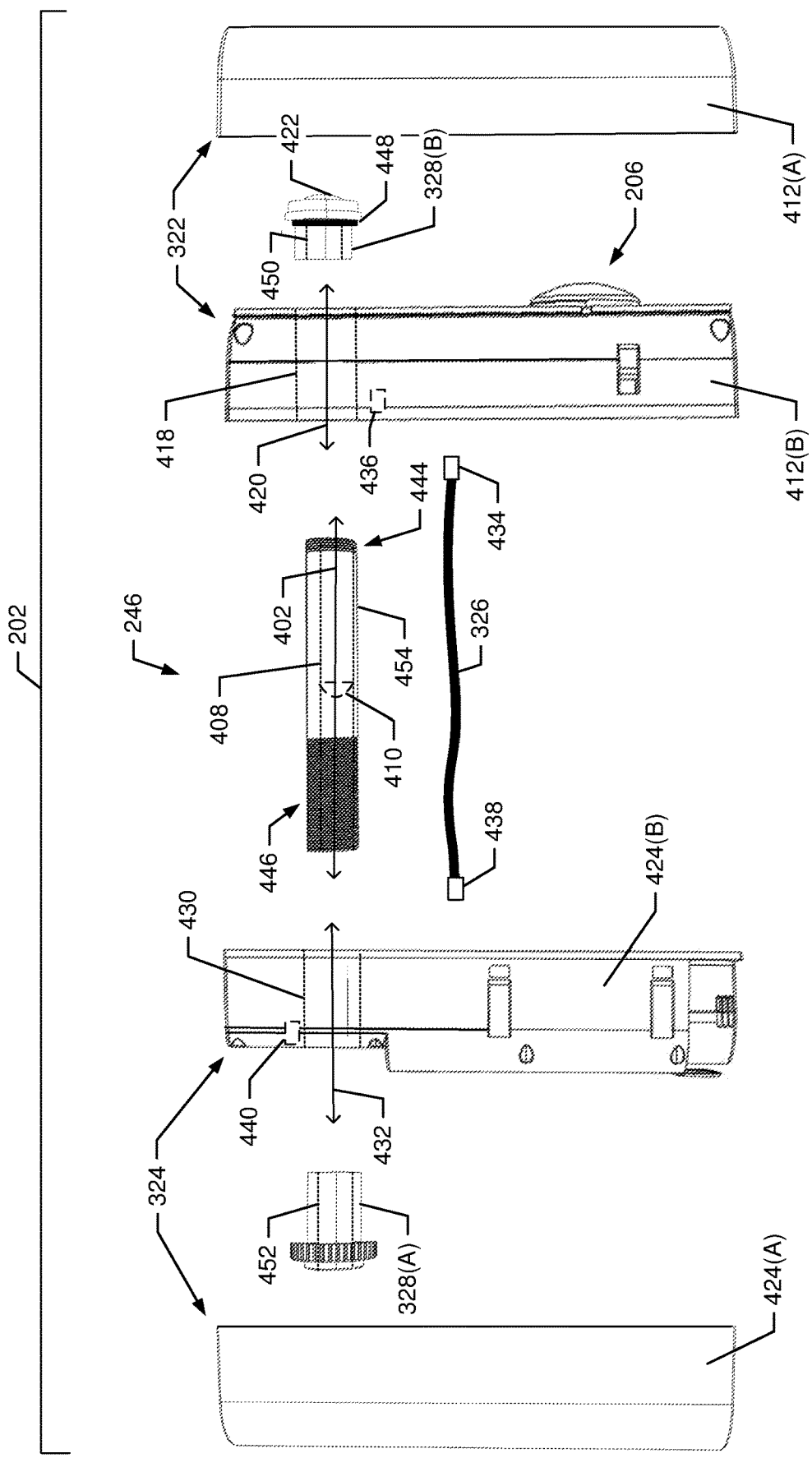

FIG. 4B is another exploded side view of the A/V device 202, according to various aspects of the present disclosure. In particular, the first component 322, the second component 324, and the viewer 246 have been separated from each other. Here, a front portion 412(A) of the first housing 412 is removed from a rear portion 412(B) of the first housing 412 and a front portion 424(A) of the second housing 424 is removed from a rear portion 424(B) of the second housing 424.

As illustrated, the viewer 246 may include the first longitudinal axis 402 with the first lens 410 disposed within the passage 408. Here, the viewer 246 comprises an elongated tubular member. The second lens 422 may be detachably coupled to a first part 444 of the viewer 246. In this example, the second lens 422 includes female threading and the first part 444 of the viewer 246 includes male threading, although in other embodiments the threading may be reversed. Further, the fastener 328(A) may be detachably coupled to a second part 446 of the viewer 246. In this example, the fastener 328 includes female threading and the second part 446 of the viewer 246 includes male threading, although in other embodiments the threading may be reversed.

The first component 322 may include the first housing 412 having the first opening 418 (also referred to as "second passage 418") extending through the first component 322 (e.g., through the rear portion 412(B) of the first housing 412) along the second longitudinal axis 420. The first component 322 may be removably secured to the viewer 246 such that, when the A/V device 202 is installed, the second longitudinal axis 420 is substantially aligned (e.g., coaxial) with the first longitudinal axis 402 of the viewer 246 and/or the second lens 422 defines a base of the first opening 418. In some examples, at least a portion of the viewer 246 extends into the first opening 418. For example, at least the first part 444 of the viewer 246 may extend into the first opening 418 to attach to the second lens 422 within the first opening 418.

As illustrated, the first component 322 includes a fastener 328(B). The fastener 328(B) may include a gasket 448 may be detachably coupled between the second lens 422 and the first housing 412. In particular, the gasket 448 may be part of the second lens 422, placed over the second lens 422, and/or placed on the rear portion 412(B) of the first housing 412. The gasket 448 may provide a seal to prevent water or other substances from traveling into the viewer 246. In some examples, the gasket 448 comprises a resilient O-ring. As shown, the second lens 422 may include a passage 450 extending through substantially a center of the second lens 422. When the second lens 422 is attached to the viewer 246, the passage 450 may be aligned (e.g., coaxial) with the passage 408 of the viewer 246.

With continued reference to FIG. 4B, the second component 324 may include the second housing 424 having the second opening 430 (also referred to as "second passage 430") extending through the second component 324 (e.g., through the rear portion 424(B) of the second housing 424) along the third longitudinal axis 432. The second component 324 may be removably secured to the viewer 246 such that, when the A/V device 202 is installed, the third longitudinal axis 432 is substantially aligned (e.g., coaxial) with the first longitudinal axis 402 of the viewer 246. In some examples, at least a portion of the viewer 246 extends into the second opening 430. For example, the second part 446 of the viewer 246 may extend into the second opening 430 to attach to the fastener 328(A) within the second opening 430. As illustrated, the fastener 328(A) may include a passage 452 extending through substantially a center of the fastener 328(A). When the fastener 328(A) is attached to the viewer 246, the passage 452 may be aligned (e.g., coaxial) with the passage 408 of the viewer 246.

In some examples, the viewer 246 includes a substantially flat portion 454 extending along the first longitudinal axis 402 over at least a portion of the viewer 246. For example, when viewed in cross-section, the perimeter of the viewer 246 may not be entirely circular, but may instead include a flattened segment. The flat portion 454 may extend along a bottom portion of the viewer 246 with reference to the orientation illustrated in FIG. 4B. The flat portion 454 may provide a path that allows the flexible connector 326 to be positioned within a hole in a door along with the viewer 246. That is, the flat portion 454 may provide room for the flexible connector 326 to be positioned below the viewer 246 within the hole. The flexible connector 326 may extend along an outside of the viewer 246 and electrically couple the first component 322 and the second component 324 to one another.

In some examples, the second opening 430 of the second component 324 engages or is secured to an outer surface of a portion of the viewer 246. For example, an inner surface of the second opening 430 may engage or be secured to an outer surface of the viewer 246 (e.g., the second part 446), such as with mating threads. Further, an inner surface of the first opening 418 may engage or be secured to an outer surface of a portion of the viewer 246 (e.g., the first part 444), such as with mating threads.

Figure 4C:
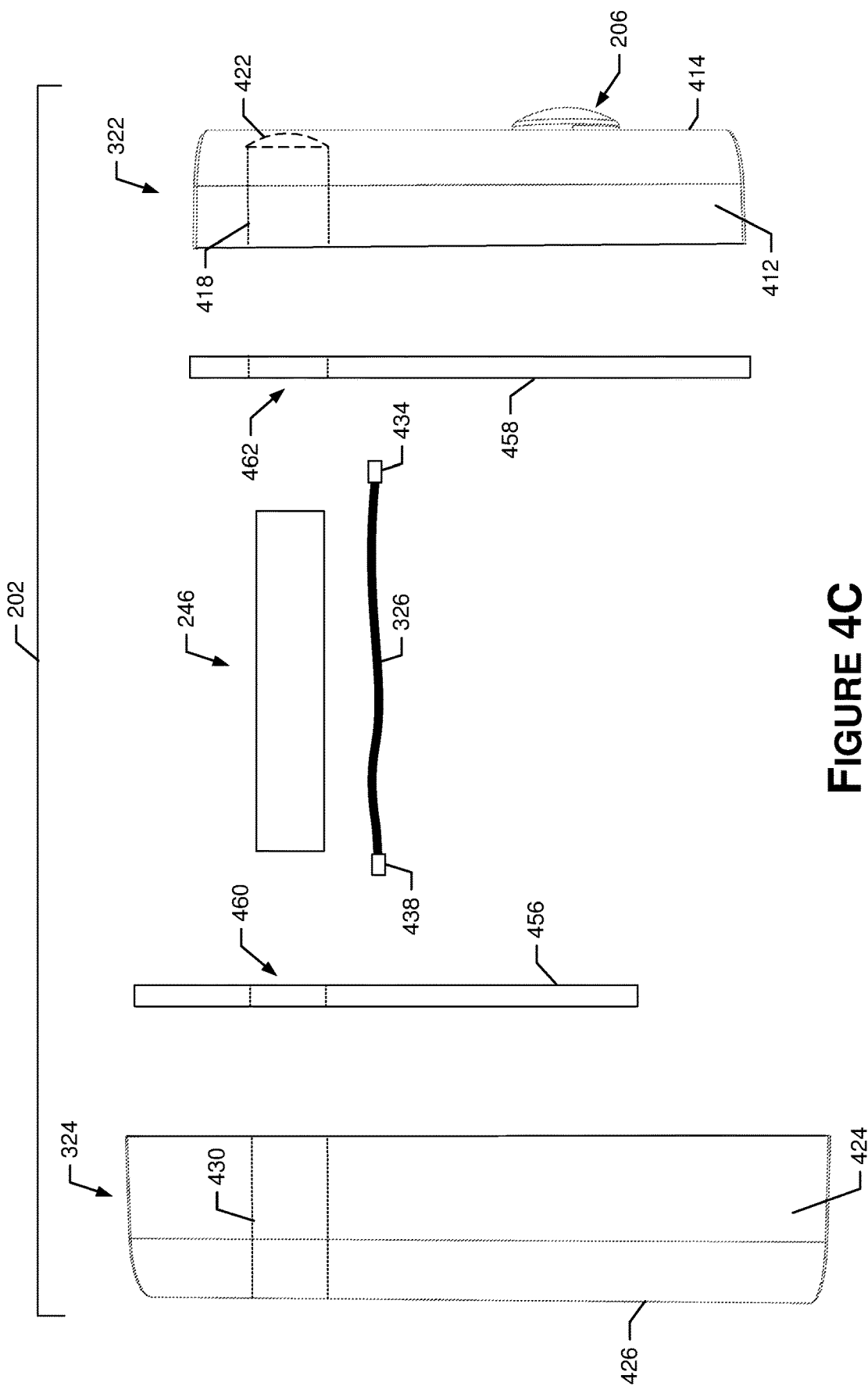

FIG. 4C is another exploded side view of the example A/V device 202, according to various aspects of the present disclosure. Here, the A/V device 202 includes a second gasket 456 to attach between the second component 324 and a barrier, and a first gasket 458 to attach between the first component 322 and the barrier. As illustrated, the gaskets 456, 458 may include openings 460, 462 to allow the viewer 246 to pass through. In examples, the gasket(s) 456 and/or 458 may protect the barrier, provide grip to enable the A/V device 202 to maintain an installed position, seal out water or other substances, etc. The gasket(s) 456, 458 may comprise a high-friction material that provides grip to resist movement of the A/V device 202 relative to the barrier. In various embodiments, the gaskets 456, 458 may comprise rubber, silicone, various plastics, etc.

Figure 5B:
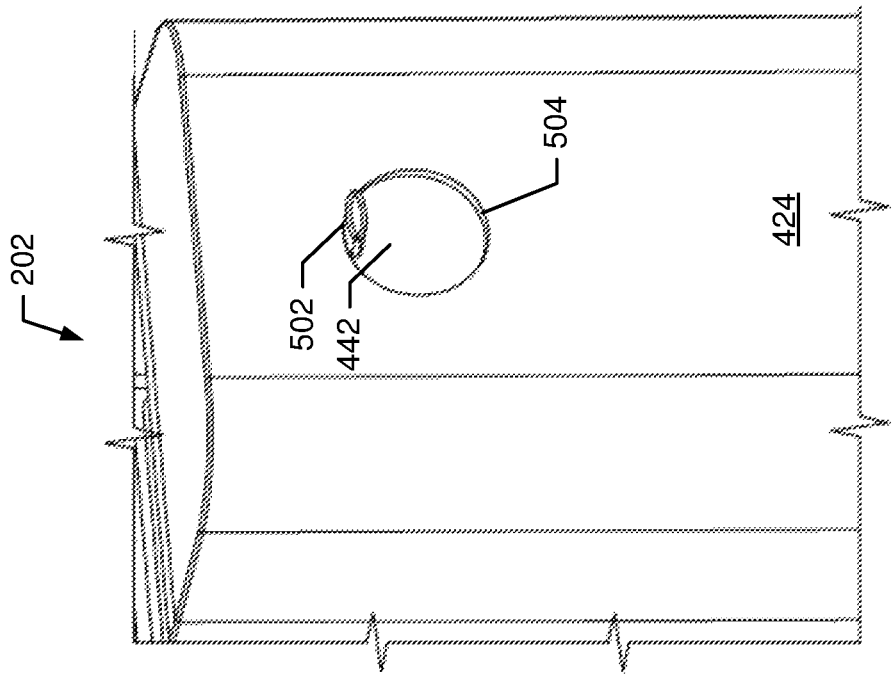
FIGS. 5A-5B are perspective views of an example A/V device with a shutter, according to various aspects of the present disclosure.
Figure 5A:
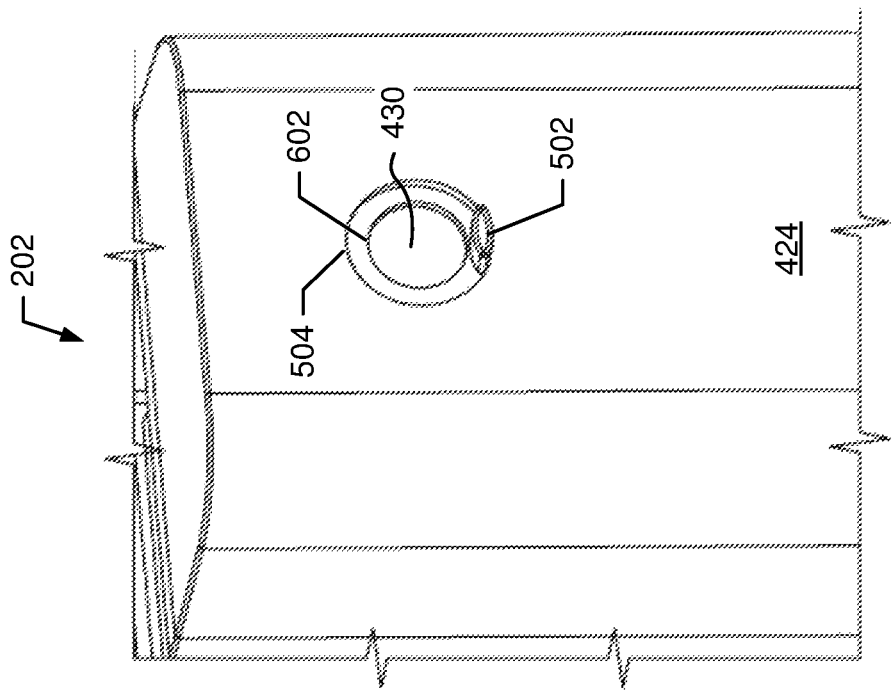

FIGS. 5A-5B are perspective views of the example A/V device 202 with the shutter 442, according to various aspects of the present disclosure. For example, the shutter 442 may include a bearing feature 502 that facilitates moving the shutter 442 between the first position, which is illustrated in FIG. 5A, and the second position, which is illustrated in FIG. 5B. The bearing feature 502 may include, but is not limited to, a tab, a button, an indentation, a notch, and/or any other feature or component that enables a user to move the shutter 442 between the first position and the second position. For example, in the illustrated embodiment, the user may push/pull the shutter 442 between the first position and the second position using one or two fingers to apply digital pressure to the bearing feature 502. An upwardly directed force applied to the bearing feature 502 moves the shutter 442 away from the first position (FIG. 5A) and toward the second position (FIG. 5B), while a downwardly directed force applied to the bearing feature 502 moves the shutter 442 away from the second position (FIG. 5B) and toward the first position (FIG. 5A).

FIGS. 6A-6B illustrate the shutter 442 in greater detail. In these figures, the front portion 424(A) is omitted to expose the shutter 442. The shutter 442, however, may be seated within a track (shown in FIGS. 7A-7B) inside the removable front portion 424(A) of the second component 324, and may be slidable within the track between the first position and the second position.

With reference to FIGS. 6A-6B, the shutter 442 includes a body portion 600, the bearing feature 502, an opening 602, flex components 604(A)-(B), notches 606(A)-(B), and tabs 608(A)-(B). The body portion 600 is shaped as a rectangular flat plate, and the opening 602 is located adjacent an upper edge 610 of the body portion 600. The bearing feature 502 extends perpendicularly from an outer surface 612 (the surface that faces away from the viewer 246) of the body portion 600 at a location just beneath the opening 602. The shutter 442 may have a single-piece construction, such as a molded plastic, and is preferably opaque so as to be capable of selectively blocking visibility through the viewer 246.

As illustrated in FIGS. 5A and 6A, when the shutter 442 is in the first position, the opening 602 of the shutter 442 is substantially concentric with an opening 504 of the second housing 424 and with the second opening 430 of the second component 324. As such, the shutter 442 does not obstruct the view through the opening 504, nor through the second opening 430, nor through the viewer 246 (FIG. 4A). However, and as illustrated in FIGS. 5B and 7B, while the shutter 442 is in the second position, the body portion 600 of the shutter 442 covers the opening 504 of the second housing 424 and the second opening 430 of the second component 324. As such, the shutter 442, which is preferably opaque, obstructs the view through the opening 504, through the second opening 430, and through the viewer 246.

The shutter 442 further includes the flex component(s) 604(A)-(B) located at a bottom portion of the shutter 442 on either side of the body portion 600. The flex components 604(A)-(B), which are separated from the body portion 600 by the notches 606(A)-(B), respectively, may include, but are not limited to, leaf springs, flexures, and/or any other component that is capable of moving between first, unflexed positions, as illustrated in FIGS. 6A-6B, and second, flexed positions in which the flex components 604(A)-(B) bend inwardly toward the body portion 600, thereby at least partially collapsing the notches 606(A)-(B). As shown, an outer surface of the first flex component 604(A) includes a first tab 608(A) and an outer surface of the second flex component 604(B) includes a second tab 608(B), which are described with reference to FIGS. 7A-7B.

FIGS. 7A-7B are perspective views of an example of the A/V device 202 including a track 702 for guiding the shutter 442 between the first and second positions, according to various aspects of the present disclosure. As shown, the track 702 includes several portions 702(A)-(F) extending along a back surface of the front portion 424(A) in a direction substantially parallel to side edges 614(A)-(B) of the body portion 600. The track 702 supports and guides the shutter 442 as it slides between the first position, which is illustrated in FIG. 7A, and the second position, which is illustrated in FIG. 7B. As shown in FIG. 7A, when the shutter 442 is in the first position, the first tab 608(A) is located below a lower portion 702(B) of the track 702, and the second tab 608(B) is located below a lower portion 702(E) of the track 702. In this position, the flex components 604(A)-(B) are in an unflexed state. Additionally, in this position a bottom edge 616 of the shutter 442 is in contact with bumper portions 702(C)-702(D) of the track 702. The bumper portions 702(C)-702(D) secure the shutter 442 in the first position, preventing it from advancing any further downward under the influence of gravity.

Additionally, the track 702 includes a first opening 702(G) located between the portion 702(A) of the track 702 and the portion 702(B) of the track 702, and a second opening 702(H) located between the portion 702(E) of the track 702 and the portion 702(F) of the track 702. When the shutter 442 is in the second position, as illustrated in FIG. 7B, the first tab 608(A) is located within the first opening 702(G) of the track 702 and the second tab 608(B) is located within the second opening 702(H) of the track 702. Engagement of the tabs 608(A)-608(B) with their respective openings 702(G)-702(H) secures the shutter 442 in the second position, preventing it from falling back toward the first position under the influence of gravity. When the shutter 442 moves between the first and second positions, such as when the user grasps the bearing feature 502 and applies an upward force or a downward force, the flex components 604(A)-(B) bend inwardly toward the body portion 600 as the tabs 608(A)-608(B) bear against the lower portions 702(B)-702(E) of the track, respectively. When moving from the first position to the second position, when the tabs 608(A)-608(B) reach the openings 702(G)-702(H) the flex components 604(A)-(B) snap outwardly as the potential energy in the deflected flex components 604(A)-(B) is released, causing the tabs 608(A)-608(B) to be forced into their respective openings 702(G)-702(H). This action provides an audible click and tactile feedback that informs the user that the shutter 442 is securely in the second position. Similarly, when moving from the second position to the first position, when the tabs 608(A)-608(B) drop below the lower portions 702(B)-702(E) of the track, the flex components 604(A)-(B) snap outwardly as the potential energy in the deflected flex components 604(A)-(B) is released, again providing an audible click and tactile feedback that informs the user that the shutter 442 is securely in the first position.

Figure 8:
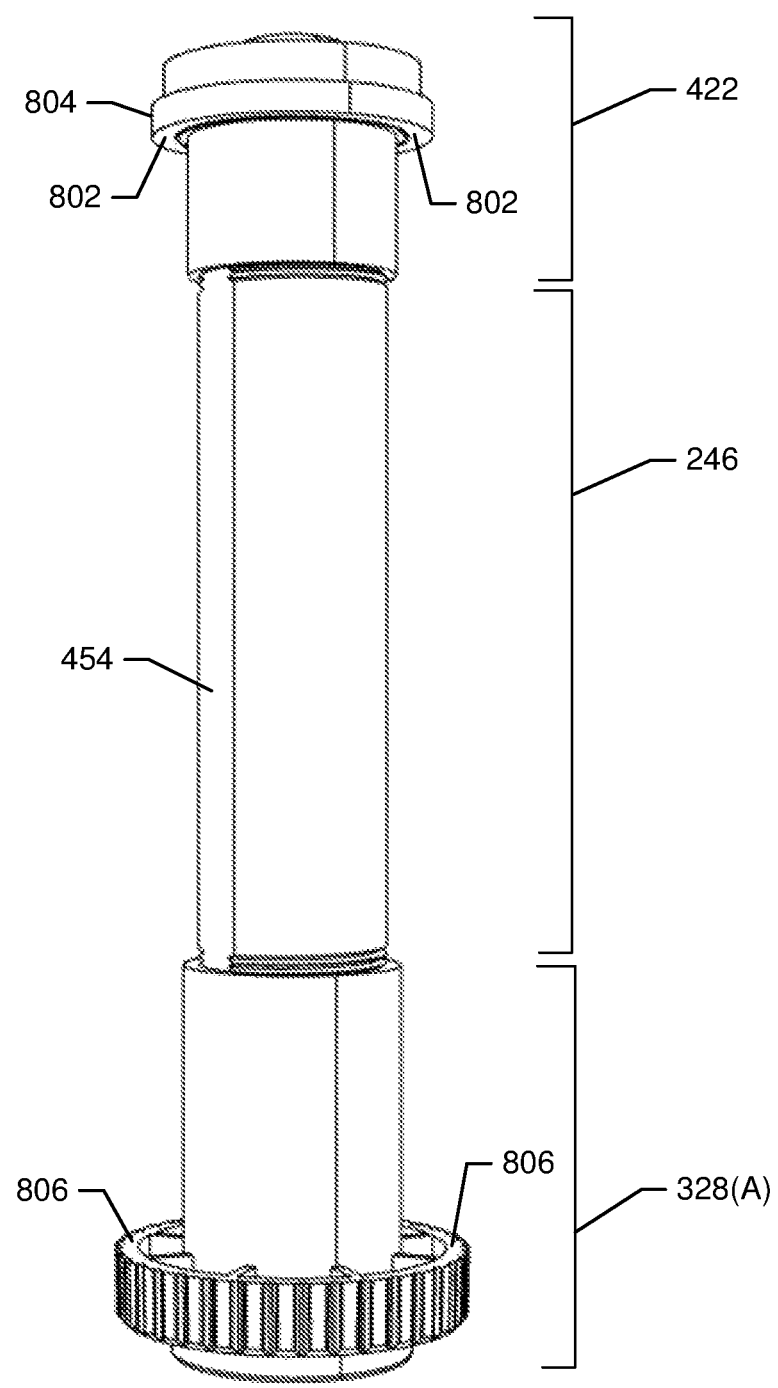
FIG. 8 is a side perspective view of an example viewer connected to a fastener and a second lens, according to various aspects of the present disclosure.

FIG. 8 illustrates the viewer 246 connected to the fastener 328(A) and the second lens 422. As illustrated, the fastener 328(A) and the second lens 422 have each been screwed onto the viewer 246, although in other embodiments other types of securing mechanisms may be used besides threading. As shown, the viewer 246 includes the flat portion 454 which may or may not have threading. In the example of FIG. 8, the flat portion 454 does not include threading. In examples, the flexible connector 326 may extend along an outside of the viewer 246 adjacent to the flat portion 454.

An inner surface 802 of a flange 804 around a circumference of the second lens 422 may contact the first component 322, such as the rear portion 412(B) of the first housing 412, when the viewer 246 is secured to the first component 322. Similarly, an inner surface 806 around a circumference of the fastener 328(A) may contact the second component 324, such as the rear portion 424(B) of the second housing 424, when the viewer 246 is secured to the second component 324. When the second lens 422 and/or the fastener 328(A) are tightened onto the viewer 246, the surface 802 may contact the rear portion 412(B) of the first housing 412 and the surface 806 may contact the rear portion 424(B) of the second housing 424 to secure the A/V device 202 to a barrier.

Figure 9A:
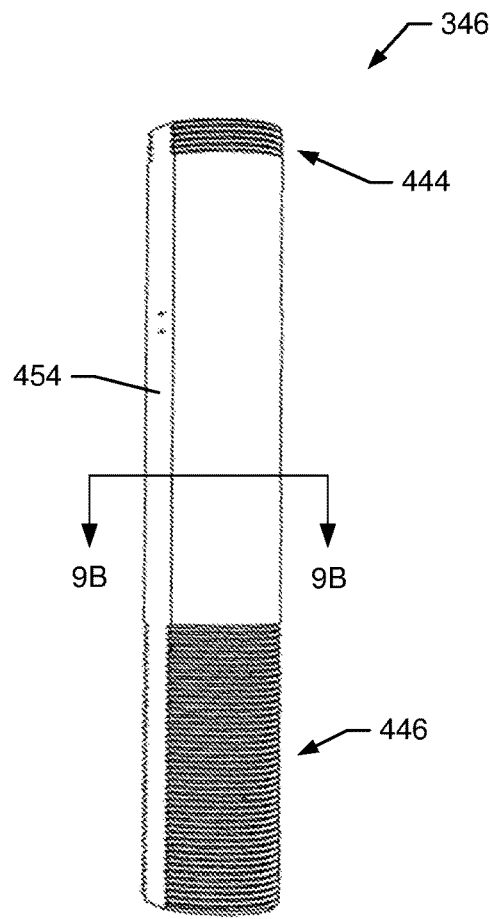
FIG. 9A is a side view of the example viewer of FIG. 8 detached from other elements, according to various aspects of the present disclosure.

FIG. 9A illustrates a portion of the viewer 246 (e.g., a shaft). In this example, the flat portion 454 extends along the entire length of the viewer 246, although in other examples the flat portion 454 may extend along only a portion of the length of the viewer 246, such as along a middle section of the viewer 246. As noted above, the first part 444 of the viewer 246 includes first threading configured to detachably couple to second threading on the second lens 422. Further, the second part 446 of the viewer 246 includes third threading configured to detachably couple to fourth threading on the fastener 328(A).

Figure 9B:
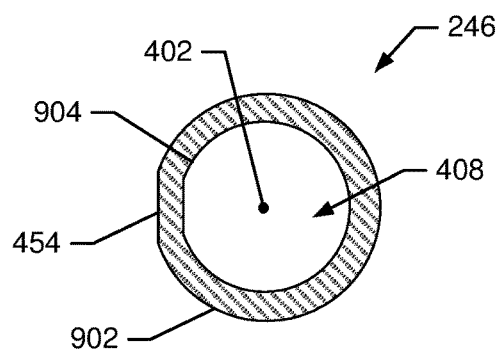
FIG. 9B is a cross-sectional view of the viewer of FIG. 9A taken along the line 9B-9B in FIG. 9A, according to various aspects of the present disclosure.

FIG. 9B illustrates a cross-sectional view of the viewer 246 taken along the section line 9B-9B in FIG. 9A. As illustrated, the viewer 246 includes the passage 408 extending along the first longitudinal axis 402 (traveling into and out of the page). A profile shape of the cross-section of the viewer 246 (e.g., taken perpendicular to the first longitudinal axis 402) includes a rounded portion 902 of the wall (e.g., being circular) and the flat portion 454 of the wall. As illustrated, an interior wall 904 of the viewer 246 may include a similar shape.

Figure 10A:
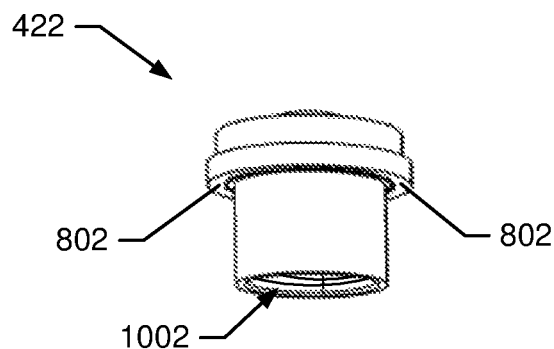
FIG. 10A is a side perspective view of an example second lens that may attach to an end of the viewer of FIG. 8, according to various aspects of the present disclosure.

FIG. 10A illustrates the second lens 422, which is removably attachable to the first part 444 of the viewer 246. As illustrated, an interior portion of the second lens 422 may include threading 1002, such as male or female threading, to attach to the first part 444 of the viewer 246.

Figure 10B:
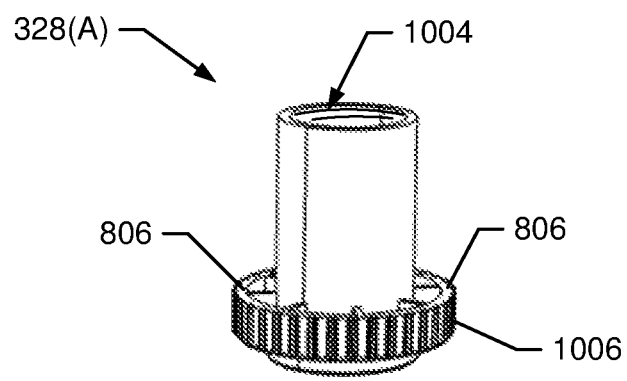
FIG. 10B is a side perspective view of an example fastener that may attach to an end of the viewer of FIG. 8, according to various aspects of the present disclosure.

FIG. 10B illustrates the fastener 328(A), which is removably attachable to the second part 446 of the viewer 246. As illustrated, an interior portion of the fastener 328(A) may include threading 1004, such as male or female threading, to attach to the second part 446 of the viewer 246. The fastener 328(A) further includes raised edges 1006 located around a portion of the fastener 328(A). In some instances, the raised edges 1006 are used to secure the fastener 328(!) to the viewer 246.

Figure 11A:
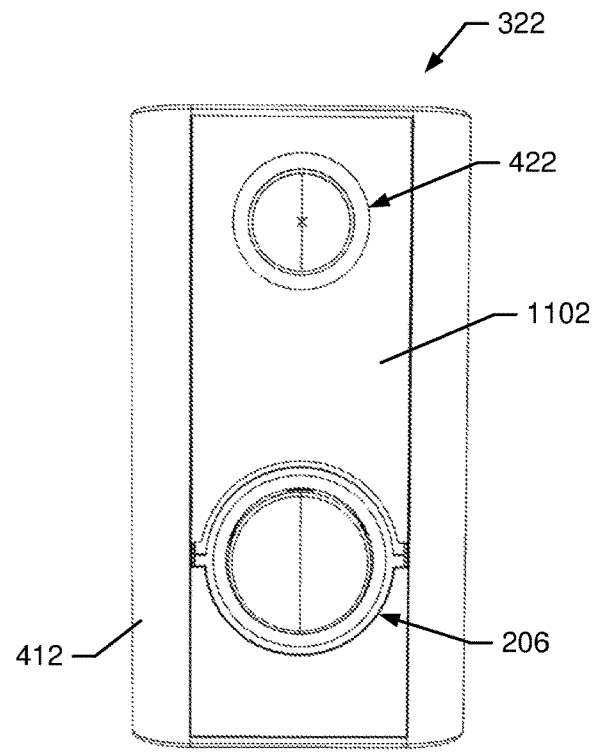
FIGS. 11A and 11B are front views of a first component of the A/V device with a viewer of FIGS. 4A-4C.
Figure 11B:
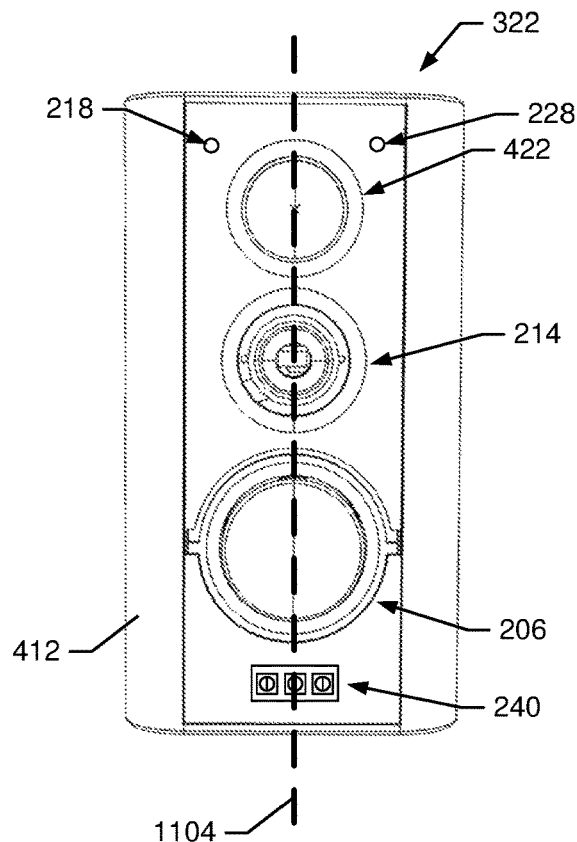

FIGS. 11A and 11B illustrate front views of the first component 322 of the A/V device 202, according to various aspects of the present disclosure. FIG. 11A illustrates a front view of the first component 322 with a cover 1102 disposed over the camera 214. The cover 1102 may be transparent, semi-transparent, etc., and protects the camera 214 and/or other internal components of the first component 322. The cover 1102 may be formed of plastic, glass, metal, etc. In some examples, the cover 1102 is part of the first housing 412, while in other examples the cover 1102 is a separate component.

FIG. 11B illustrates a front view of the first component 322 with the cover 1102 of FIG. 11A removed to show the camera 214, the microphone(s) 228, the light emitting components 240 (e.g., infrared lights), and the light sensor 218 (e.g., capable of detecting ambient light). As shown, the camera 214 is located beneath, and substantially vertically aligned with, the second lens 422, which is located at the outside end of the viewer 246. Additionally, the button 206 is located beneath, and substantially vertically aligned with, the camera 214. In some instances, and as shown in the example of FIG. 11B, the second lens 422, the camera 214, and the button 206 are located along a vertical axis 1104 of the second component 324, with a center point of each of these three components lying on the vertical axis 1104.

Figure 11C:
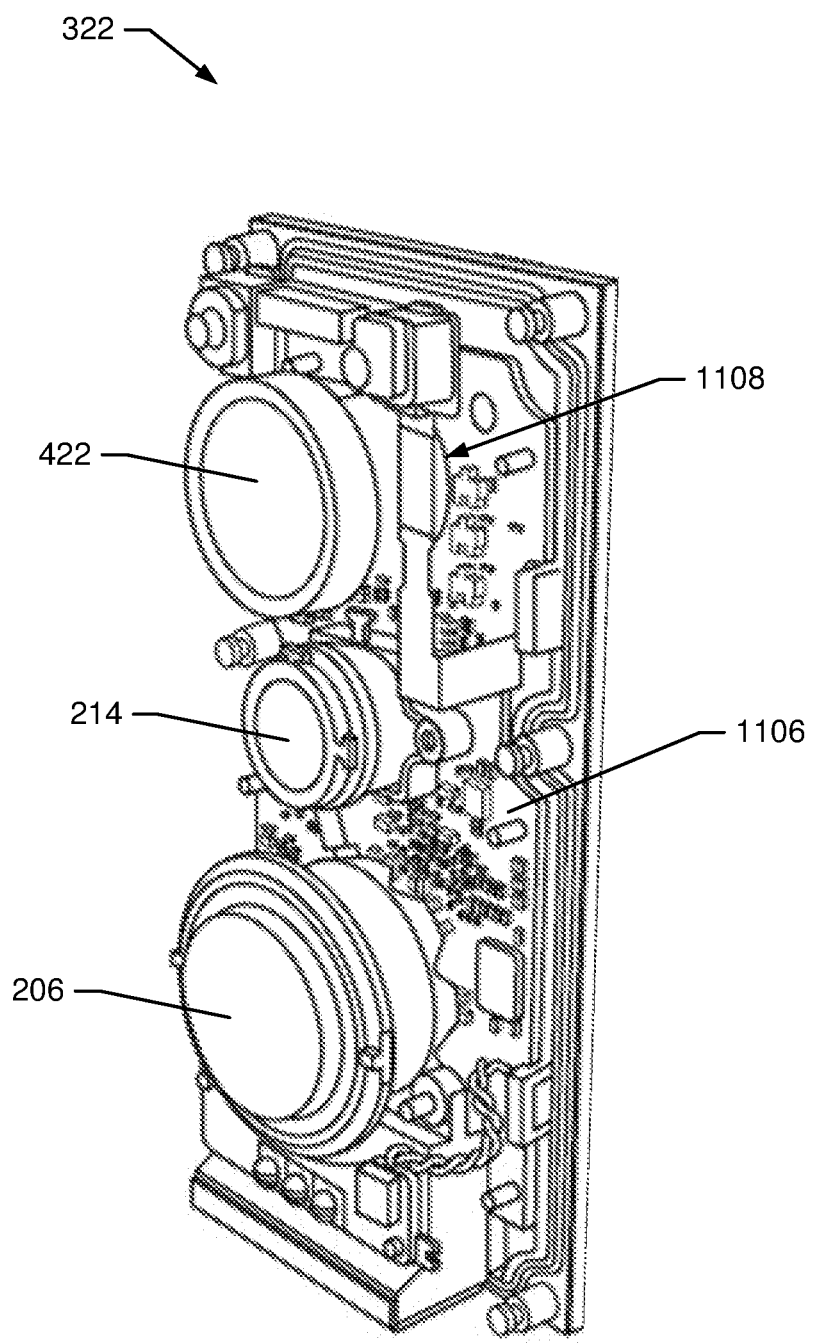
FIG. 11C is a side perspective view of the first component of the A/V device with a viewer of FIGS. 4A-4C, showing a housing of the device removed to expose internal components, according to various aspects of the present disclosure.

FIG. 11C is a side perspective view of the first component 322 of the A/V device 202 with the first housing 412 removed to show internal aspects of the first component 322. As shown, the first component 322 includes a main board 1106, such as a printed circuit board (PCB). The main board 1106 includes an opening 1108 located at a top portion of the main board 1106, where the opening 1108 accommodates passage of the viewer 246 through the main board 1106. Additionally, the main board 1106 includes electrical connections (not shown) to both the camera 214 and the button 206.

As described above, the second lens 422, the first opening 418, the camera 214, the microphone 228, the button 206, and/or the motion sensor 226 may be substantially vertically aligned with one another. In particular, the second lens 422 (which is located at the outer end of the viewer 246) may be located above both the camera 214 and the button 206, and the camera 214 may be located above the button 206. These relative positions of these components may improve the configuration or layout of the main board 1106. For example, the camera 214 and the button 206 are electrically connected to the main board 1106, and the main board 1106 may include traces (not shown) for routing electrical/digital signals to/from the camera 214 and/or the button 206. The main board 1106 further includes the opening 1108 to accommodate the viewer 246, which extends generally completely through both the first component 322 and the second component 324. By placing the viewer 246 above the camera 214 and the button 206, the opening 1108 in the main board 1106 may be located toward a top edge of the main board 1106 instead of in the middle of the main board 1106. If the opening 1108 in the main board 1106 that accommodates the viewer 246 were in the middle of the main board 1106, the traces would need to be routed around the opening 1108, such as through narrow strips on either side of the opening 1108. This routing arrangement would increase the lengths of the traces and/or require the traces to be positioned very close to one another, either of which would likely decrease the signal-to-noise ratio for the traces, decreasing the overall performance of the A/V device 202 and creating a poorer customer experience with the A/V device 202. As such, locating the camera 214 and the button 206 below the first opening 418 improves the performance of the main board 1106.

FIGS. 11D-11E are perspective views of the button 206 of the first component 322 of the A/V device 202, according to various aspects of the present disclosure. FIG. 11D illustrates the button 206 in it's resting position (e.g., not depressed). FIG. 11E illustrates the button 206 in a depressed position.

As shown, the button 206 includes at least a button lens 1110, a first O-ring 1112, a second O-ring 1114, a button connector 1116, a trigger nub 1118, a first portion of a housing 1120(A), a second portion of the housing 1120(B), an opening 1122 in the housing 1120 (illustrated in FIG. 11D), a seal 1124 (illustrated in FIG. 11E), a spring 1126, internal structure 1128, and a flex printed circuit board (PCB) 1130. The lens 1110, which is preferably transparent to infrared light, may comprise nitrile, rubber, silicone, fluorocarbon, various plastics, and/or any other material that is at least semi-rigid, sturdy, and capable of withstanding repeated pressings via digital contact. In some instances, the lens 1110 includes a Fresnel lens. In other instances, the lens 1110 may include any other type of lens.

The first O-ring 1112 and the second O-ring 1114 may protect the button 206 and/or the A/V device 220 by sealing out water and/or other substances, preventing moisture from passing between the housing 1120 and the internal structure 1128. The first O-ring 1112 and the second O-ring 1114, which are preferably flexible, resilient, and non-absorbent or hydrophobic, may comprise nitrile, rubber, silicone, fluorocarbon, various plastics, and/or any other material that helps seal the button 206 against moisture ingress.

The opening 1122 in the housing 1120 allows the flex PCB 1130 to pass from outside of the housing 1120 to connect with one or more components within the housing 1120. For example, the flex PCB 1130 may electronically connect the button connector 1116 and/or the trigger nub 1118 to the main board 1106. In some instances, and as illustrated in FIG. 11E, the button 1106 may include the seal 1124 within the opening 1122 to resist moisture ingress. The seal 1124 may include, but is not limited to, foam, glue, nitrile, rubber, silicone, fluorocarbon, various plastics, and/or any other material that is capable of sealing the opening 1122. The seal 1124 advantageously provides an additional sealing barrier by not allowing water or other substances that may bypass the second O-ring 1114 to pass from within the housing 1120 to any areas deeper within the enclosure of the A/V device 202. That is, the second O-ring 1114 provides a first moisture barrier that resists moisture ingress into the housing 1120, and the seal 1124 provides a second moisture barrier that resists moisture ingress into the enclosure of the A/V device 202. In embodiments, the housing 1120 may be a unitary component, such as a molded plastic component, with no other openings or pores except the opening 1122. The seal 1124, along with the body of the housing 1120, may thus provide an impenetrable moisture barrier that prevents moisture from getting within the enclosure of the A/V device 202 where it could corrode electrical components.

The internal structure 1128 is generally cylindrical, and includes a first annular groove 1132 for receiving the first O-ring 1112 and a second annular groove 1134 for receiving the second O-ring 1114. An internal wall 1136 of the internal structure 1128 supports the button connector 1116 and the motion sensor 226, which in this embodiment is a PIR-type motion sensor. An outer end 1138 of the internal structure 1128 supports the button lens 1110, such that when a visitor applies digital pressure to the button lens 1110 the internal structure 1128 is displaced inwardly to the depressed position shown in FIG. 11E. In the depressed position, the spring 1126 is compressed, such that when the digital pressure is removed the spring 1126 returns the internal structure 1128 to the resting position shown in FIG. 11D. The first O-ring 1112 seals the junction between the internal structure 1128 and the button lens 1110, resisting moisture ingress into the area of the internal structure 1128 where the motion sensor 226 is located.

As illustrated in FIG. 11D, when the button 206 is in the resting position, the button connector 1116, which is secured to the internal structure 1128, is spaced from the second portion of the housing 1120(B), where the trigger nub 1118 is located between the button connector 1116 and the second portion of the housing 1120(B). However, and as illustrated in FIG. 11E, when the button 206 is in the depressed position, the button connector 1116, which again is secured to and moves with the internal structure 1128, is located closer to the second portion of the housing 1120(B) and/or the button connector 1116 is in contact with the second portion of the housing 1120(B). This causes a signal to be sent via the flex PCB 1130 to the main board 1106, which may cause one or more further actions, such as a tone to be emitted from the speaker(s) 230 and/or a user alert to be transmitted using the communication component 212.

Figure 12A:
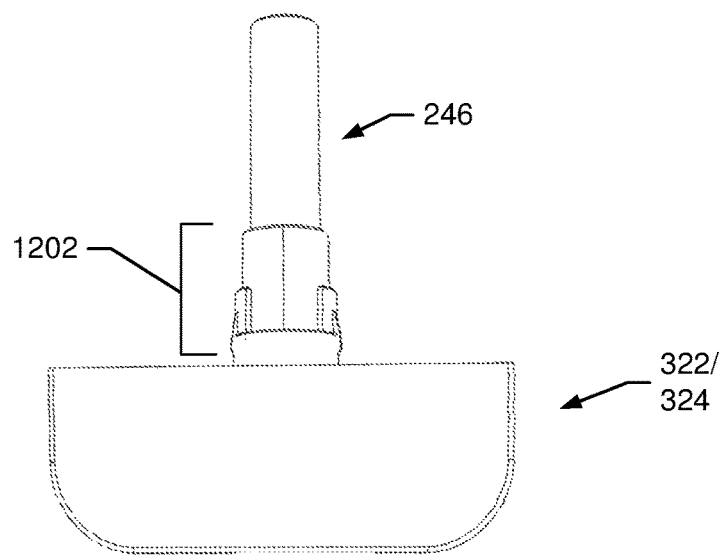
FIGS. 12A and 12B are top and side views, respectively, illustrating tabs for installing the A/V device with a viewer of FIGS. 4A-4C, according to various aspects of the present disclosure.
Figure 12B:
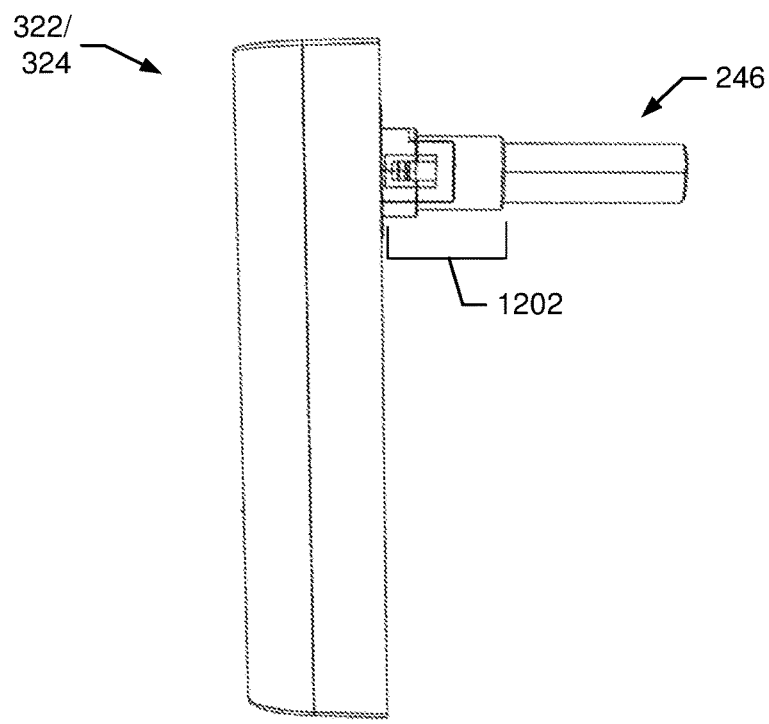

FIGS. 12A and 12B illustrate tabs 1202 to assist in installing the A/V device 202, according to various aspects of the present disclosure. FIG. 12A illustrates a top view of the first component 322 or the second component 324 and the viewer 246 with the tabs 1202 at a junction between the viewer 246 and the first component 322 or the second component 324. FIG. 12B illustrates a side view of the first component 322 or the second component 324 and the viewer 246 with the tabs 1202 at a junction between the viewer 246 and the first component 322 or the second component 324. The tabs 1202 may hold the first component 322 or the second component 324 and the viewer 246 within an opening in a barrier. To illustrate, when installing the A/V device 202, a user may attach the viewer 246 to the tabs 1202 and to the first component 322. The viewer 246 may then be inserted within the opening in the barrier, so that the tabs 1202 contact an inner surface of the opening and hold the combined first component 322 and viewer 246 in place (e.g., without falling out of the opening). The user may move to the other side of the barrier to connect the second component 324 to the second part 446 of the viewer 246 by using the fastener 328(A), for example. In examples, the tabs 1202 have a wedge shape and engage the opening in the barrier in a friction fit to resist movement of the first component 322 and the second component 324 relative to the barrier. Although discussed as tabs, in other examples the tabs 1202 may be other types of fasteners, such as flanges, clamps, etc. Moreover, the first component 322 and the viewer 246 may be held to the barrier in other manners, such as with an adhesive.

In some examples, a sleeve (e.g., shaft) is used instead of (or in addition to) the tabs 1202. The sleeve may slide into a barrier and the viewer 246 may slide into the sleeve.

Figure 13B:
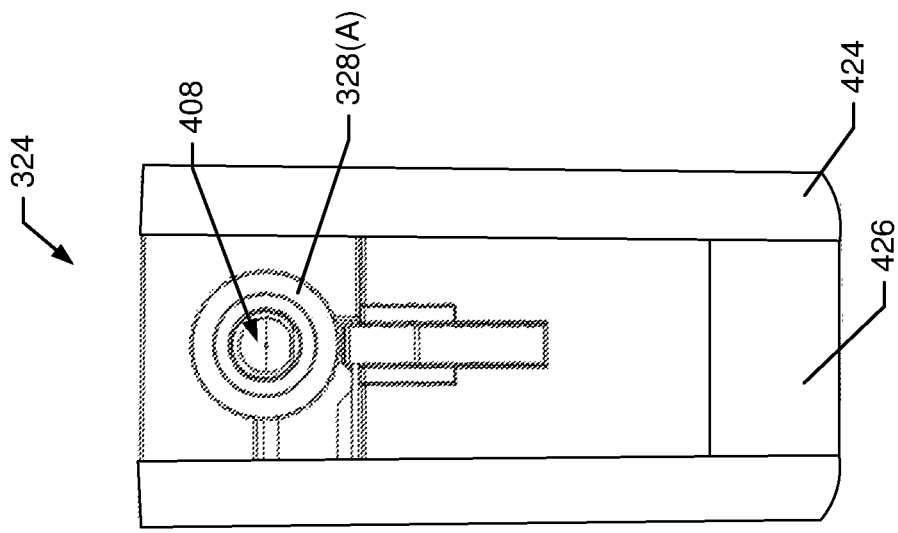
FIG. 13B is a front view of the second component of FIG. 13A with the cover removed, according to various aspects of the present disclosure.
Figure 13A:
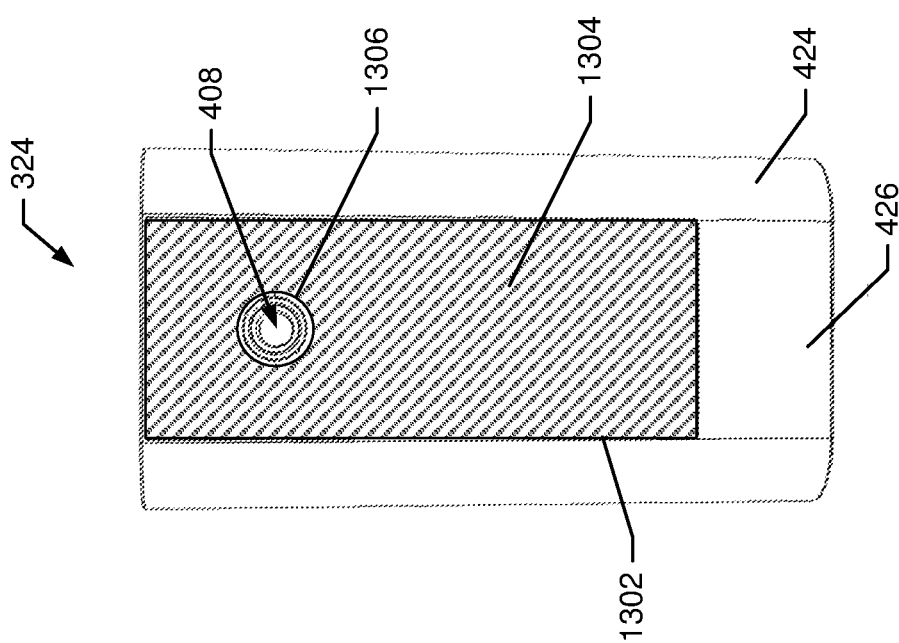
FIG. 13A is a front view of a second component of the A/V device with a viewer of FIGS. 4A-4C and including a cover disposed over a fastener, according to various aspects of the present disclosure.

FIG. 13A illustrates a front view of the second component 324 with a cover 1302 disposed over the fastener 328(A) and/or over the second opening 430, the passage 408 of the viewer 246, etc. The cover 1302 may be proximate the second front surface 426. The cover 1302 may be transparent, semi-transparent, solid, etc. For example, the cover 1302 may include a non-transparent portion 1304 illustrated with cross-hatching to cover the fastener 328(A) and other components within the second component 324. The non-transparent portion 1304 may provide an aesthetically pleasing appearance for the second component 324. Further, the cover 1302 may include a transparent (or semi-transparent) portion and/or opening 1306, so that a user may look through the passage 408 in the viewer 246 (e.g., look through a door viewer implemented by the viewer 246). The cover 1302 may be formed of plastic, glass, metal, etc. In some examples, the cover 1302 is part of the second housing 424, while in other examples the cover 1304 is a separate component. FIG. 13B illustrates a front view of the second component 324 with the cover 1302 of FIG. 13A removed.

Although the cover 1302 is illustrated, in many examples the A/V device 202 does not include the cover 1302. For example, the second housing 424 may be formed of one or more pieces that do not include the cover 1302. Here, the second housing 424 may cover the internal components of the second component 324.

FIG. 14A illustrates an example of the rear portion 424(B) of the second housing 424 with the front portion 424(A) of the second housing 424 removed. In particular, FIG. 14A illustrates the battery 242, the flexible connector 326, the second coupler 438 of the flexible connector 326, a fastening portion 1402, and a slack receiving portion 1404(A)/1404

(B). The fastening portion 1402 (e.g., a recess) may be configured to receive the fastener 328(A) when the viewer 246 is positioned through the second opening 430 and the fastener 328(A) is coupled to the viewer 246. As illustrated, the fastening portion 1402 is part of an internal portion of the second component 324 (e.g., part of the rear portion 424(B) of the second housing 424).

The slack receiving portion 1404(A)/1404(B) may receive excess length (e.g., slack) in the flexible connector 326. For example, the flexible connector 326 may be manufactured with a relatively long length to accommodate various door thicknesses. If an entirety of the flexible connector 326 is not needed for an installation (e.g., the length of the flexible connector 326 is substantially longer than the thickness of the door), then there may be excess length in the flexible connector 326 (e.g., the installation may yield excess length in the flexible connector 326). Such excess is often referred to as a service loop. The slack receiving portion 1404(A)/1404(B) may receive and/or secure the service loop of the flexible connector 326. In this example, the slack receiving portion 1404(A)/1404(B) includes a channel 1404(A) that may receive a variable length of the flexible connector 326 and a tab 1404(B) to secure the service loop.

FIG. 14B illustrates the rear portion 424(B) of the second housing 424 without the flexible connector 326, such that the second connection port 440 is visible. The second connection port 440 may connect to the second coupler 438 of the flexible connector 326. The second connection port 440 may be implemented in a variety of manners, such as through a 20-pin connection, a 24-pin connection, an n-pin connection, a USB connection, etc.

FIG. 14C illustrates the rear portion 424(B) of the second housing 424 with the fastener 328(A) attached. Here, the flexible connector 326 has been pulled through a door, and excess in the flexible connector 326 is secured with the slack receiving portion 1404(A)/1404(B). As illustrated, the passage 452 in the fastener 328(A) provides a viewable passage to the passage 408 in the viewer 246.

Figure 15:
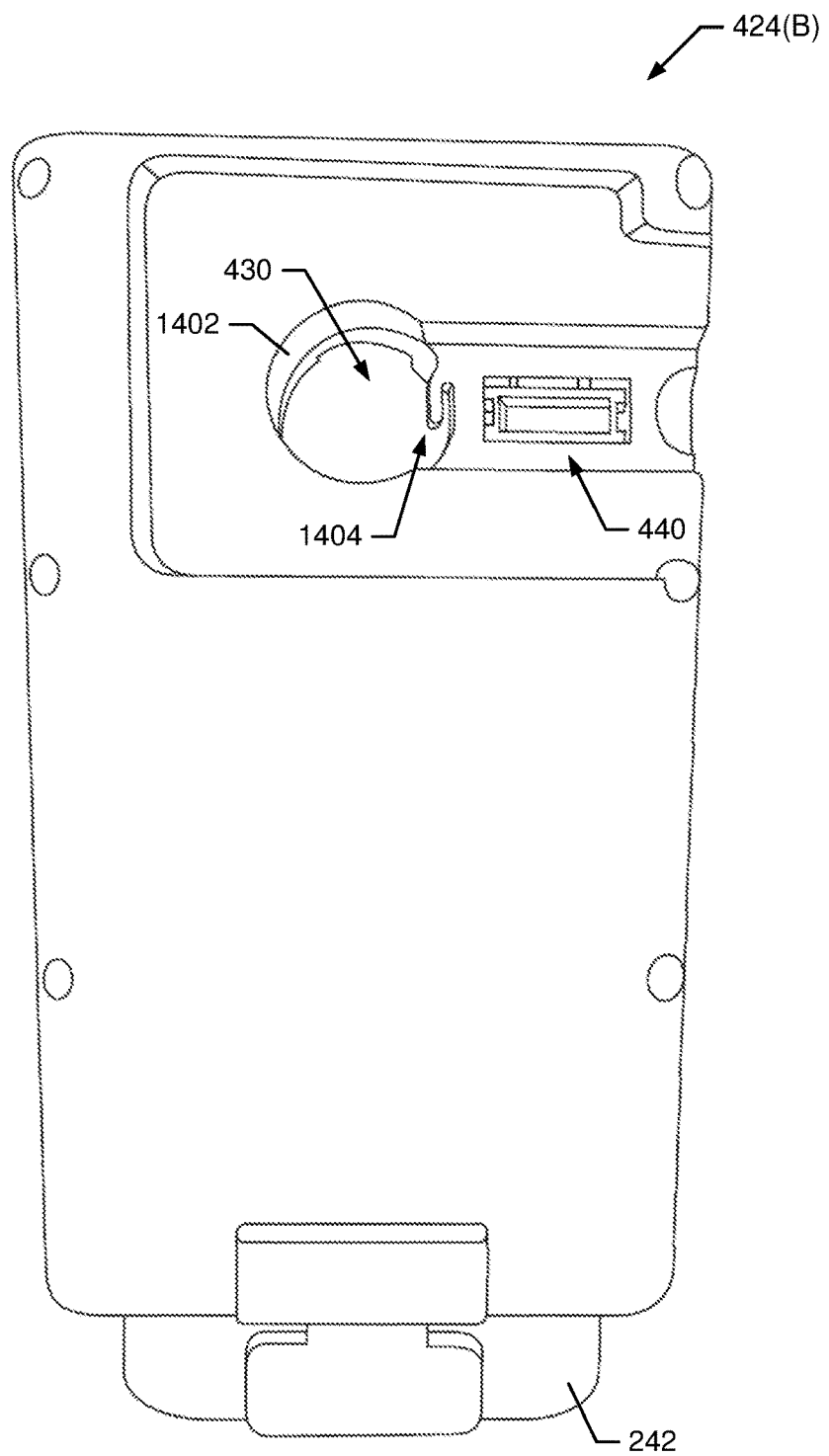
FIG. 15 is a rear perspective view of the second component of FIG. 13A with a portion of a housing of the second component removed, according to various aspects of the present disclosure.

FIG. 15 illustrates another example of the rear portion 424(B) of the second housing 424 with the front portion 424(A) of the second housing 424 removed, according to various aspects of the present disclosure. Here, the second connection port 440, the second opening 430, and the battery 242 are illustrated. In this example, the slack receiving portion 1404 includes a tab to adjust tension on the flexible connector 326 (not illustrated in FIG. 15). For example, the flexible connector 326 may be pulled through or around the tab 1404 to tighten the tension on the flexible connector 326 once the A/V device 202 is installed on a barrier (e.g., with the flexible connector 326 extending through an opening in the barrier). The second coupler 438 of the flexible connector 326 may then be connected to the second connection port 440. As noted above, in some examples, the flexible connector 326 may be implemented with a relatively long length to accommodate different thicknesses of barriers (e.g., different installation configurations). In other words, the flexible connector 326 may include more length than is needed to travel through openings in some barriers. As such, the tab 1404 may allow slack (e.g., excess length) in the flexible connector 326 to be removed by tightening through or around the tab 1404.

Figure 16:
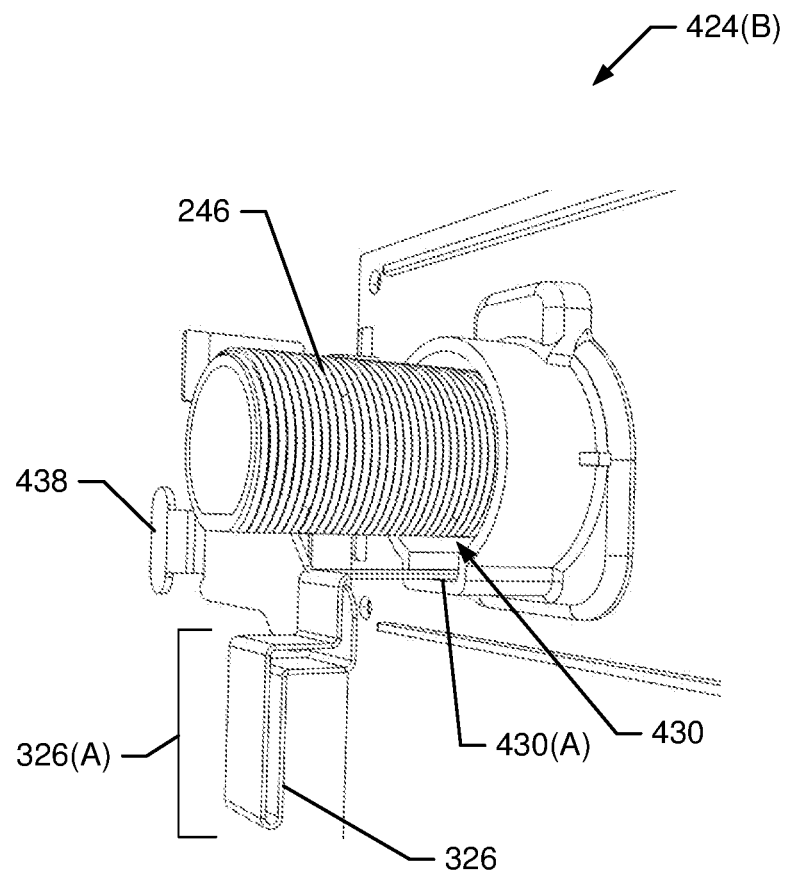
FIG. 16 is a side perspective view of an example service loop of a coupler, according to various aspects of the present disclosure.

FIG. 16 illustrates an example service loop 326(A) of the flexible connector 326. Here, various surfaces of the rear portion 424(B) of the second housing 424 have been removed to show the service loop 326(A) as it would be secured within the slack receiving portion 1404 of FIG. 14A or FIG. 14C (e.g., within a channel). As illustrated, the second opening 430 of the second component 324 includes a flat portion 430(A) (e.g., recess) to receive the flexible connector 326.

Figure 17:
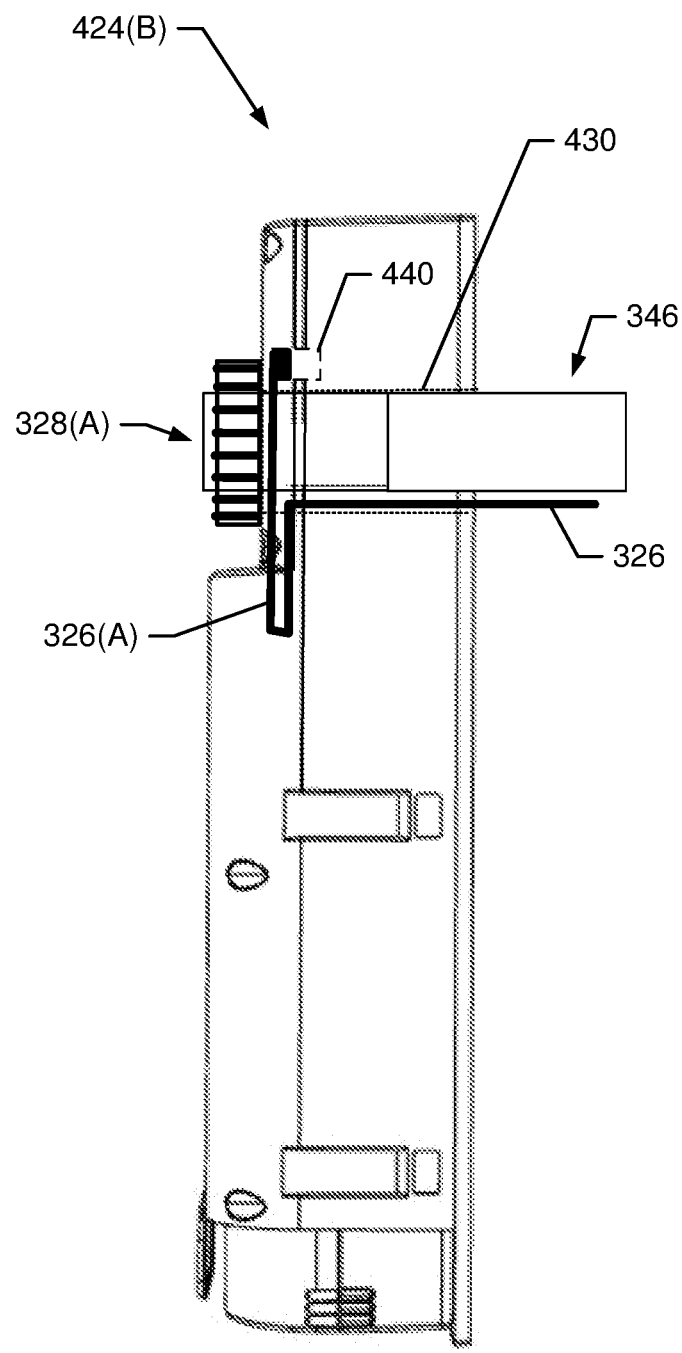
FIG. 17 is a side partial cross-sectional view of the second component of FIG. 13A including another example service loop of a coupler secured within a rear portion of the second component, according to various aspects of the present disclosure.

FIG. 17 illustrates another example service loop 326(A) of the flexible connector 326 secured within the rear portion 424(B) of the second housing 424. In this example, the fastener 328(A) is connected to the viewer 246 and the flexible connector 326 is positioned below the viewer 246 (e.g., along the flat portion 452 of the viewer 246). As shown, the flexible connector 326 extends through the second opening 430, around the fastener 328(A), and connects to the second connection port 440.

Figure 18A:
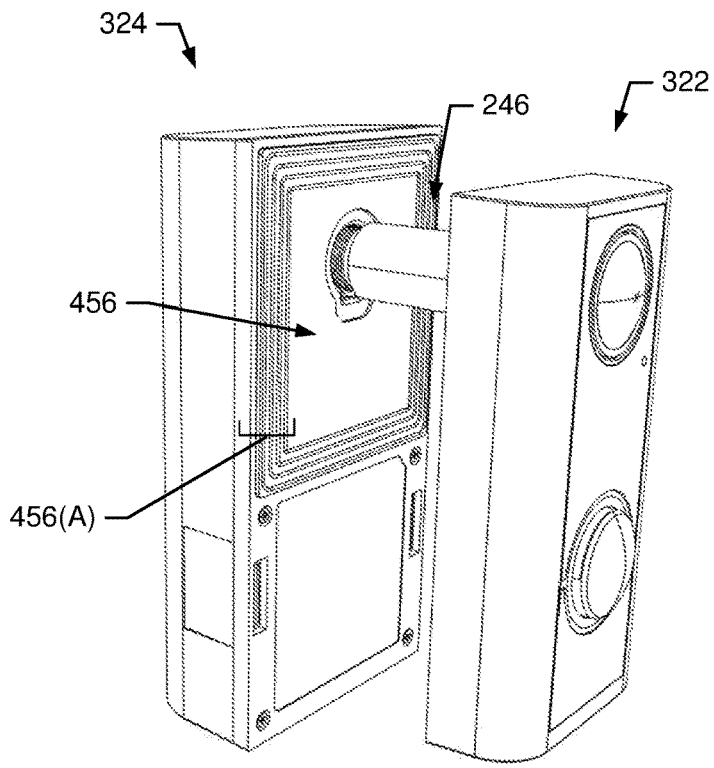
FIGS. 18A-18B are perspective views of a portion of the A/V device with a viewer of FIGS. 4A-4C, according to various aspects of the present disclosure.
Figure 18B:
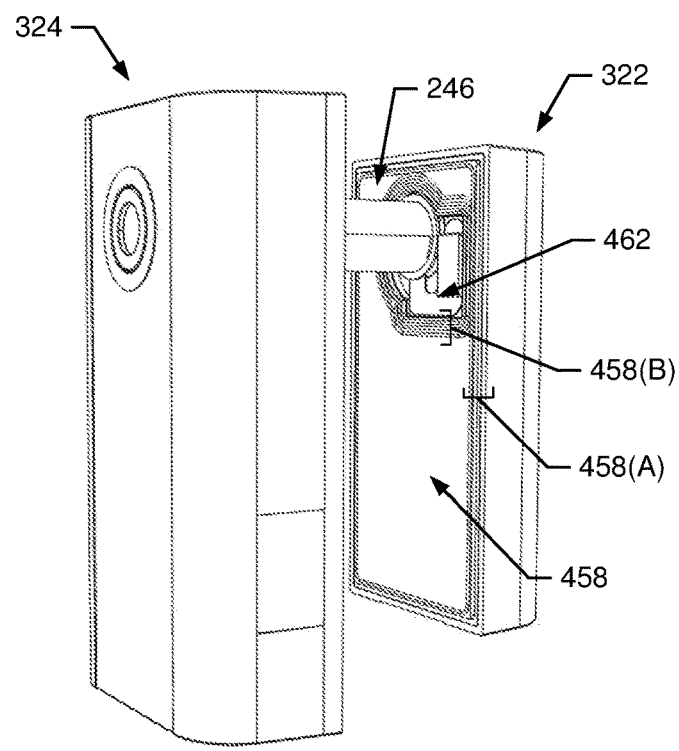

FIG. 18A illustrates the second gasket 456 attached to the second component 324, and FIG. 18B illustrates the first gasket 458 attached to the first component 322. In examples, the gasket(s) 456 and/or 458 may protect the A/V device 202, provide grip to enable the A/V device 202 to maintain an installed position, seal out water or other substances, etc. The gasket(s) 456 and/or 458 may comprise a high-friction material that provides grip to resist movement of the A/V device 202 relative to the barrier. In various embodiments, the gasket(s) 456 and/or 458 may comprise rubber, silicone, various plastics, etc.

In the examples of FIGS. 18A-18B, the gasket(s) 456 and/or 458 comprise ribbed portions (e.g., portions with raised bands). For example, the second gasket 456 may include a ribbed portion 456(A) that extends around a perimeter of the second gasket 456. Further, the first gasket 458 may include a first ribbed portion 458(A) that extends around a perimeter of the first gasket 458 and a second ribbed portion 458(B) that extends around the opening 462 in the first gasket 458. Although illustrated as ribbed components, the gasket(s) 456 and/or 458 may not be ribbed and/or may include other texture.

Figure 18C:
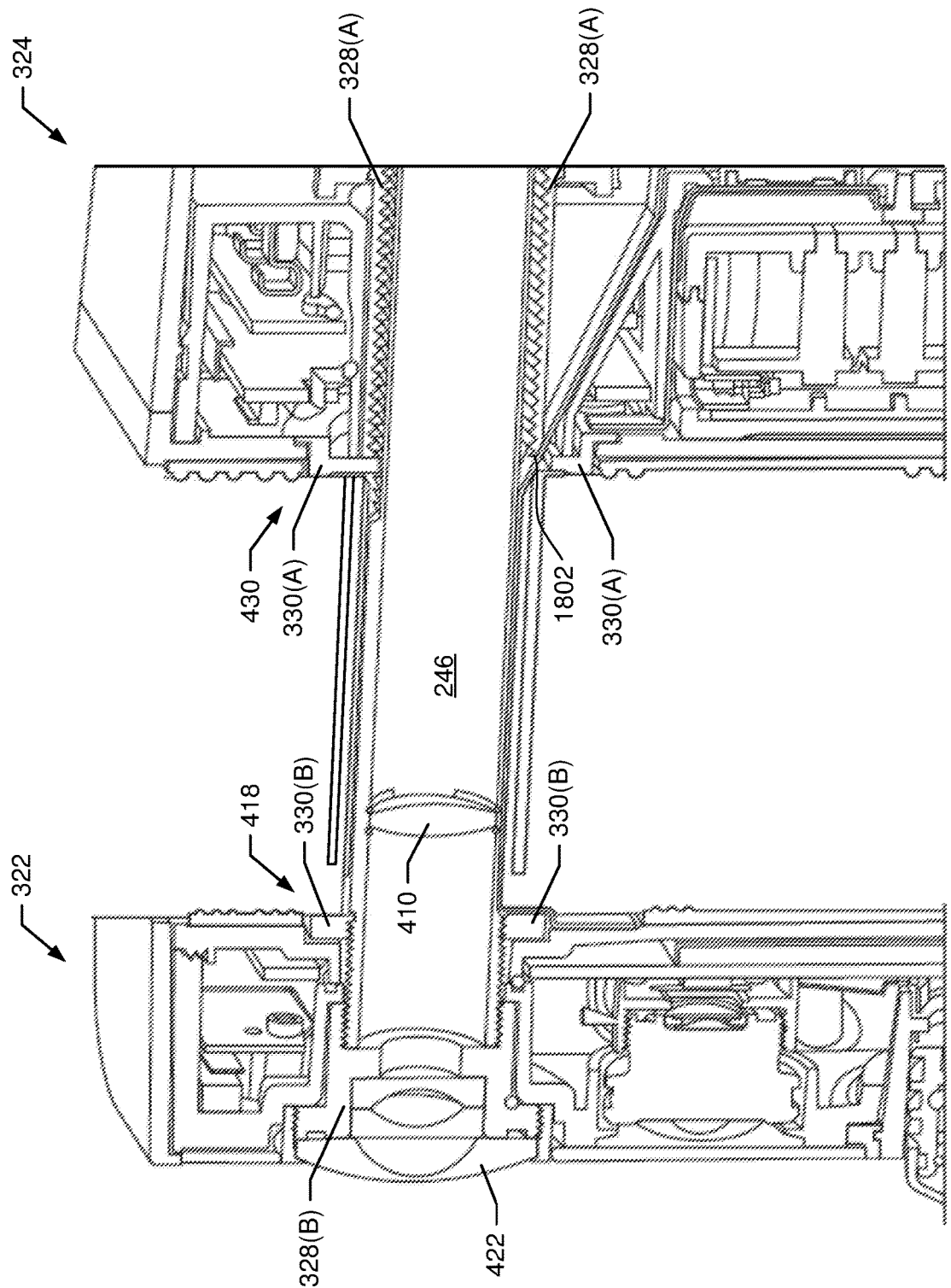
FIG. 18C is a side perspective cross-sectional view of a portion of the A/V device with a viewer of FIGS. 18A-18B, according to various aspects of the present disclosure.

FIG. 18C is a perspective view of a portion of the A/V device 202 including the viewer 246 with the rings 330(A)-(B), according to various aspects of the present disclosure. As shown, the first ring 330(A) (may also be referred to as first fire-resistant ring) is located at least partially within the first opening 418 of the first component 322. The first ring 330(A) may encircle the second part 446 (FIG. 4B) of the viewer 246, but not be directly attached thereto. The fastener 328(A) includes female threading that engages male threading on the second part 446 of the viewer 246. The fastener 328(A) further includes a distal end 1802 that bears against the first ring 330(A) and presses the first ring 330(A) against the barrier when the A/V device 202 is attached to the barrier. The first ring 330(A) is thus interposed between the fastener 328(A) and the barrier when the A/V device 202 is attached to the barrier. The fastener 328(A) further overlaps the second end 446 of the viewer 246, but does not extend into or contact the barrier.

The second ring 330(B) (may also be referred to as second fire-resistant ring) is located at least partially within the second opening 430 of the second component 324. In some instances, the second ring 330(B) may be detachably coupled to the second part 446 of the viewer 246. For example, the second ring 330(B) may include female threading and the second part 446 of the viewer 246 may include male threading, although in other embodiments the second ring 330(B) may not include threading. The second ring 330(B) is configured such that the second ring 330(B) is interposed between a portion of the second component 324 and the barrier when the A/V device 202 is attached to the barrier. The portion of the second component 324 may include the fastener 328(A).

As described herein, the first ring 330(A) and/or the second ring 330(B) are preferably non-flammable, heat resistant, have a high melting point, and may include a material with a threshold fire rating. In some embodiments, the first ring 330(A) and/or the second ring 330(B) may include melting points of at least 1,220 degrees Fahrenheit, at least 1,710 degrees Fahrenheit, at least 2,750 degrees Fahrenheit, and/or any other minimum temperature. Additionally, and as described herein, in some instances, the second lens 422 of the first component 322 and/or the first lens 410 of the viewer 246 may include high temperature glass with a threshold melting point. The threshold melting point for the first lens 410 and/or the second lens 422 may include, but is not limited to, at least 450 degrees Fahrenheit, at least 1,000 degrees Fahrenheit, at least 1,700 degrees Fahrenheit, and/or any other minimum temperature. As such, the viewer 246, the first lens 410, the second lens 422, the first ring 330(A), and/or the second ring 330(B) may secure the opening of the barrier during a fire, not allowing fire to travel from one side of the barrier, through the opening of the barrier, and to the other side of the barrier.

In particular, the second ring 330(B) has a threaded engagement with the viewer 246 such that the second ring 330(B) bears against the outer surface of the barrier, around the opening of the barrier, when the A/V device 202 is attached to the barrier. Additionally, the fastener 328(A) has a threaded engagement with the viewer 328(A). As the fastener 328(A) is tightened, the distal end 1802 of the fastener 328(A) bears against the first ring 330(A), which presses the first ring 330(A) against the inner surface of the barrier, around the opening of the barrier. As such, after the fastener 328(A) is tightened, the structure comprising these four components (the viewer 246, the first and second rings 330(A), 330(B), and the fastener 328(A)) creates a fire-resistant barrier that prevents the passage of fire through the opening in the barrier for at least a threshold period of time. The threshold period of time may include, but is not limited to, forty-five minutes, one hour, one and a half hours, three hours, or any other length of time. For example, the A/V device 202 may satisfy one or more fire certification tests, such as, but not limited to, UL10C, EN 13501-2, BS476-20, BS476-22, AU 1905-1, and/or one or more other fire certification tests.

Figure 19A:
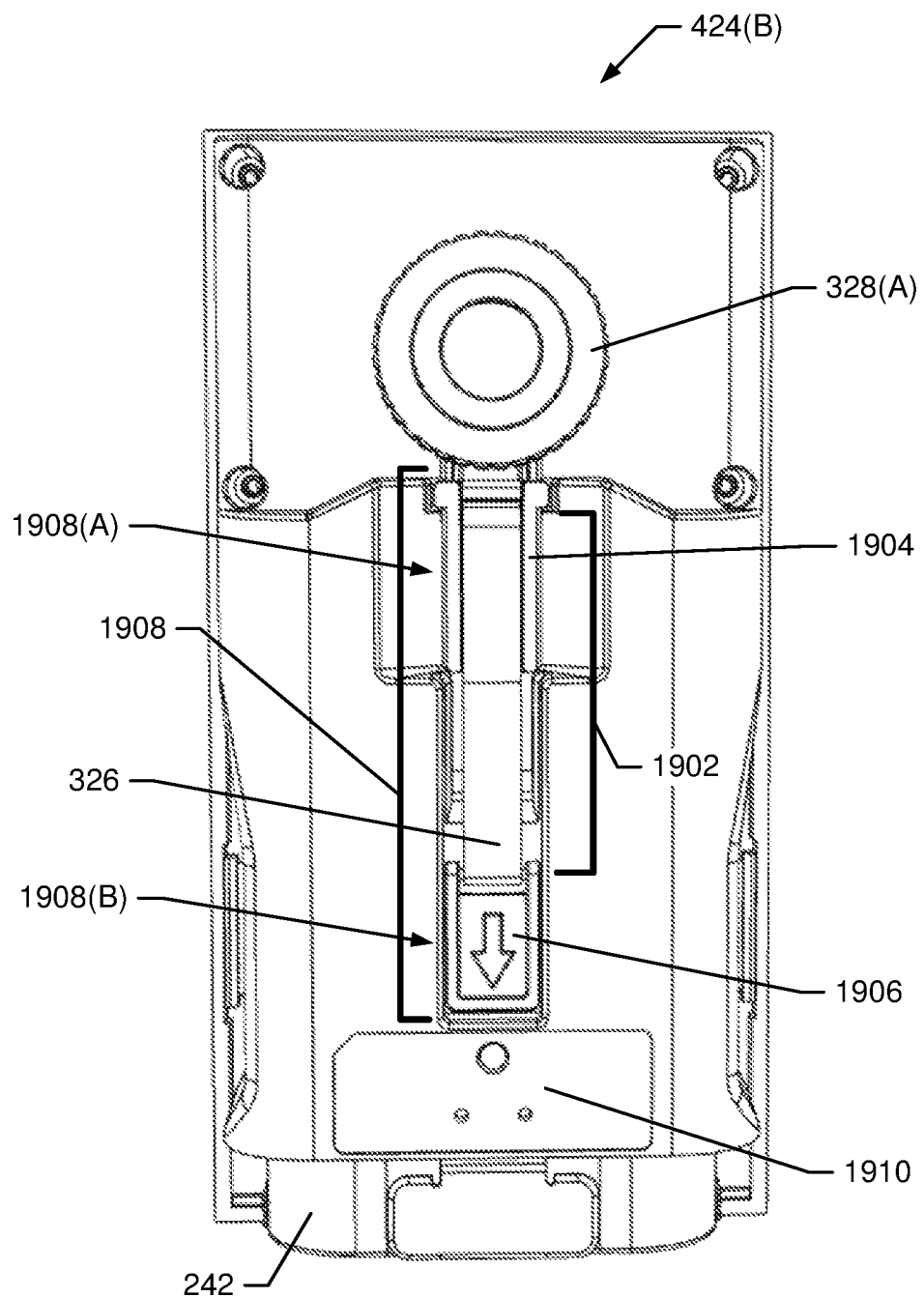
FIG. 19A is a front view illustrating an example of a second component of the A/V device of FIGS. 4A-4C, according to various aspects of the present disclosure.

FIGS. 19A-19M illustrate various aspects of securing an example flexible connector 326 to the second component 324. FIG. 19A illustrates an example of the rear portion 424(B) of the second housing 424 with the front portion 424(A) of the second housing 424 removed. In particular, FIG. 19A illustrates the battery 242, the flexible connector 326, an excess connector receiving portion 1902, a connector holder 1904, and a tab 1906. As shown, the flexible connector 326 may extend around the connector holder 1904 and the tab 1906. In examples, the flexible connector 326 may include excess length to allow the flexible connector 326 to be installed in barriers of various thicknesses. During installation, the tab 1906 may be pulled (e.g. in a downward direction with respect to FIG. 19A) to pull the excess length through the barrier, creating the excess connector receiving portion 1902 (e.g., a service loop). The tab 1906 and/or the connector holder 1904 may be attached to the rear portion 424(B) of the second housing 424 to secure the excess connector receiving portion 1902. For example, the connector holder 1904 may be attached to the flexible connector 326 and removably attachable to a first end 1908(A) of a channel 1908 on the rear portion 424(B) of the second housing 424. The tab 1906 may removably attach to a second end 1908(B) of the channel 1908. As such, the excess connector portion 1902 (e.g., a service loop of the flexible connector 326) may be retained within the channel 1908 when the connector holder 1904 is attached to the first end 1908(A) of the channel 1908 and the tab 1906 is attached to the second end 1908(B) of the channel 1908. A length of the channel 1908 may accommodate a length of the service loop when the flexible connector 326 is extended in an installed state.

In some examples, a Quick Response (QR) code, barcode, or other type of marker may be placed at a location 1910 (e.g., with a sticker, printed, etc.). A user may scan the marker with a camera of a mobile device, for example, and be directed to content that enables the user to install the A/V device 202, such as a website, application, etc.

Figure 19C:
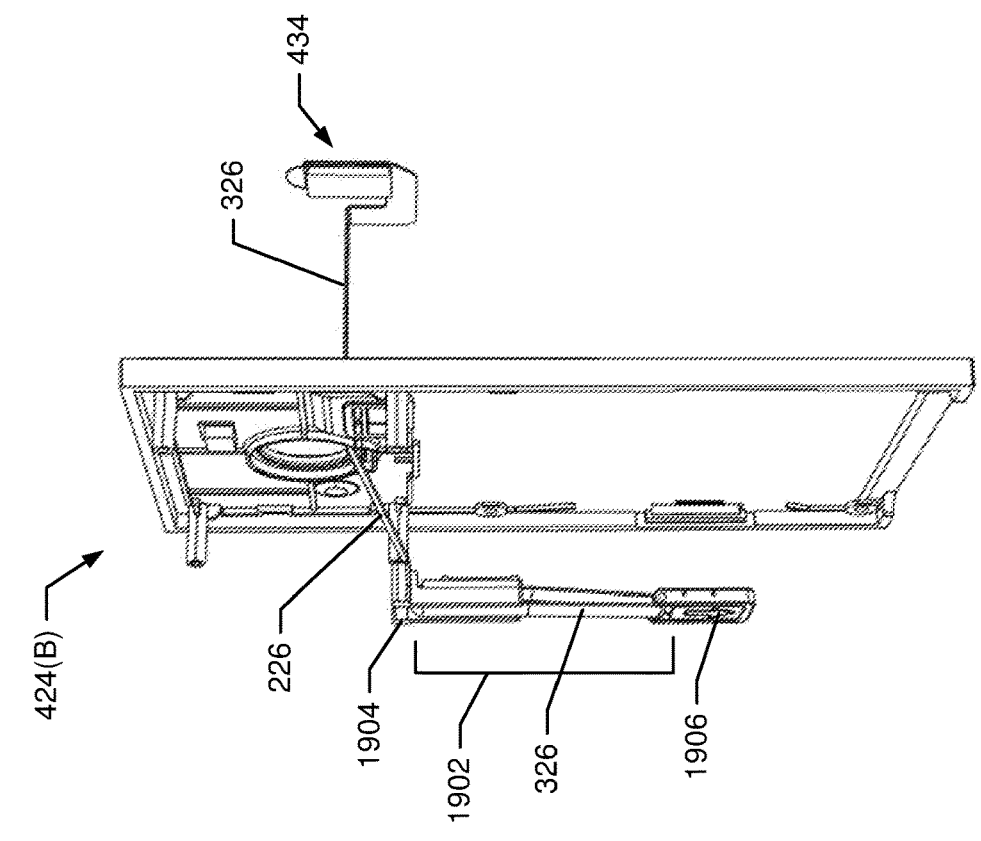
FIG. 19C is a side perspective view illustrating an example of the second component of the A/V device of FIG. 19B with a portion removed, according to various aspects of the present disclosure.
Figure 19B:
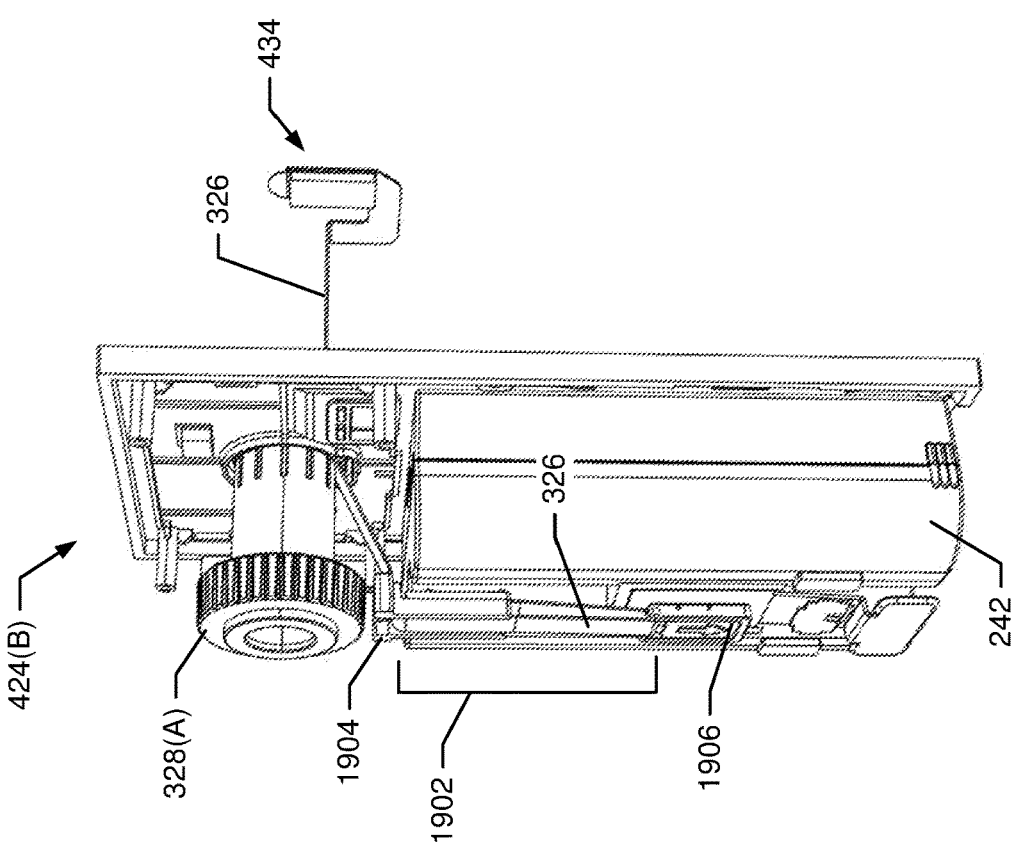
FIG. 19B is a side perspective view illustrating an example of the second component of the A/V device of FIG. 19A with a portion removed, according to various aspects of the present disclosure.

FIG. 19B illustrates an example of the rear portion 424(B) with a portion of the rear portion 424(B) that is illustrated in FIG. 19A removed to show how the flexible connector 326 is positioned in the A/V device 202 (e.g., in an installed and tightened position). As illustrated, the flexible connector 326 may include the first coupler 434 for connection to the first connection port 436 on the first component 322 (not illustrated in FIG. 19B). FIG. 19C illustrates an example of the rear portion 424(B) with components that are illustrated in FIG. 19B removed to show how the flexible connector 326 is positioned in the A/V device 202 (e.g., in an installed and tightened position).

FIG. 19D illustrates a first view of the flexible connector 326, the connector holder 1904, and the tab 1906 (e.g., removed from the rear portion 424(B)). FIG. 19E illustrates a second view of the flexible connector 326, the connector holder 1904, and the tab 1906 to show the first coupler 434 and the second coupler 438. As noted above, the first coupler 434 may connect to the first component 322 and the second coupler 438 may connect to the second component 324.

Figure 19F:
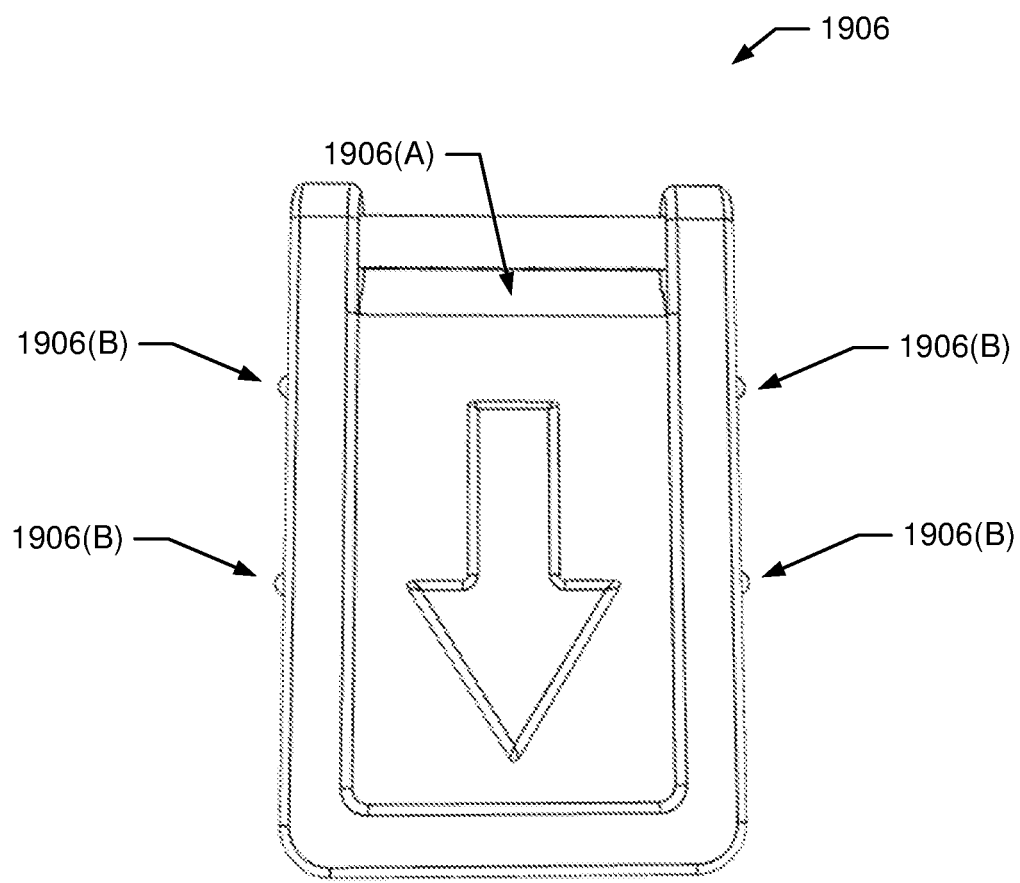
FIG. 19F is a front view illustrating an example tab, according to various aspects of the present disclosure.

FIG. 19F illustrates a front view of the tab 1906. The tab 1906 may include an opening 1906(A), such as a slot, to receive the flexible connector 326 (not illustrated in FIG. 19F). The flexible connector 326 may be pulled through the opening 1906(A) during installation to remove excess length in the flexible connector 326. The tab 1906 may also include detents (e.g., protrusions) 1906(B). The detents 1906(B) may enable the tab 1906 to engage the channel 1908 in the rear portion 424(B) of the second housing 424, as discussed in further detail below. Although four detents 1906(B) are illustrated in FIG. 19F, any number of detents may be used.

Figure 19H:
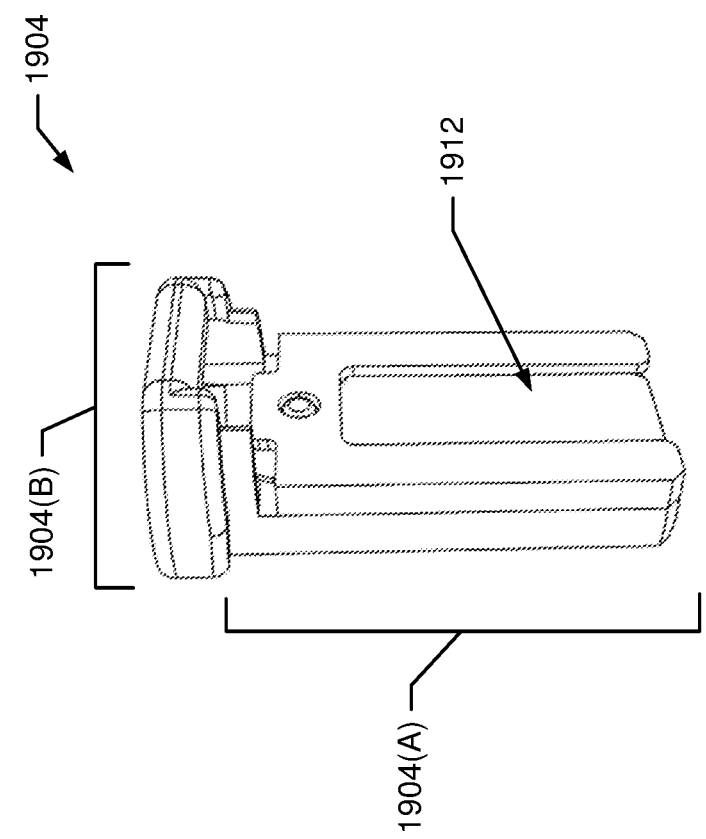
FIG. 19H is a rear perspective view of the example connector holder of FIG. 19G, according to various aspects of the present disclosure.
Figure 19G:
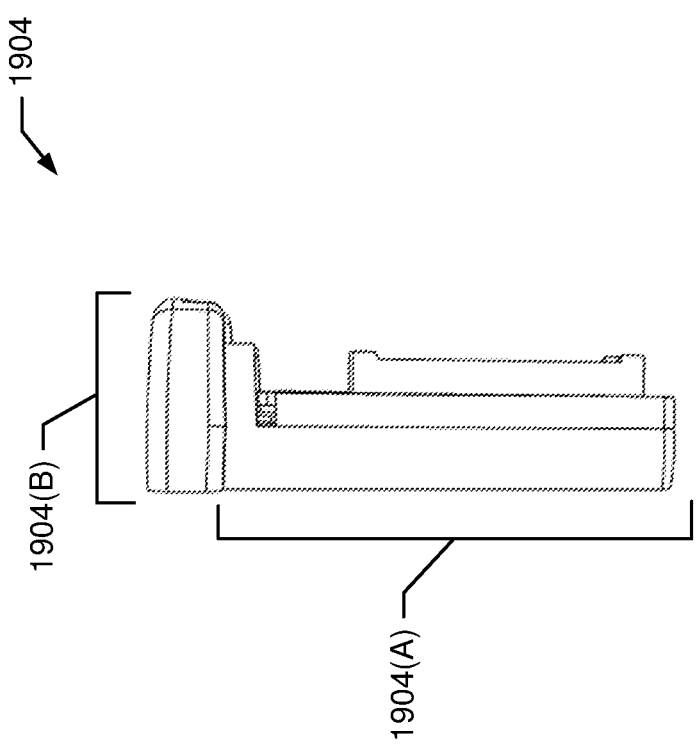
FIG. 19G is a side view illustrating an example connector holder, according to various aspects of the present disclosure.

FIG. 19G illustrates a side view of the connector holder 1904. The connector holder 1904 has a first portion 1904(A) that extends in a first direction and a second portion 1904(B) that extends from the first portion 1904(A) such that the second portion 1904(B) extends in a second direction transverse to the first direction, such as in a perpendicular manner.

FIG. 19H illustrates a perspective view of the connector holder 1904. As illustrated, the connector holder 1904 includes an opening 1912 where the second coupler 438 of the flexible connector 326 may protrude through, as shown in FIG. 19E. As such, the first portion 1904(A) of the connector holder 1904 may attach to the second coupler 438 of the flexible connector 326, again as shown in FIG. 19E.

Figure 19I:
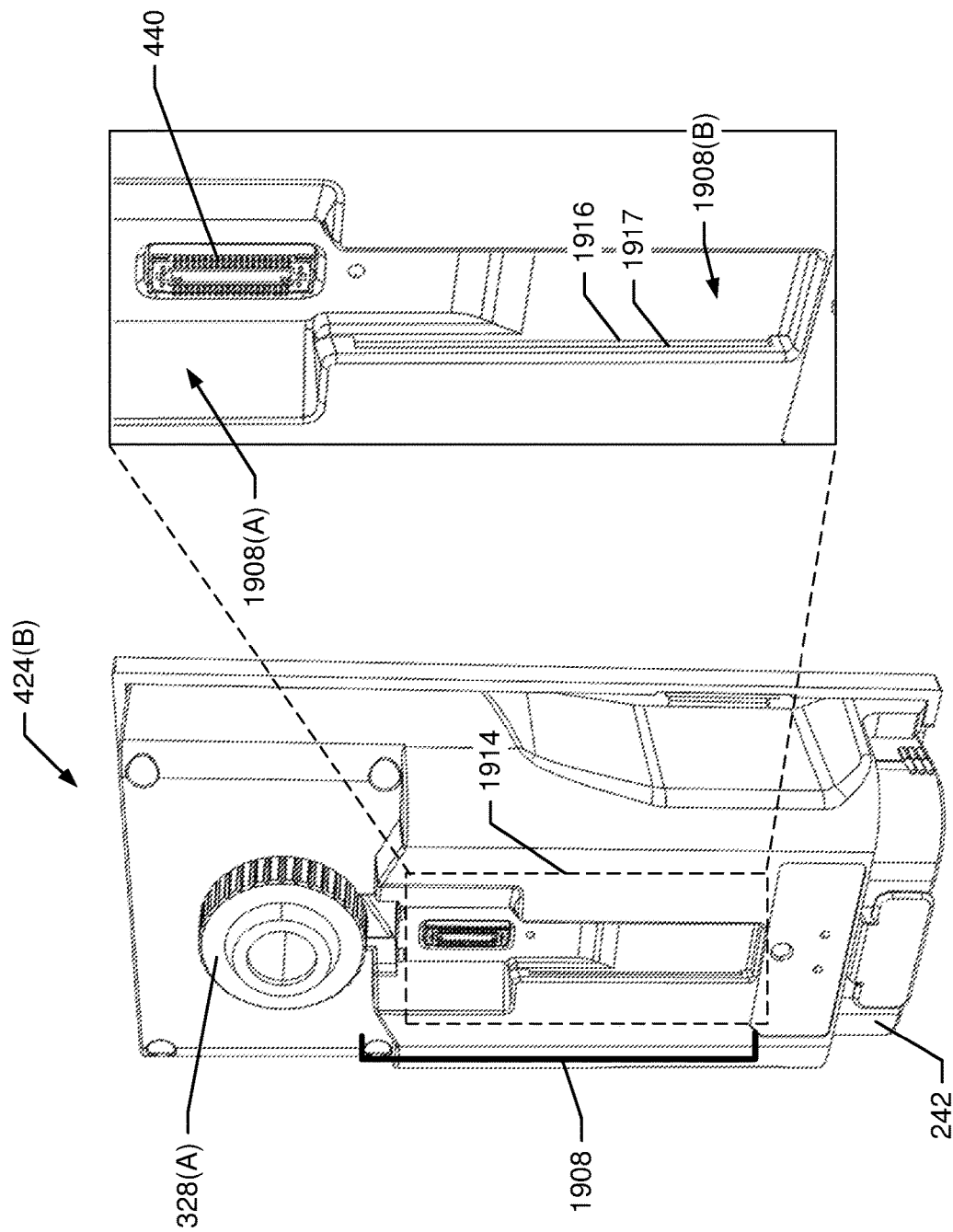
FIG. 19I is a detail perspective view of a channel of the second component of the A/V device of FIG. 19A taken from a first example perspective, according to various aspects of the present disclosure.

FIG. 19I illustrates example details of the channel 1908 of the rear portion 424(B) of the second housing 424 taken from a first example perspective view. In particular, FIG. 19I illustrates a detail view of a portion 1914 of the rear portion 424(B). As illustrated, the first end 1908(A) of the channel 1908 may include the second connection port 440 to connect to the second coupler 438 of the flexible connector 326. That is, the second housing 424 may include the second connection port 440 to connect to the second coupler 438 (FIG. 19E). The channel 1908 may also include an undercut 1916 just beneath first and second opposite ledges 1917, and the undercut 1916 and ledges 1917 may engage with the tab 1906 (e.g., to engage with the detents 1906(B)). For example, the tab 1906 may seat within the channel 1908 in a friction fit engagement with the detents 1906(B) seating within the undercut 1916 just beneath the ledges 1917. The tab 1906, including the detents 1906(B), engages the channel 1908 in a friction fit to resist any upward movement of the tab 1906 within the channel 1908, thereby maintaining a slight tension in the flexible connector 326 that resists relaxation of the flexible connector 326, which might otherwise create slack and/or bowing in the flexible connector 326. Further, when the tab 1906 is pressed into the channel 1908 during the process of installing the A/V device 202, the tab 1906 may "snap" into the channel 1908 as the detents 1906(B) seat within the undercut 1916 (e.g., because a width of the tab 1906 as measured across the detents 1906(B) may be slightly greater than a width of the channel 1908 as measured across the ledges 1917). In this example, the undercut 1916 may extend along a majority of a length of the channel 1908 (e.g., more than 50% of the length of the channel 1908). In other examples, the undercut 1916 may be shorter or longer in length.

Figure 19J:
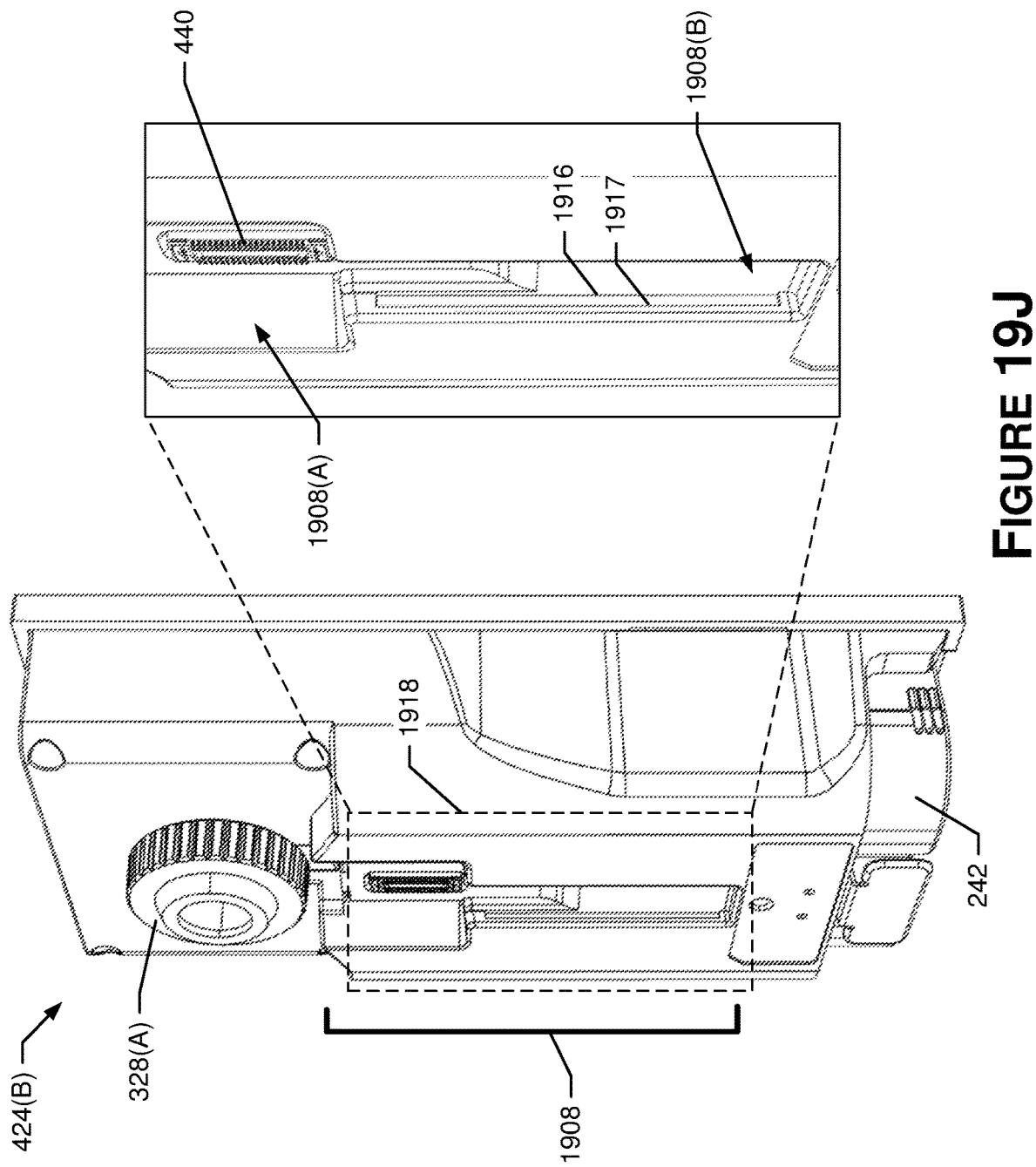
FIG. 19J is a detail perspective view of a channel of the second component of the A/V device of FIG. 19A taken from a second example perspective, according to various aspects of the present disclosure.

FIG. 19J illustrates further example details of the channel 1908 of the rear portion 424(B) of the second housing 424 taken from a second example perspective view. In particular, FIG. 19J illustrates a view of a portion 1918 of the rear portion 424(B) to further illustrate details of the undercut 1916 and the ledges 1917.

Figure 19K:
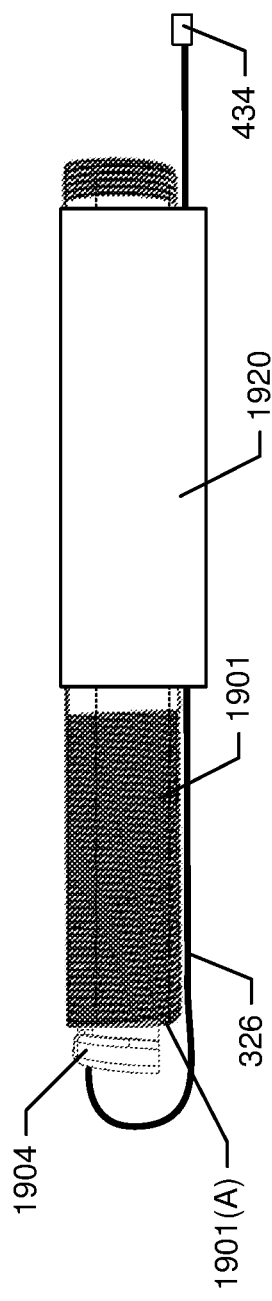
FIG. 19K is a side view illustrating the example connector holder of FIG. 19G inserted within an opening in a tubular member, according to various aspects of the present disclosure.
Figure 19L:
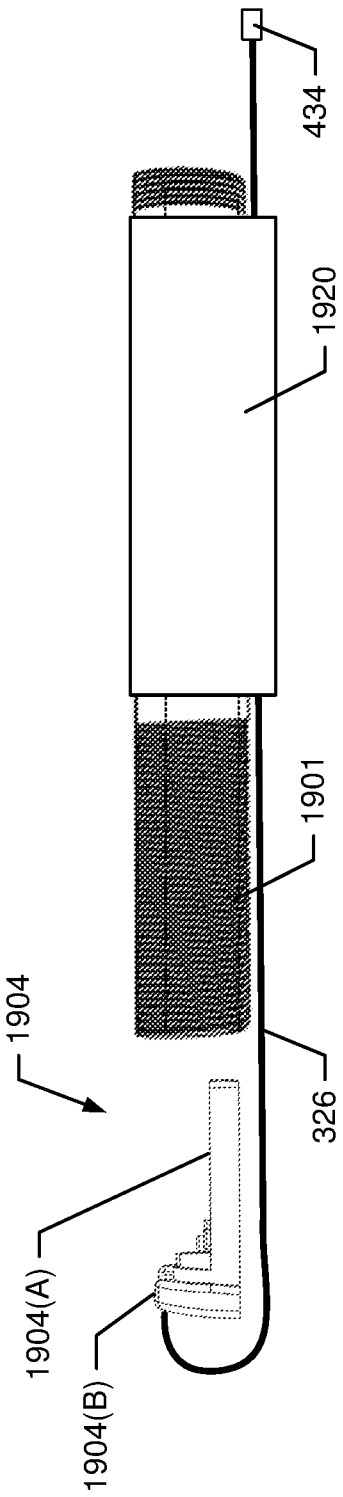
FIG. 19L is a side view illustrating the example connector holder of FIG. 19G removed from a tubular member, according to various aspects of the present disclosure.

FIGS. 19K-19L illustrate the tubular member 1901 and the flexible connector 326 during an example installation process. In particular, FIGS. 19K-19L illustrate how the flexible connector 326 may be positioned partly within tubular member 1901 to facilitate inserting the flexible connector 326 into an opening in a barrier. In this example, the tubular member 1901 is illustrated within a tube 1920 that represents the opening in the barrier. The flexible connector 326 may extend along the tubular member 1901 in a space between the tubular member 1901 and the tube 1920, where the space between the tubular member 1901 and the tube 1920 is partially bounded by the flat portion 754 of the tubular member 1901. FIG. 19K illustrates the connector holder 1904 inserted within an opening at the first end 1901(A) of the tubular member 1901, while FIG. 19L illustrates the connector holder 1904 removed from the first end 1901(A) of tubular member 1901.

With reference to FIG. 19L, in examples, an outer shape of the first portion 1904(A) of the connector holder 1904 may substantially correspond to an inner shape of the passage 408 of the viewer 246. In one example, the inner shape of the passage 408 may be circular and one or more of the outer surfaces of the first portion 1904(A) may be rounded to fit within the circular passage 408. In another example, the inner shape of the passage 408 may be rectangular and the first portion 1904(A) may be rectangular to fit within the rectangular passage 408. In examples, the first portion 1904(A) (and/or the second portion 1904(B)) may have a width, thickness, diameter, etc. that is the same as or less than a width, diameter, etc. of the inner surface of the passage 408. Further, in examples, the first portion 1904(A) may engage with the passage 408 in a friction fit engagement to maintain the connector holder 1904 in the viewer 246 during installation.

In examples, during installation, the connector holder 1904 may be disposed within the passage 408 in the viewer 246, as shown in FIG. 19K, with the second coupler 438 of the flexible connector 326 attached to the connector holder 1904, as shown in FIG. 19E. Then, the viewer 246 may be inserted into an opening (represented by the tube 1920 in FIG. 19K) in a barrier. This aspect of the present embodiments allows the flexible connector 326 to be passed through the opening in the barrier without being damaged. Once inserted, the connector holder 1904 may be removed from the viewer 246, as illustrated in FIG. 19L, and the second coupler 438 housed within the connector holder 1904 (FIG. 19E) may be connected to the second connection port 440 (FIG. 19I). The tab 1906 may then be pulled down to tighten any slack in the flexible connector 326, and the tab 1906 may then be snapped into the channel 1908 of the rear portion 424(B), as illustrated in FIG. 19A, with the detents 1906(B) seating within the undercut 1916 (FIG. 19I). An example process for mounting the A/V device 202 on a barrier is described in further detail below.

Figure 19M:
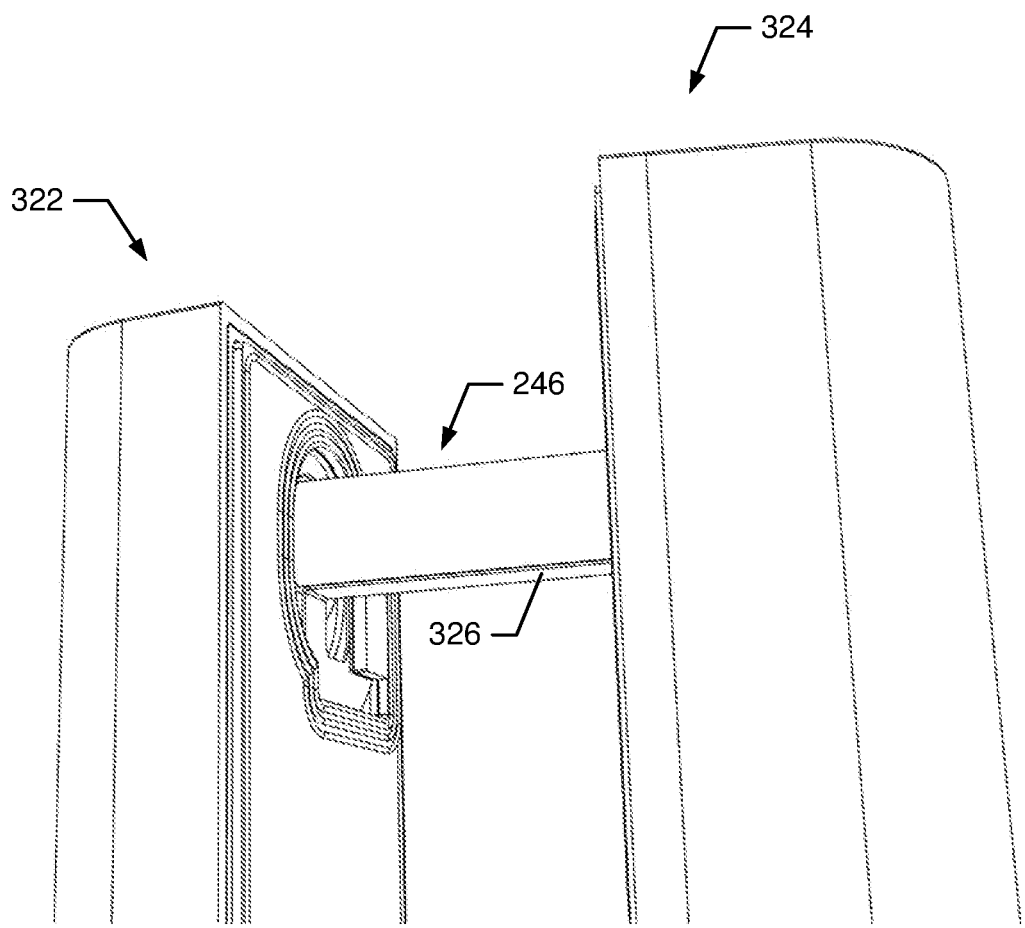
FIG. 19M is a side perspective view of the A/V device of FIG. 19A with an example flexible connector attached between the first component and the second component, according to various aspects of the present disclosure.

FIG. 19M illustrates the A/V device 202 with the flexible connector 326 attached between the first component 322 and the second component 324. In particular, the flexible connector 326 is positioned below, and extending along the flat portion 454 of, the viewer 246. FIG. 19M illustrates how the flexible connector 326 and the viewer 246 may be arranged when installed within an opening in a barrier (omitted from FIG. 19M for clarity). As illustrated, the flexible connector 326 may be pulled to be substantially taut by pulling downward on the tab 1906 as described above.

Figure 20:
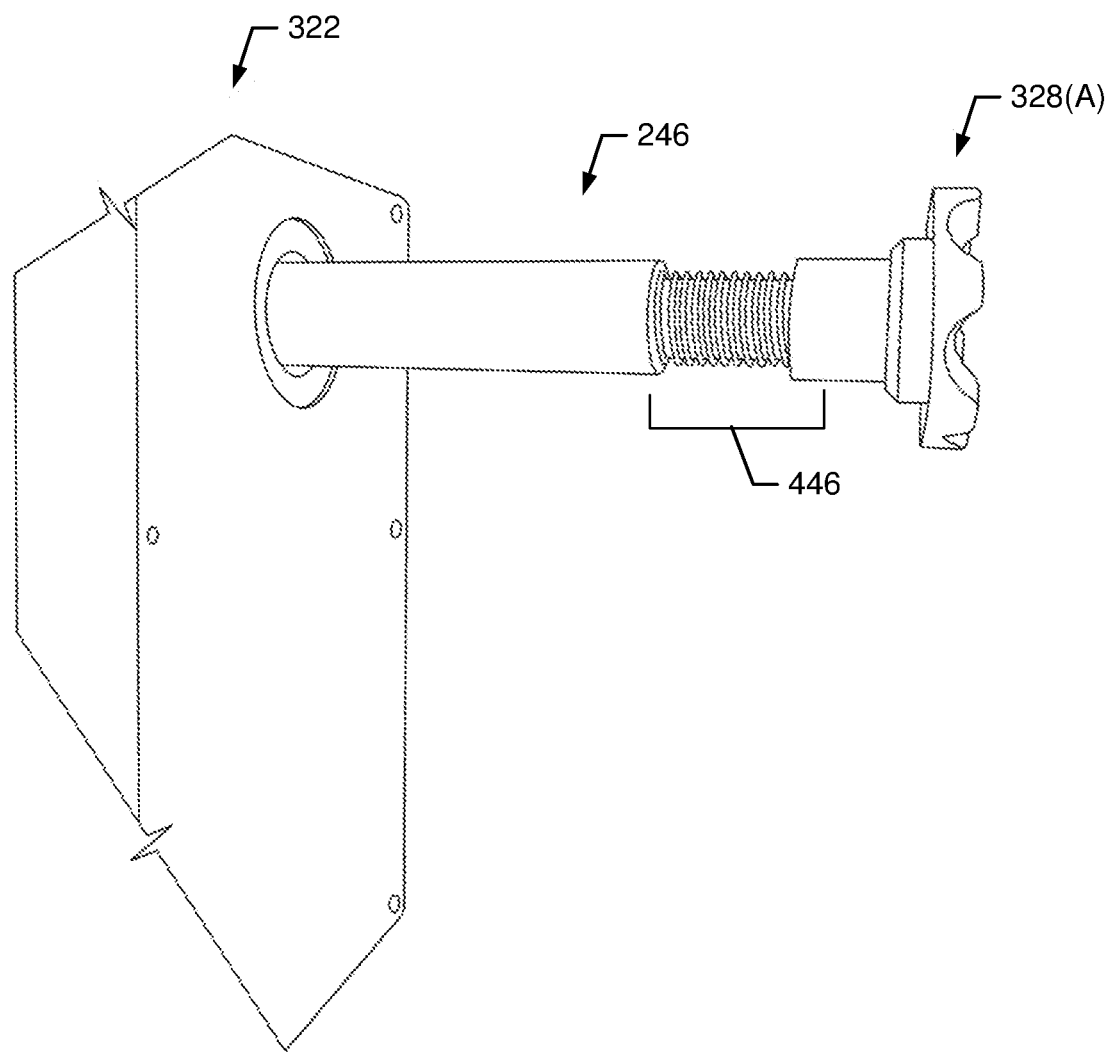
FIG. 20 is side perspective view of an example fastener that attaches to the viewer of FIG. 8, according to various aspects of the present disclosure.
Figure 21:
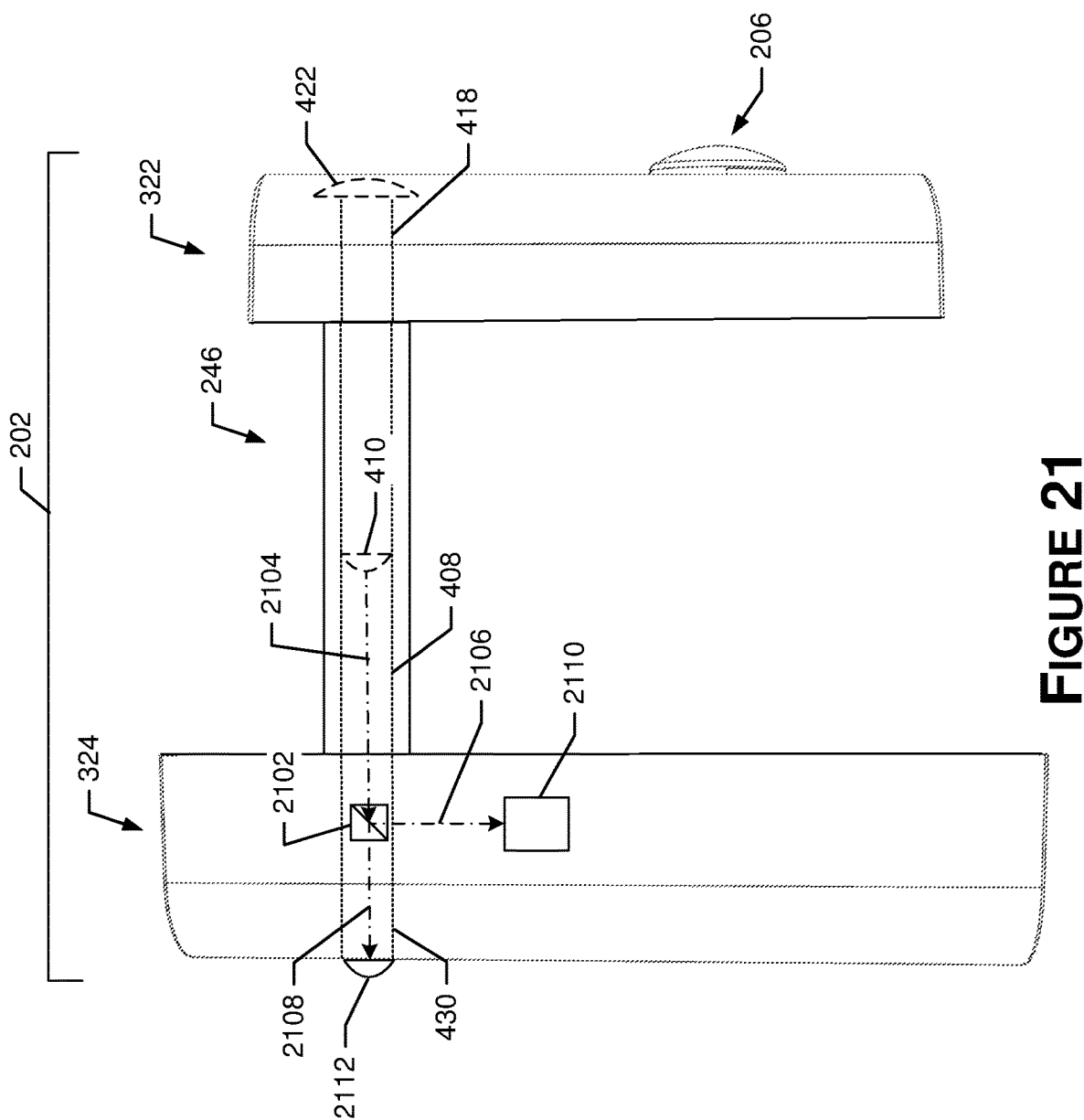
FIG. 21 is a side view of the A/V device with a viewer of FIGS. 4A-4C implemented with a beam splitter, according to various aspects of the present disclosure.

FIG. 20 illustrates an example of the fastener 328(A) that attaches to the second part 446 of the viewer 246. In particular, the viewer 246 may extend into and/or be connected to the first component 322. Threads on the second part 446 of the viewer 246 may receive the fastener 328(A). The fastener 328(A) is implemented as a nut in this example. As one example of installation, the first component 322 (with the viewer 246 attached) may be placed in contact with an exterior of a barrier by sliding the viewer 246 through an opening in the barrier. The second component 324 may then be slid onto the second part 446 of the viewer 246. The fastener 328(A) may then be placed on the second part 446 of the viewer 246 and tightened. Tightening the fastener 328(A) may cause the first component 322, which is located on one side of the barrier, and the second component 324, which is located on the other side of the barrier, to clamp to the barrier.

In some examples, the A/V device 202 may include different sized viewers 246 and/or an extender that attaches to the viewer 246 in order to account for different thicknesses of barriers, different diameters of openings in barriers, etc. For example, the A/V device 202 may be distributed (e.g., sold) with multiple viewers 246 that are different lengths and/or diameters. A user may remove an existing door viewer and install the viewer 246 that is sized for that particular installation (e.g., extends through a barrier).

Although many examples are discussed in the context of using the viewer 246, in some examples the A/V device 202 may be implemented without the viewer 246. For example, an existing door viewer may be left in a door, and the first component 322 and the second component 324 may be installed and aligned to the existing door viewer, so that a user may continue to use the existing door viewer and implement the functionality of the A/V device 202. Here, the A/V device 202 may be attached to the barrier with fasteners, adhesive, etc.

Moreover, in some examples, the A/V device 202 may be implemented without a door viewer. To illustrate, the first component 322 may be attached to a first side of a barrier and the second component 324 may be attached to a second side of the barrier (using the viewer 246 through an opening in the barrier or without the viewer 246). Here, the first component 322 may capture image data and display the image data on a display on the second component 324. This configuration may allow a user to view what is occurring on the first side of the barrier without opening the barrier.

Each of the processes described herein, including the process 2800, is illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 22:
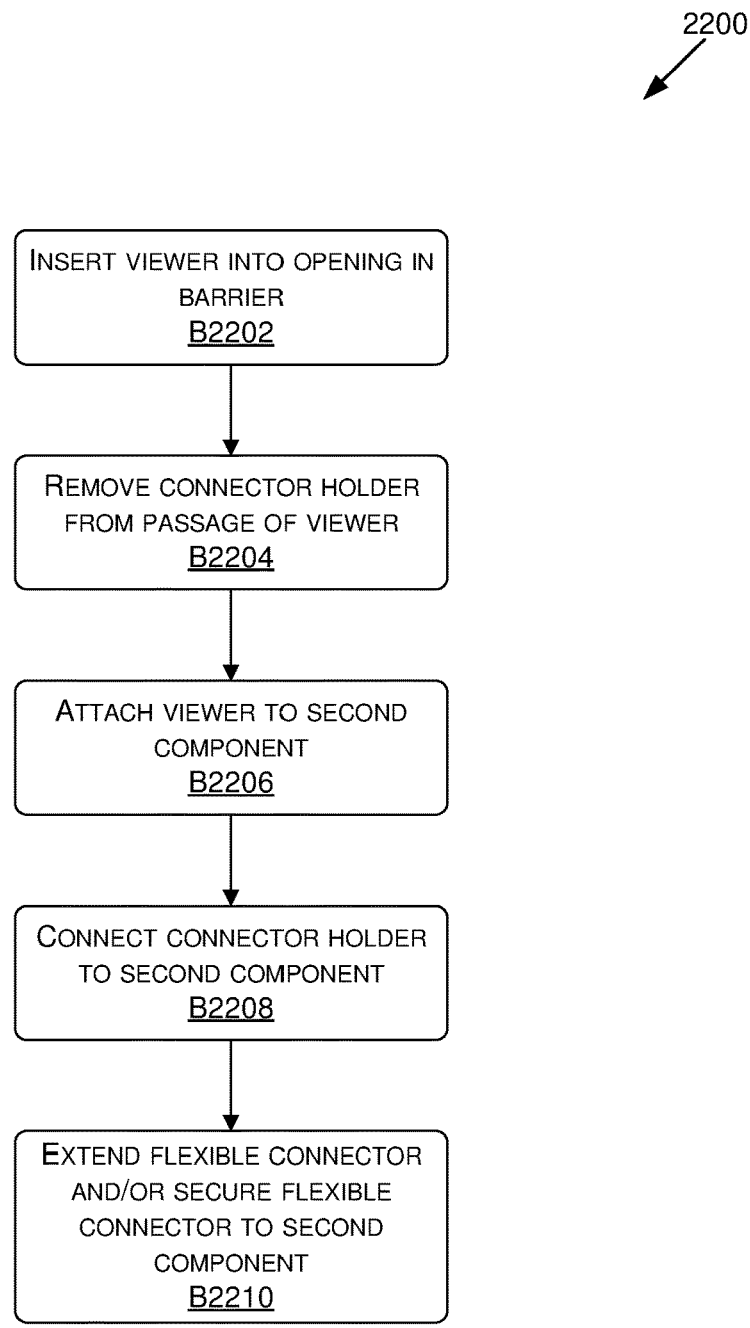
FIG. 22 is a flowchart illustrating an example process for installing various embodiments of the present A/V devices, according to various aspects of the present disclosure.

FIG. 22 is a flowchart illustrating a process 2200 for installing an A/V device on a barrier (e.g., a door) according to various embodiments of the present disclosure. In examples, the process 2200 may be performed by a user. For ease of illustration, the process 2200 will be discussed in the context of the example A/V device 202 discussed herein.

Prior to block B2202, the first end 404 (FIG. 4A) of the viewer 246 may be connected to the first component 322, the flexible connector 326 may be attached to the connector holder 1904 (FIG. 19E), and the connector holder 1904 may be disposed within the opening of the passage 408 of the viewer 246 (FIG. 19K). In some embodiments, at least one of the foregoing steps may be an aspect of the process 2200, while in other embodiments these steps may be precursors to the process 2200, but not part of the process 2200 itself.

The process 2200, at block B2202, includes inserting the viewer into an opening in the barrier. For example, the viewer 246, which includes the connector holder 1904 disposed within the opening of the viewer 246, may be inserted into an opening in a barrier. The barrier may be a door, and the viewer 246 may be inserted into the opening in the door from the outside, such that the first component 322 is disposed adjacent the outside surface of the door. In examples, the flexible connector 326 extends along the flat portion 454 of the tubular member 1901, outside of the viewer 246.

The process 2200, at block B2204, includes removing (e.g., withdrawing) the connector holder from a passage of the viewer. For example, the connector holder 1904 may be pulled out from the opening of the viewer 246.

The process 2200, at block B2206, includes attaching the viewer to the second component. For example, the second part 446 (FIG. 4B) of the viewer 246 may be inserted into the second opening 430 in the second component 324, and the fastener 322(A) may be attached to the second part 446 of the viewer 246 and tightened. Tightening the fastener 322(A) on the second part 446 of the viewer 246 brings the second component 324 and the first component 322 closer together, sandwiching the barrier in between and bringing the first and second components 324, 324 into close abutment with their respective sides of the barrier. Tightening the fastener 322(A) on the second part 446 of the viewer 246 also compresses the first gasket 458 between the first component 322 and the outer surface of the barrier, and compresses the second gasket 456 between the second component 324 and the inner surface of the barrier. The gaskets 456, 458, which may comprise a high-friction material, may resist movement of the first and second components 322, 324 relative to the barrier. The gaskets 456, 458, and particularly the ribbed portions 456(A), 458(A), 458(B) of the gaskets 456, 458 (FIGS. 18A-18B), may further provide moisture sealing for the space between the first component 322 and the barrier and the space between the second component 324 and the barrier.

The process 2200, at block B2208, includes connecting the connector holder to the second component. For example, the second coupler 438 (FIG. 19E) housed within the connector holder 1904 may be connected to the second connection port 440 (FIG. 19I) located in the first end 1908(A) of the channel 1908. Connecting the second coupler 438 to the second connection port 440 electrically and communicatively couples the first component 322 to the second component 324.

The process 2200, at block B2210, includes extending the flexible connector and/or securing the flexible connector to the second component. For example, the tab 1906 of the flexible connector 326 may pulled downward to tighten up excess length in the flexible connector 326, and the tab 1906 may then be seated within the channel 1908 to secure the flexible connector 326 to the second component 324. In examples, the flexible connector 326 includes the tab 1906 slidably disposed along its length.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present disclosure is not limited to the particular embodiments disclosed. On the contrary, the present disclosure covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

EXAMPLE CLAUSES

In a first aspect, an audio/video recording and communication doorbell (A/V doorbell) comprising: a viewer having a viewer first end, a viewer second end, and a passage extending between the viewer first end and the viewer second end; a first component coupled to the viewer first end, the first component comprising: a first opening concentrically aligned with the viewer; and a first fire-resistant ring located at least partially within the first opening such that the first fire-resistant ring is interposed between a portion of the first component and a barrier when the first component is secured to the barrier; a second component coupled to the viewer second end, the second component comprising: a second opening concentrically aligned with the viewer; a lens located proximate to the second opening; a camera; a button, the button comprising: a button lens; a button housing; an internal structure; a button connector secured to the internal structure; a third opening located on a portion of the button housing; a flex printed circuit board located within the third opening and electrically connected to the button connector; and a seal located within the third opening; and a second fire-resistant ring located at least partially within the second opening such that the second fire-resistant ring is interposed between a portion of the second component and the barrier when the second component is secured to the barrier; and a flexible connector extending along an outside of the viewer between the first component and the second component, the flexible connector electrically coupling the second component to the first component.

In an embodiment of the first aspect, further comprising: a shutter movable with respect to the first component between a first position and a second position, the shutter being located proximate to the first end of the viewer when in the first position; and a tab extending from the shutter for moving the shutter between the first position and the second position.

In another embodiment of the aspect, wherein: the first component further comprises a first tightening nut for coupling the first component to the first end of the viewer; the portion of the first component is the first tightening nut; the second component further comprises a second tightening nut for coupling the second component to the second end of the viewer; and the portion of the second component is the second tightening nut.

In a second aspect: a viewer having a viewer first end, a viewer second end, and a passage extending between the viewer first end and the viewer second end; a first component coupled to the viewer first end, the first component comprising: a first opening located proximate to the viewer first end; and a ring located at least partially within the first opening such that the ring is interposed between a portion of the first component and a barrier when the first component is secured to the barrier; and a second component coupled to the viewer second end, the second component comprising: a second opening located proximate to the viewer second end; a camera; and a button.

In an embodiment of the second aspect, the second component further comprises an additional ring located at least partially within the second opening such that the additional ring is interposed between a portion of the second component and the barrier when the second component is secured to the barrier.

In another embodiment of the second aspect, the additional ring includes threads that secure the ring to the viewer.

In another embodiment of the second aspect, the first component further comprises a fastener secured to the viewer first end.

In another embodiment of the second aspect, the ring is interposed between the fastener and the barrier when the first component is secured to the barrier.

In another embodiment of the second aspect, fastener overlaps the viewer and does not extend into the barrier when the first component is secured to the barrier.

In another embodiment of the second aspect, the fastener comprises: a first fastener end; a second fastener end; and raised edges located around the first fastener end, the raised edges to secure the fastener to the viewer first end.

In another embodiment of the second aspect, the second component further comprises a lens coupled to the viewer second end.

In another embodiment of the second aspect, wherein: the lens overlaps the viewer within the second component; and the second component further comprises an additional ring located at least partially within the second opening such that the additional ring is located between the lens and the barrier when the second component is secured to the barrier.

In another embodiment of the second aspect, wherein: the lens includes threads for securing the lens to the viewer second end; and the lens overlaps the viewer within the second component.

In another embodiment of the second aspect, the ring comprises at least one of brass or a melting point of at least 1,710 degrees Fahrenheit.

In a third aspect, a doorbell comprises: a viewer having a viewer first end, a viewer second end, and a passage extending between the viewer first end and the viewer second end; a first component coupled to the viewer first end, the first component comprising a first opening located proximate to the viewer first end; and a second component coupled to the viewer second end, the second component comprising: a second opening located proximate to the viewer second end; a camera; and a button, the button comprising: a button lens; a button housing; a button connector between the button lens and the button housing; a third opening located on a portion of the button housing; a flex printed circuit board located at least partially within the third opening; and a seal located within the third opening.

In an embodiment of the third aspect, the button further comprises a trigger nub interposed between the button connector and the button housing.

In another embodiment of the third aspect, the button further comprises a movable internal structure, and the button connector is secured to and moves with the internal structure.

In another embodiment of the third aspect, the button further comprises: an internal structure; and an O-ring interposed between the button housing and the internal structure.

In another embodiment of the third aspect, the button further comprises: an internal structure; and an O-ring interposed between button lens and the internal structure.

In another embodiment of the third aspect, wherein: the button is movable between a first position and a second position; the button connector is a first distance from the button housing when the button is in the first position; and the button connector is a second distance from the button housing when the button is in the second position, the first distance being greater than the second distance.

What is claimed is:

1. An audio/video recording and communication doorbell (A/V doorbell) comprising:
   a viewer having a first end, a second end, and a passage extending between the first end and the second end;
   a first component coupled to the first end, the first component comprising:
   a first opening concentrically aligned with the viewer; and a first fire-resistant ring located at least partially within the first opening such that the first fire-resistant ring is interposed between a portion of the first component and a barrier when the first component is secured to the barrier;
a second component coupled to the second end, the second component comprising:
a second opening concentrically aligned with the viewer;
a camera;
a button, the button comprising:
a button lens;
a button housing;
an internal structure;
a button connector secured to the internal structure;
a third opening located on a portion of the button housing;
a flex printed circuit board located within the third opening and electrically connected to the button connector; and
a seal located within the third opening; and
a second fire-resistant ring located at least partially within the second opening such that the second fire-resistant ring is interposed between a portion of the second component and the barrier when the second component is secured to the barrier; and
a flexible connector extending along an outside of the viewer between the first component and the second component, the flexible connector electrically coupling the second component to the first component.

2. An electronic device comprising:
a viewer having a first end, a second end, and a passage extending between the first end and the second end;
a first component coupled to the first end, the first component comprising a first opening; and
a second component coupled to the second end, the second component comprising:
a second opening;
a camera;
a button;
a first surface; and
a first ring located at least partially within the second opening such that the first ring is interposed between a first portion of the first surface and a barrier when the electronic device is secured to the barrier.

3. The electronic device as recited in claim 2, wherein the first component further comprises a second ring located proximate to the first opening.

4. The electronic device as recited in claim 2, wherein the first ring includes threads that secure the first ring to the viewer.

5. The electronic device as recited in claim 2, wherein the second component further comprises a fastener, and wherein the first ring is interposed between the fastener and the barrier when the second component is secured to the barrier.

6. The electronic device as recited in claim 5, wherein the fastener overlaps the viewer and does not extend into the barrier when the second component is secured to the barrier.

7. The electronic device as recited in claim 5, wherein the fastener comprises:
a third end;
a fourth end; and
raised edges located around the third end, the raised edges to secure the fastener to the second end.

8. The electronic device as recited in claim 2, wherein:
the second component further comprises a lens coupled to the second end;
the lens overlaps the viewer within the second component; and
the first ring is located between the lens and the barrier when the second component is secured to the barrier.

9. The electronic device as recited in claim 2, wherein:
the second component further comprises a lens coupled to the second end,
the lens includes threads for securing the lens to the second end; and
the lens overlaps the viewer within the second component.

10. The electronic device as recited in claim 2, wherein the first ring comprises at least one of brass or a melting point of at least 1,710 degrees Fahrenheit.

11. An electronic device comprising:
a viewer having a first end, a second end, and a passage extending between the first end and the second end;
a first component coupled to the first end, the first component comprising a first opening; and
a second component coupled to the second end, the second component comprising:
a second opening;
a camera; and
a button, the button comprising:
a button lens;
a button housing;
a button connector between the button lens and the button housing;
a third opening located on a portion of the button housing;
a flex printed circuit board located at least partially within the third opening; and
a seal located within the third opening.

12. The electronic device as recited in claim 11, wherein the button further comprises a trigger nub interposed between the button connector and the button housing.

13. The electronic device as recited in claim 11, wherein the button further comprises an internal structure, and wherein the button connector is secured to and moves with the internal structure.

14. The electronic device as recited in claim 11, wherein the button further comprises:
an internal structure; and
an O-ring interposed between the button housing and the internal structure.

15. The electronic device as recited in claim 11, wherein the button further comprises:
an internal structure; and
an O-ring interposed between the button lens and the internal structure.

16. The electronic device as recited in claim 11, wherein:
the button is movable between a first position and a second position;
the button connector is a first distance from the button housing when the button is in the first position; and
the button connector is a second distance from the button housing when the button is in the second position, the first distance being greater than the second distance.

17. The electronic device as recited in claim 2, wherein the first ring includes at least one of a ceramic, brass, steel, or aluminum.

18. The electronic device as recited in claim 2, wherein a second portion of the second component is configured to contact the barrier when the second component is secured to the barrier.

19. The electronic device as recited in claim 2, wherein the electronic device is secured to the barrier when:
- the viewer passes through an opening of the barrier;
- the first component is coupled to the first end of the viewer; and
- the second component is coupled to the second end of the viewer.

20. The electronic device as recited in claim 2, wherein the first component further comprises at least one of:
- one or more batteries;
- one or more communication interfaces;
- one or more processors; or
- one or more computer-readable media.

* * * * *